Figure 1:
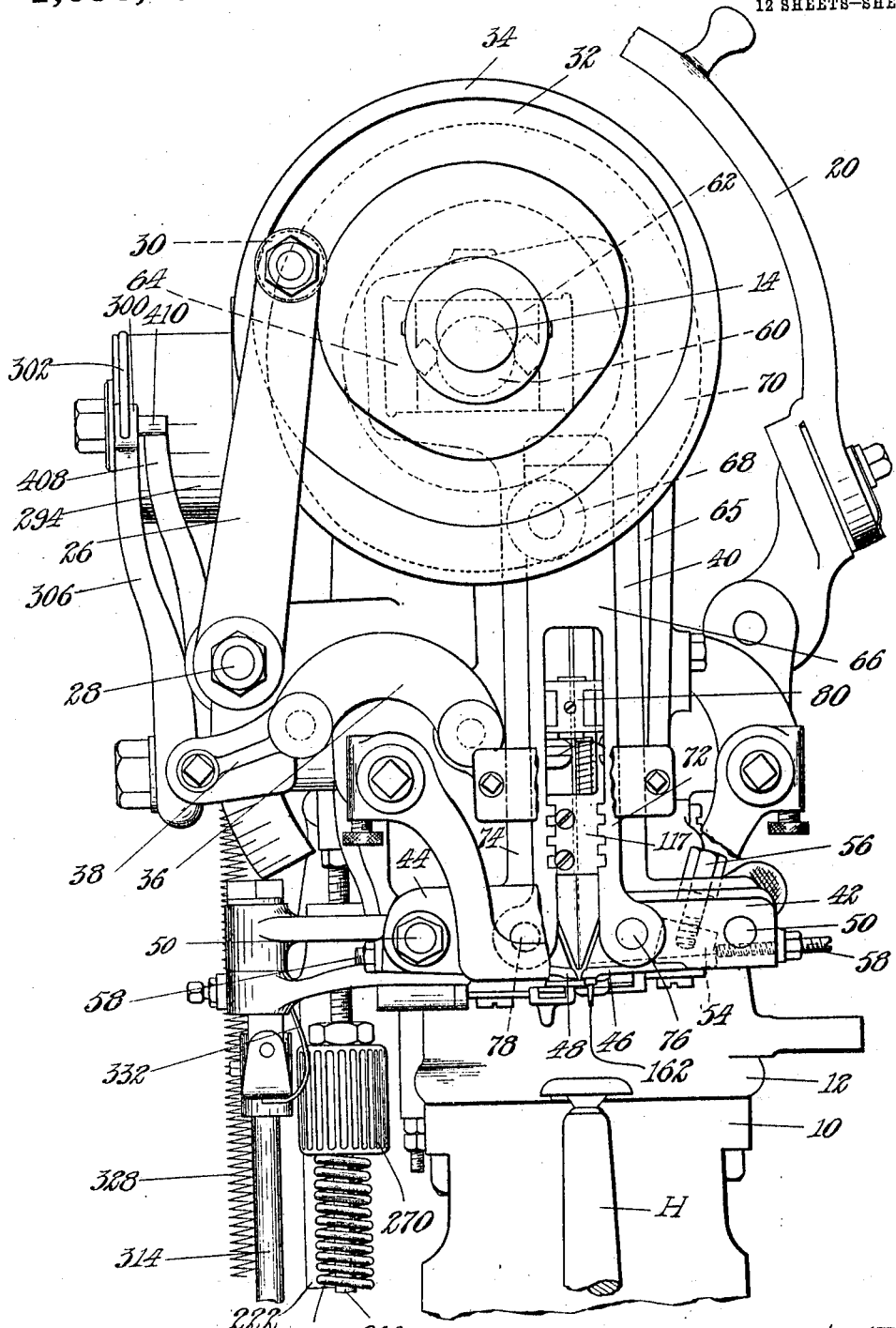

L. A. CASGRAIN.
MACHINE FOR INSERTING FASTENINGS.
APPLICATION FILED SEPT. 12, 1908.

1,053,479.

Patented Feb. 18, 1913.
12 SHEETS—SHEET 2.

WITNESSES

INVENTOR
Louis A. Casgrain

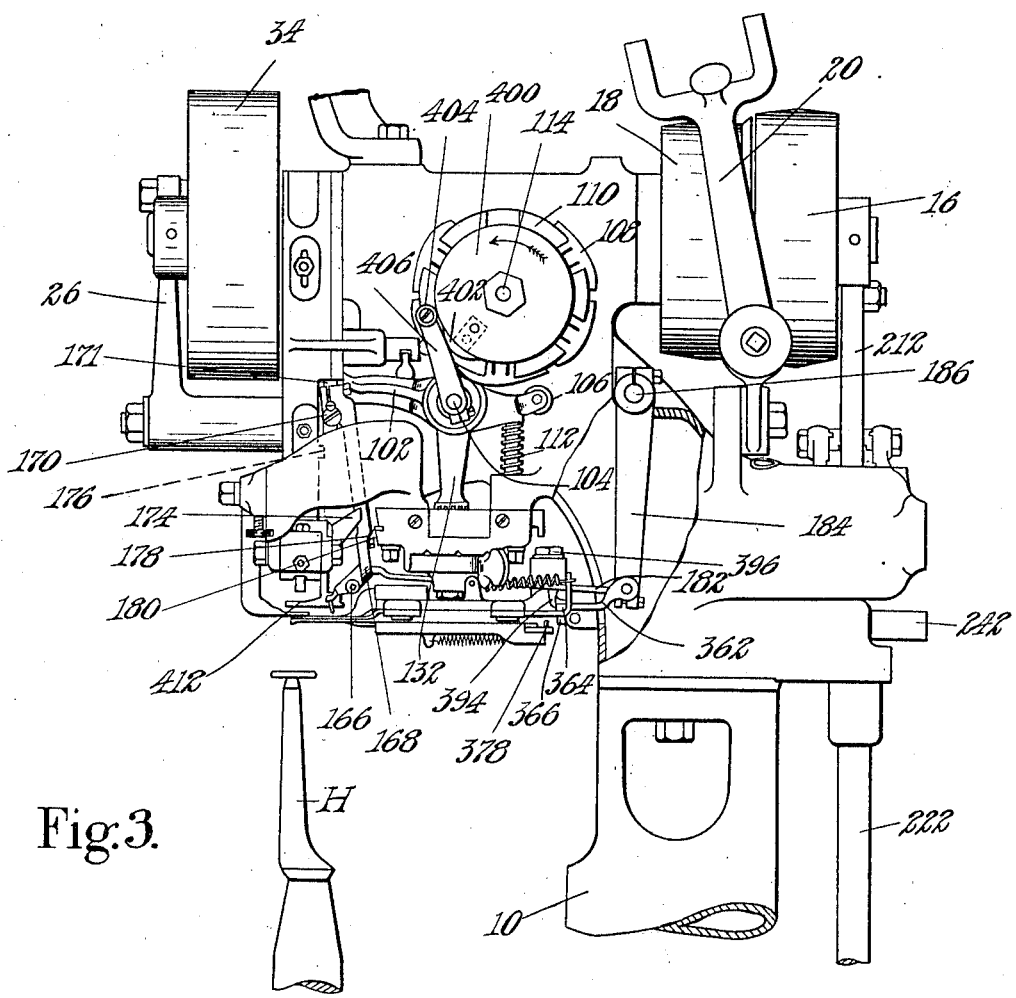
Fig. 3.
Fig. 4.
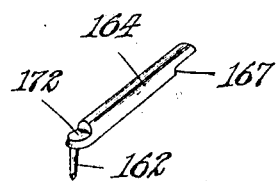

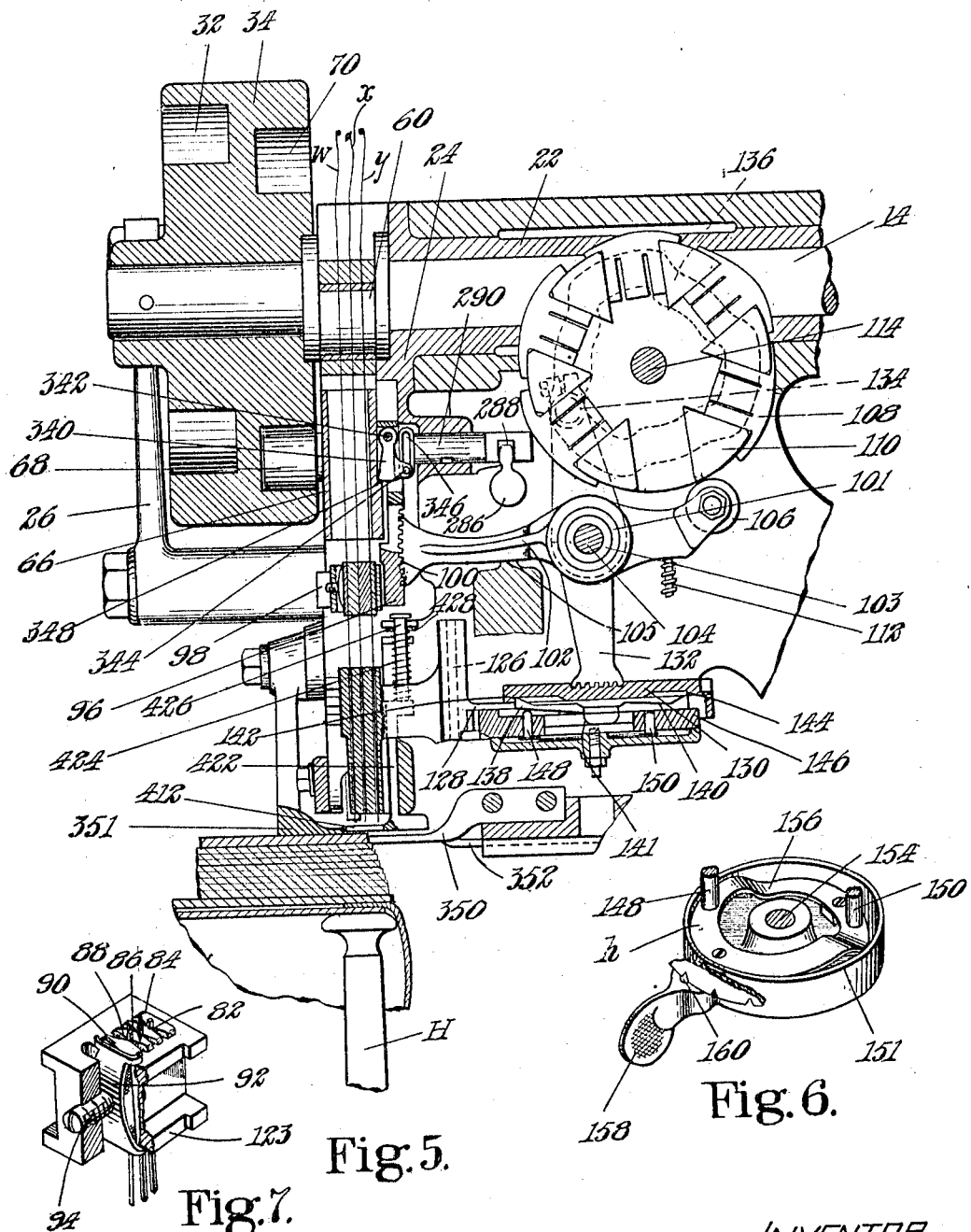

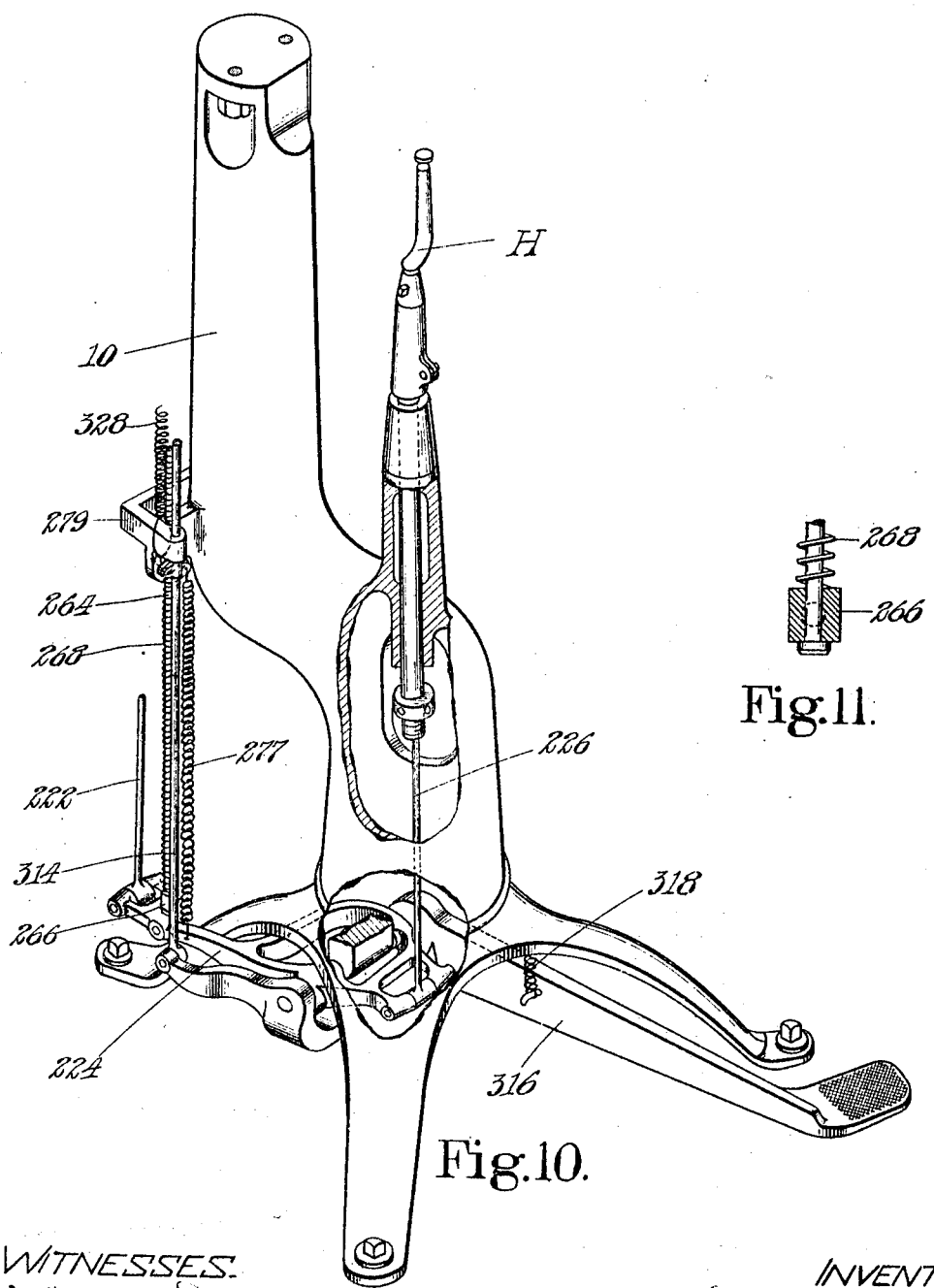

L. A. CASGRAIN.
MACHINE FOR INSERTING FASTENINGS.
APPLICATION FILED SEPT. 12, 1908.
1,053,479.
Patented Feb. 18, 1913.
12 SHEETS—SHEET 8.
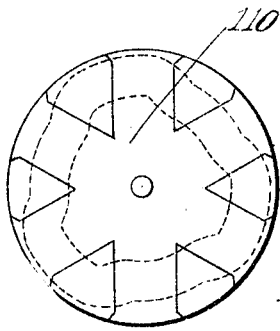
Fig.12.
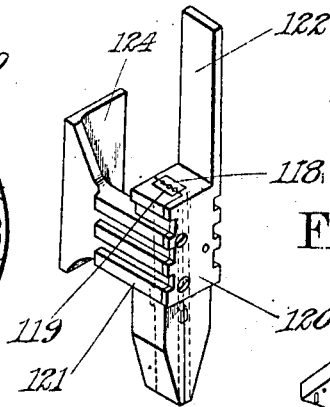
Fig.13.
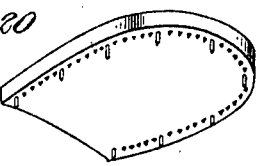
Fig.40.
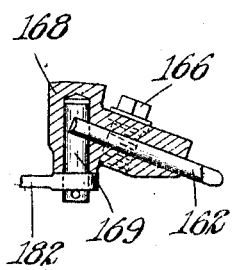
Fig.39.
Fig.14.
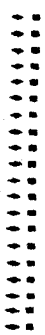
Fig.15.
Fig.16.
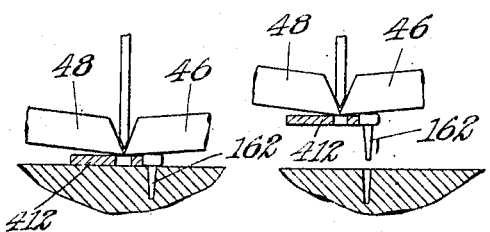
Fig.32.  Fig.33.  Fig.34.  Fig.35.
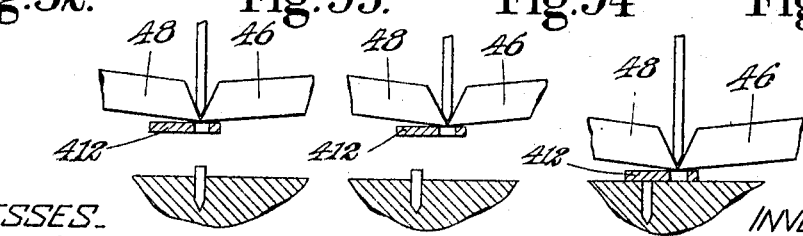
Fig.36.  Fig.37.  Fig.38.
WITNESSES
N. Dorsey Spencer
Arthur L. Russell
INVENTOR
Louis A. Casgrain L. A. CASGRAIN.
MACHINE FOR INSERTING FASTENINGS.
APPLICATION FILED SEPT. 12, 1908.
1,053,479.
Patented Feb. 18, 1913.
12 SHEETS—SHEET 9.
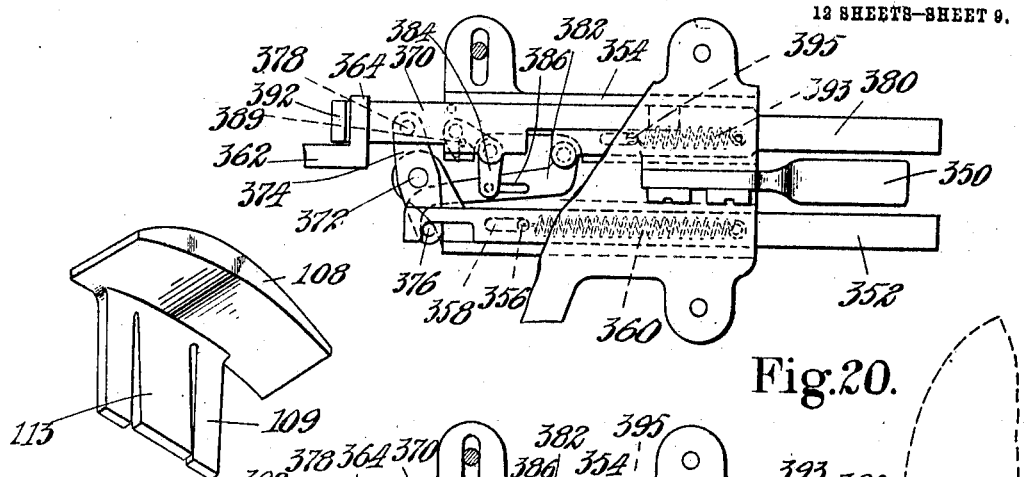
Fig. 17.
Fig. 20.
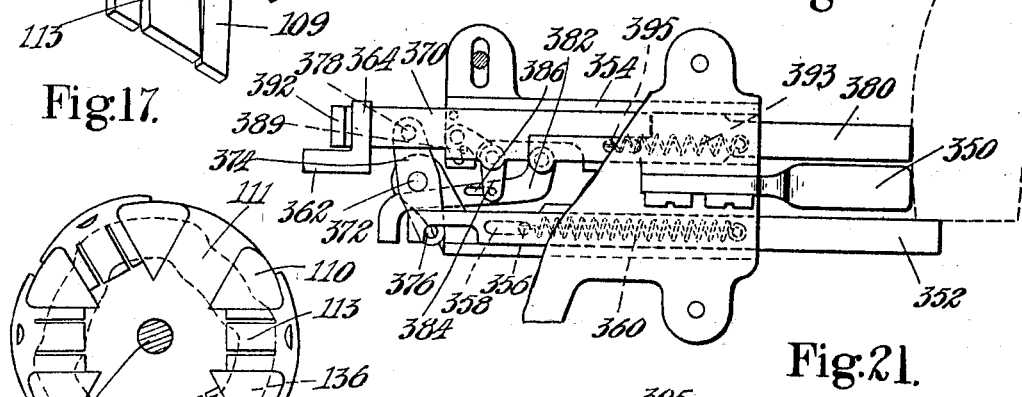
Fig. 18.
Fig. 21.
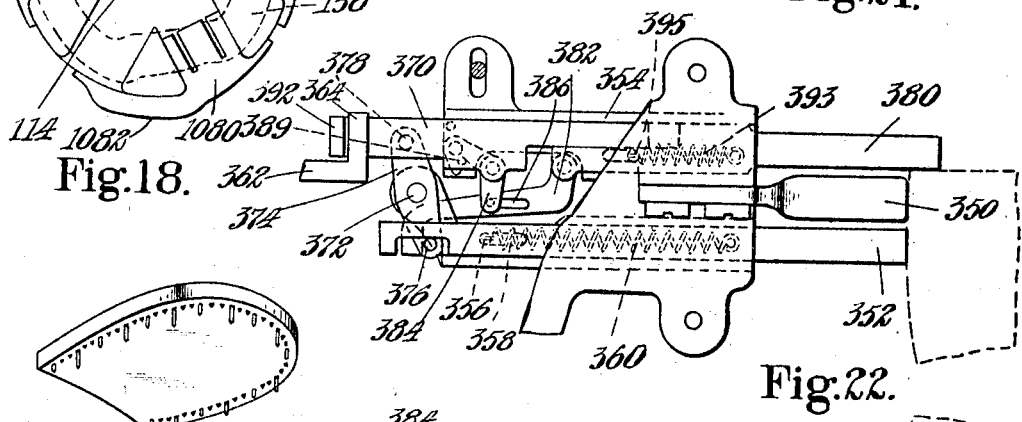
Fig. 19.
Fig. 22.
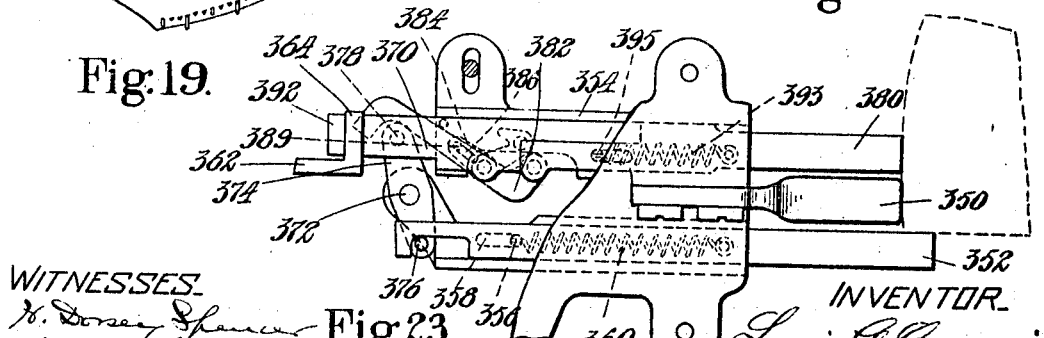
Fig. 23.
WITNESSES
H. Dorsey Spencer
Arthur L. Russell
INVENTOR
Louis A. Casgrain L. A. CASGRAIN.
MACHINE FOR INSERTING FASTENINGS.
APPLICATION FILED SEPT. 12, 1908

1,053,479.

Patented Feb. 18, 1913.
12 SHEETS—SHEET 10.

WITNESSES.
INVENTOR.
Louis A. Casgrain

L. A. CASGRAIN.
MACHINE FOR INSERTING FASTENINGS.
APPLICATION FILED SEPT. 12, 1908.
1,053,479.
Patented Feb. 18, 1913.
12 SHEETS—SHEET 11.
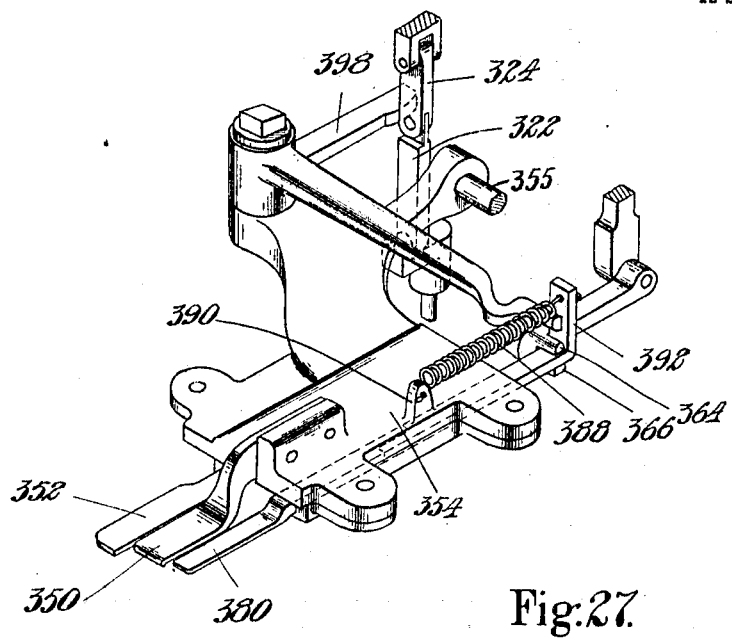
Fig. 27.
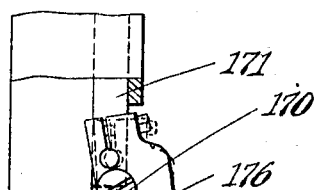
Fig. 28.
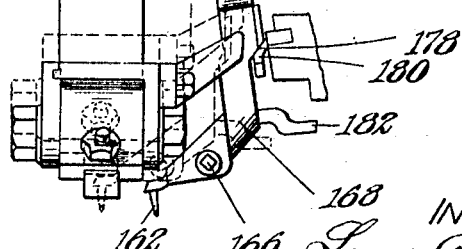
WITNESSES.
N. Dorsey Spencer
Arthur G. Russell
INVENTOR.
Louis A. Casgrain

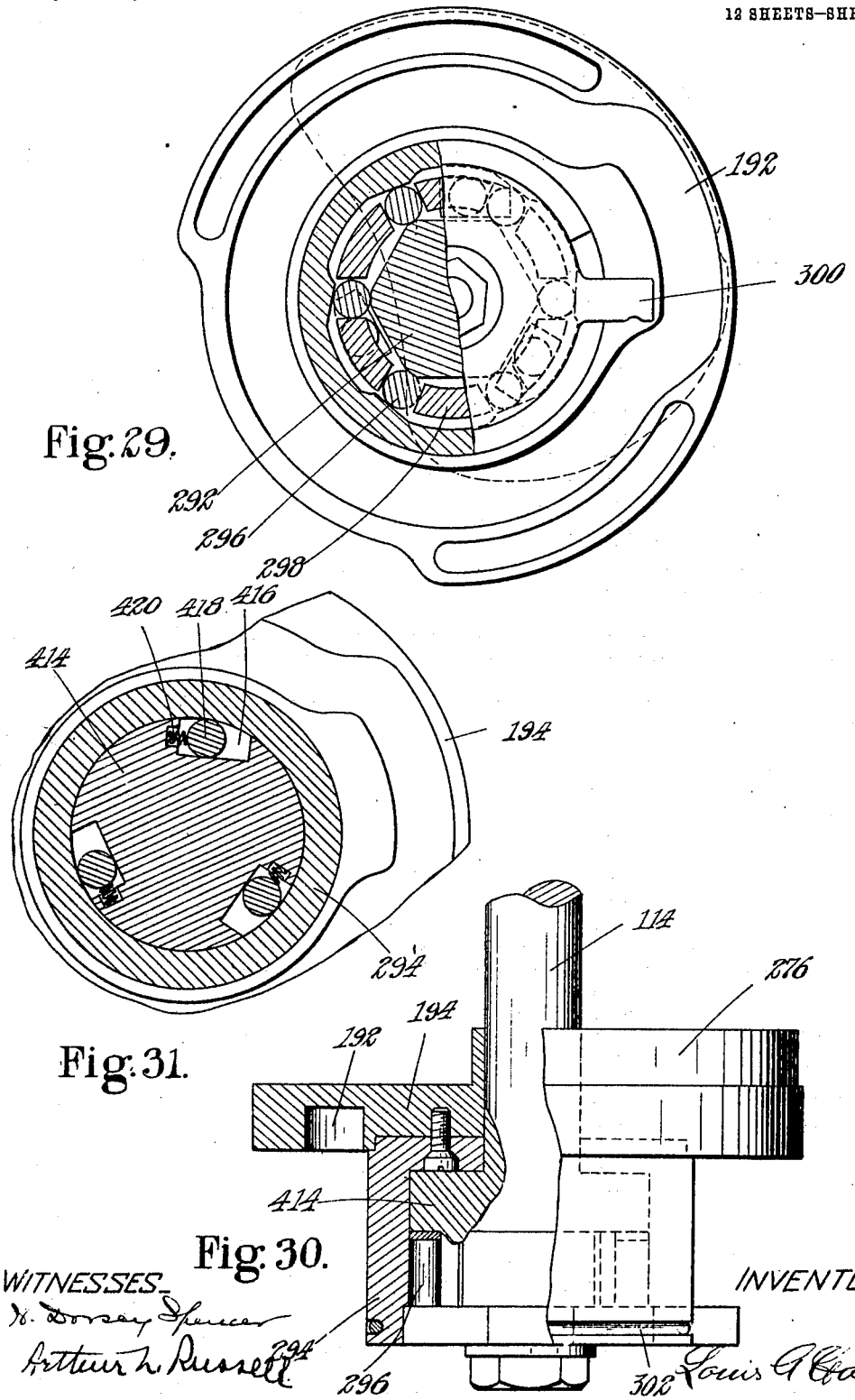

UNITED STATES PATENT OFFICE.

LOUIS A. CASGRAIN, OF BEVERLY, MASSACHUSETTS, ASSIGNOR TO UNITED SHOE MACHINERY COMPANY, OF PATERSON, NEW JERSEY, A CORPORATION OF NEW JERSEY.

MACHINE FOR INSERTING FASTENINGS.

1,053,479.  Specification of Letters Patent.  Patented Feb. 18, 1913.

Application filed September 12, 1908. Serial No. 452,755.

*To all whom it may concern:*

Be it known that I, LOUIS A. CASGRAIN, a citizen of the United States, residing at Beverly, in the county of Essex and Commonwealth of Massachusetts, have invented certain Improvements in Machines for Inserting Fastenings, of which the following description, in connection with the accompanying drawings, is a specification, like reference characters on the drawings indicating like parts in the several figures.

This invention relates to machines for inserting fastenings.

Although directed primarily to machines for use in the manufacture of boots and shoes to insert fastenings of various lengths, shapes and kinds, either for uniting permanently or temporarily parts of the boots or shoes, or for purposes of ornamentation or resisting wear, the invention comprehends, nevertheless, principles of construction and operation applicable to fastening inserting machines in general, whether such machines deal with previously formed fastenings, or make and insert, or insert and make, their own fastenings.

The various articles above included under the term "fastening" have in the arts various designations according to the particular purposes which they subserve. For the sake of brevity, however, the term "fastening" will be used hereinafter to include everything of a nature to be handled by machines of this kind.

A general object of the invention is to provide a fastening inserting machine which will operate effectively at speeds much in excess of those attained by such machines in use up to the present time. Not only, however, does the invention aim to provide a fastening inserting machine which will operate effectively under favorable conditions as to work and operator at speeds much in excess of those attained by such machines in use up to the present time, but it aims furthermore to provide a machine which can be operated successfully under ordinary conditions and by the average operator up to approximately its highest speed capacity, and yet which will have reserve capacity sufficient to meet the demands upon it of the fastest and most skilled operator.

To this end the invention aims to provide a machine in which the various operations are performed with certainty and precision and in such succession or interrelation that the average time devoted to the insertion of a single fastening shall be reduced to a minimum.

The invention aims further to provide a machine which, to the highest degree consistent with the variety of the demands made upon it, with the nature of the work upon which it operates and with the nature of the operations performed upon said work, is automatic.

Although, in the illustrated embodiment of the invention, the number of operations of the inserting mechanism essential to the complete insertion of a single fastening has been increased, it will be seen that these operations have been highly specialized and therefore the time necessary to their separate performance has been much reduced, and that such specialization has been so extended that the operations which, performed successively at a single fastening location, are essential to the complete insertion of a fastening at said location, may be performed simultaneously at a plurality of successive fastening locations, and preferably are so performed when a plurality of fastenings are to be inserted in succession. It should not be implied from the use of the term "specialize" that in general the functions of single elements of former constructions have been broken up into steps to be performed by a plurality of elements of the construction of this invention, for, in most cases, the reverse of this proposition is true and not only does a single element of the present construction perform the equivalent of the functions of a plurality of elements of former constructions, but the operations of forming and inserting fastenings have been so simplified that the function of the said single element of the present construction, as hereinbefore suggested, is a highly specialized function. Furthermore, with simplification of the operations of forming and inserting fastenings has come simplification of the construction of the means which perform such operations, a reduction in the aggregate amount of movement of the parts of said means and also a reduction in the amount of power required to produce such movement.

Another object of the invention is to provide, in a fastening inserting machine in which the fastenings are formed by severing, successively, portions from the end of a continuous strip of fastening material, mechanism for gripping the strip, forcing the end into the work and severing the strip to form a separate fastening and means for controlling positively the action of the said mechanism. Preferably a single means both grips the strip for inserting its end and severs the strip after the end has been inserted. It is therefore desirable not only that the gripping action be limited to prevent severing at the time the strip is gripped but also that the gripping position of the means be maintained until the end of the strip has penetrated the stock nearly or quite to the desired point, lest the strip be prematurely severed. Furthermore, it is desirable not only that the gripping action be so controlled that the strip cannot be prematurely severed, but also that it be so controlled that it does not lessen during the inserting operation, lest the hold upon the strip be not sufficient to prevent stripping of the sides of the portion intended to form the fastening, and shortening of the fastening, owing to the resistance of the work to the insertion of the end of the strip. It is preferable that the severing operation be positively effected. Preferably also the means for controlling the action of the gripping and severing means during the inserting operation controls said means positively at all times, thereby serving to actuate said means to grip the strip, to hold said means in gripping relation to the strip, to actuate said means to sever the strip, and preferably to effect positively a releasing action of said means whereby a relative movement of the strip and said means is permitted.

Another object of the invention is the provision, in combination with inserting mechanism of the type of that hereinabove described, of means for forming a fastening receiving opening in the work to receive a fastening. Preferably the said means forms the fastening receiving opening at a point upon the work spaced from the point beneath the inserting mechanism a distance equal to the desired distance between successive fastenings in the fastening row and is preferably arranged to be operated simultaneously with the inserting mechanism. Prior to this invention it has never been attempted, so far as known, to combine means for forming an opening to receive a fastening with a fastening inserting mechanism comprising a single means for both feeding and driving or for both driving and severing a fastening. This combination is an extremely important feature of the invention.

A convenient construction embodying the feature of the invention just referred to is one in which the means for forming the fastening receiving opening in the work is operated in forming said opening by the means for inserting fastenings, preferably in the fastening inserting movement of the latter. In its illustrated embodiment, this feature of the invention comprises an awl arranged to be driven into the work by the gripping and severing mechanism hereinabove referred to upon its fastening inserting movement, and a further feature of the invention is the provision of means operated by the inserting mechanism for forming a fastening receiving opening in the work which can be brought into and out of operative relation to said inserting mechanism without interrupting the operation of said mechanism.

Another object of the invention is to provide, in a fastening inserting machine in which there are a plurality of sources of fastening supply and means for forming in the work fastening receiving openings, means for inserting automatically in predetermined order in the fastening receiving openings formed by said first-named means fastenings from said sources of supply. Preferably the operation of the last-named means can readily be so varied that the order of the fastenings may also be varied. Preferably also the means for forming the fastening receiving openings in the work is combined with means for inserting in predetermined order from a plurality of sources of supply fastenings in a plurality of rows formed by feeding the work between successive fastening inserting operations.

Another important feature of the invention is the provision, in a machine in which a fastening is partially inserted into a previously formed opening at one operation and is completely inserted at a succeeding operation, of means for forming the fastening receiving opening, means for partially inserting the fastening into said opening, and means for completing the insertion of said fastening, all of which are arranged to operate simultaneously at three respective fastening locations upon the work.

A further important feature of the invention is the provision of three means having the functions of those last described which are so constructed and arranged that two of them may be operated from the third and that therefore power need be applied to only one of them.

Although, as hereinbefore suggested, in the operation of inserting a single fastening in the preferred form of the invention three movements of the inserting mechanism in the fastening inserting direction are required, it will be noted from the foregoing description of the operation of the separate means for performing the respective steps in the insertion of a fastening that when the machine is operating to drive several fastenings in succession, the insertion of a fastening will be completed at every movement of the inserting mechanism in the fastening inserting direction, and that, therefore, the average time devoted to the insertion of a single fastening will be one-third the actual time required for such insertion.

In the preferred embodiment of the invention the work is fed between successive fastening inserting operations by a member which engages a partially inserted fastening, and a further feature of the invention is the provision of means coöperating with the work feeding means just described which will insure the proper feeding of the work when comparatively short fastenings are being inserted. To this end the means for forming the fastening receiving opening in the work which, in the preferred embodiment of the invention, comprises an awl driven into the work by the inserting mechanism, is maintained with its end in the fastening receiving opening while the head which carries the inserting mechanism swings with it and the awl in the direction to feed the work. It will be noted, therefore, that the invention comprises in this aspect, first, a work feeding means comprising an awl driven into the work by the inserting mechanism and maintained with its end in the fastening receiving opening by said mechanism while it swings in the direction to feed the work, and, secondly, a work feeding means comprising a member which engages a partially inserted fastening and an awl coöperating with said member to insure the proper feeding of the work.

A further feature of the invention comprises novel means for determining the length of the fastening to be inserted. A convenient way in the preferred embodiment of the invention to decrease or increase the length of the fastening to be inserted is to cause the strip of fastening material to move respectively in the same direction as, or in a direction opposed to, that in which the gripping means is moving during its inoperative movement. It will be noted that in the illustrated construction the strip of fastening material cannot be moved a great distance in a direction opposed to that in which the gripping means is moving during its inoperative movement without coming into contact with the work, and that therefore substantially the longest fastening to be obtained by the just described method of varying the length of the fastenings will be that measured off by the relative movement of the gripping means to a stationary fastening strip maintained in its lowermost position. Such a fastening, in the illustrated construction, will be of a length determined by the vertical position of the gripping means at the time the strip is gripped.

It is sometimes desirable, however, to have provision for obtaining a fastening of a length greater than any which could be obtained by the method of varying lengths hereinabove refered to, and therefore the present invention comprises also means for varying the length of a fastening in a different manner. Preferably this last-named means operates during the operative movement of the gripping means and in coöperation therewith. When the length of a fastening is varied, with the illustrated construction, by the first-described method of varying fastening lengths the variation does not involve pulling the strip through the strip retainer at the time the increase or decrease in the length is effected. The method of varying the fastening length last referred to does, however, preferably involve the pulling of the fastening strip through the strip retainer. A convenient way of varying the length of the fastening in accordance with the last-described method is to provide means for moving the strip retainer over the fastening strip while the strip is held against movement with the retainer by the gripping means.

Another important feature of this invention is the provision of means by which the lengths of the fastenings may be so controlled automatically that fastenings of varying length may be inserted preferably in predetermined order as to lengths. The provision of such means is especially desirable when machines of this kind are to be used for inserting fastenings in the top lifts of heels for ornamental or wear-resisting purposes. As the material from which such fastenings are made is frequently so costly that it adds considerably to the cost of manufacture of the shoes if all the fastenings inserted in the top lift for either or both of the purposes above specified are made sufficiently long to serve effectively as means for securing the top lift better to the heel, and since a few long fastenings only are needed for this purpose provided they be distributed properly upon the top lift, a fastening inserting machine which is provided with means for automatically controlling the lengths of successive fastenings in such manner that there may be inserted series of fastenings made up of a combination of fastenings of various lengths, for example, a series made up of successive groups each comprising several short fastenings and a single long fastening, will effect a considerable saving in the cost of material used in ornamenting the top lifts, and, in addition, provide additional and effective means for securing the top lifts to the heels, the top lifts being usually simply spanked upon the heads of the heel nails. When the length of the fastening is varied, as above described, by moving the fastening strip either in the same direction as the gripping means or in a different direction, according as a shorter or a longer fastening is desired than that obtained with the strip stationary, the automatic control of the lengths of successive fastenings or groups of fastenings may conveniently be effected by providing means which controls automatically the direction and amount of movement of the fastening strip during the inoperative movement of the gripping means.

The fastening length controlling means has preferably provision for variation of the order in which it causes fastenings of different lengths to be inserted. In the preferred embodiment of the invention a single fastening length controlling mechanism controls the lengths of all the fastenings which may be inserted at a single operation of the machine. Although the number of different combinations as to lengths of fastenings depends upon the capacity of the machine as constructed, it may be noted that by changing the speed ratio of certain parts or by distributing the fastening length control of the different fastening strips among a plurality of controlling mechanisms, the possibility of variety in the combinations may be greatly increased within certain practical limits.

When the machine is to be used for inserting fastenings of various lengths in predetermined succession, as when, for example, a few long fastenings and many short fastenings are to be inserted into a top lift and the function of the long fastenings is to help to hold the top lift on a heel, it is desirable that these fastenings be located where they can perform this holding function to the best advantage. It is especially desirable that a long fastening be located near one of, or each of, the breast corners of the heel. In order that fastenings of a particular length may be located where desired, it is preferable therefore that the fastening length controlling means operate in such manner that the length of the initial fastening to be inserted may be predetermined. To this end the invention aims to provide a construction which will not only cause to be inserted a series of fastenings of various lengths but one which will also cause the first fastening to be inserted, whenever the insertion of fastenings begins, to be of a predetermined definite length.

When the machine is constructed, as hereinabove described, to insert a series of fastenings which is made up of groups comprising fastenings of various lengths arranged in predetermined order as to lengths, provision is preferably made for causing the first fastening to be inserted when the insertion of fastenings begins to be a selected member of one of said groups.

An especial advantage arising from the employment of the novel fastening length controlling means just described is that in so-called "quarter slugging" in the usual way, by stopping the insertion of fastenings after a row of fastenings has been driven from one corner of the heel breast part way around the heel, and then again starting it in order to drive a single fastening near the other breast corner, a long fastening can be located near each breast corner provided the fastening inserting mechanism has been set to start the insertion of fastenings with a long fastening.

Preferably the above described fastening length controlling means is adjustable so that the insertion of fastenings may start with any desired length of fastening within the capacity of the machine as constructed. When the fastening length controlling means is so constructed and arranged that it causes a series of fastenings to be inserted which is made up of groups comprising fastenings of various lengths arranged in predetermined order as to lengths, said means is preferably made adjustable in such manner that the insertion of fastenings may start with any desired member of a group.

A further important novel feature of this invention resides in the timing of the movements of the strip and the gripping means. To predetermine accurately the lengths of the fastenings, it is practically essential that the point upon the strip at which the gripping means grips it to insert its end be subject to definite predetermination, without regard to varying thicknesses either in the same strip or in a plurality of strips which are to be operated upon at the same time. The gripping means has preferably a constant amount of gripping movement. It is, therefore, obvious that if a plurality of strips of unequal thicknesses lie between the gripping members of the gripping means, the thicker or thickest strip will be gripped first. If then there be a movement of the gripping means relative to the strips in the direction of their lengths, the strip first gripped will be moved relatively to the other or others and the strip next gripped, being the next in thickness, will be gripped at a point nearer the inserting end, thus making the fastening formed from that strip shorter than the one formed from the strip first gripped. Although it may be desirable to form one of the simultaneously severed fastenings shorter than another, a method of doing so which depends upon the difference in thicknesses of the fastening strips will hardly be as satisfactory as one which is independent of features so subject to variation, for example, a method made possible by the provision of separate fastening length controlling means of the kind hereinbefore described for each strip.

One of the objects attained by proper timing of the movements of the strip and gripping means is the avoidance of the scraping of the sides of the strip by the gripping means at the time it is actuated to grip the strip. Another object attained by the proper timing of these elements is the avoidance of the difficulty pointed out above when the machine is operating upon a strip, or strips, of varying thicknesses and the rendering certain that when a plurality of fastenings are to be severed simultaneously, the plurality of strips from which the fastenings are to be severed shall be gripped simultaneously or, at least, gripped successively without any intervening movement of the strips relatively to each other.

A timing which will effect the desired results above specified is one in which the gripping means and strip are relatively stationary, so far as movement longitudinally of the strip is concerned, at the time the gripping means is actuated to grip the strip. Such timing may be effected in several ways. A convenient way to effect it where the gripping means comprises gripping members pivoted to move from a position in a line below their pivots into gripping position is to cause the strip to remain stationary and to cause the gripping ends of the gripping members to move upward into gripping position relatively to their carrier at substantially the same speed as that at which they would be carried downward by the carrier if it were not for this upward movement, thus causing these ends to remain stationary relatively to the strip so far as longitudinal movement is concerned, although they are moving transversely of the strip. The gripping movement of each of the gripping members is preferably equal to that of the other and each is preferably moved to a point at a predetermined distance from the center of the strip, this movement being entirely independent of the thickness of the strip and being uniform in successive operations while the adjustment of the gripping members remains the same, and each member is preferably stopped with its end at the same distance from the center of the strip as the corresponding end of the other. A similar timing of the movement of the strip and gripping means occurs preferably also at the time the gripping means severs the fastening from the strip and equal movement of the members is preferably continued so that their cutting edges meet at the center of the strip.

The invention comprehends also novel means for rendering the machine operative to perform its work and for rendering it inoperative after its work has been completed. Included among the operations which the machine is called upon to perform, in order that as little exertion as possible may be required of the operator, is preferably that of raising the work support to clamp the work against the work abutment or foot plate after the operator has placed it over the end of said support in proper position to receive the initial fastening. In machines of this type which are designed to run at high speeds, it has been found difficult with ordinary actuating mechanisms to operate the actuating mechanisms quickly enough so that the machine may be rendered operative to insert fastenings and then rendered inoperative after a single fastening only has been inserted. To avoid the necessity of overcoming the inertia of many parts when the machine is rendered operative to perform its work, the greater part of the mechanism of the machine is preferably arranged to be constantly in motion and only so much of the mechanism is thrown out of operation to permit the removal of the work from the work support and the placing of another piece of work in position over the work support as is necessary to avoid interference with these last-named two operations. To permit convenient replacement of one piece of work by another, the work support is preferably automatically lowered and the insertion of fastenings automatically interrupted, and these two operations are for this purpose preferably made interdependent, through the actuating mechanism or otherwise, as to the time of their occurrence. The stopping of the insertion of fastenings and the lowering of the work support for the replacement of the work are preferably made interdependent to the extent that the insertion of fastenings must be stopped before the work support is lowered, and that the work support must be held in its raised position until the fastening upon which the inserting mechanism is operating is completely inserted.

In the preferred embodiment of the invention hereinbefore referred to, a convenient way in which the machine may be rendered inoperative to insert fastenings is to cause the fastening strip to move with the gripping mechanism in such manner that there is no fastening measuring relative movement of the strip and the gripping mechanism, the gripping mechanism being thus prevented from closing upon the strip to insert and sever a fastening. A simple construction for effecting the interruption of the insertion of fastenings in the manner just described comprises means for locking the strip retaining means to the reciprocating gripping mechanism, so that the retaining means travels with the gripping mechanism throughout a part or the whole of the path of movement of the latter. In such a construction the gripping mechanism may be constantly in operation.

The work support, when in its operative position for supporting the work to receive fastenings, is preferably connected to mechanism which causes it to lower the work slightly after a fastening has been inserted to permit the work to be fed freely and then to press the work again against the work abutment to receive the next fastening, the restoration of the work support to its work clamping position being preferably effected through the action of a strong spring against the tension of which it has been depressed to lower the work for the work feeding operation. Preferably a portion of this mechanism is continuously operative. In order, therefore, that the work support may be lowered for the removal or the reception of the work, in the preferred construction, it is desirable that means be provided for so connecting the work support and the constantly moving part of the work support operating mechanism that the connection between these parts may be temporarily, and preferably automatically, interrupted. As hereinbefore pointed out, means is also preferably provided for automatically raising the work support into operative position after it has been lowered for the removal or the reception of the work. In the preferred embodiment of the invention, the means for automatically raising the work support is arranged to be actuated by means set in operation by the operator and is preferably also arranged to effect automatically an operative connection between the work support and the constantly moving part of the work support operating mechanism.

It will be apparent from a study of the mechanisms hereinbefore referred to that, to perform their functions properly, these mechanisms must be rendered functionally operative in a predetermined order. Likewise in order to perform completely their functions, they must be thrown out of operation in a different predetermined order. Means is therefore preferably provided which, after being set in operation by the operator, automatically renders operative, at the proper time, each of the mechanisms which have been thrown out of operation to permit the removal of work from the machine or the reception of work by it. Preferably the same means is arranged to operate, also at the will of the operator, to render inoperative at the proper times each of these mechanisms. In order that both the time and the energy required for the setting in operation by the operator of the actuating means may be reduced to a minimum, the said means is preferably arranged to be connected to a constantly moving part of the machine, and means is provided by which such connection may be easily and quickly effected. In the preferred embodiment of the invention, when it is desired to insert several fastenings successively, means is provided also for disconnecting automatically the actuating means from the constantly moving part after the actuating means has received a movement sufficient to render operative all of the mechanisms which it controls. This last-named means, as well as the initial connecting means, is arranged to be controlled by the operator, so that the connection between the actuating means and the constantly moving part may be restored at the will of the operator and the actuating means may thus be moved to render inoperative, in the proper order, the mechanisms which it has previously rendered operative.

When a machine which inserts a fastening for every rotation of the main shaft is designed to operate at high speed, as in the case of the preferred embodiment of this invention, in order that the operator may control the insertion of fastenings to the extent that he may, if he desires, through his control of the actuating mechanism, cause the machine to insert a single fastening only, it is usually essential that more time be given him to make the two movements necessary to control the starting and stopping movements of the actuating mechanism than is consumed by one or even two rotations of the main shaft. It is therefore essential that a fastening be not inserted upon the first rotation of the main shaft after the actuating means has been set in operation by the operator, since a second fastening would be inserted before the operator could control the actuating means to stop the insertion of further fastenings, and at speeds about 800 rotations per minute probably a third fastening would be inserted before the insertion could be stopped through control of the actuating means. Furthermore, as hereinbefore suggested, in the preferred embodiment of the invention the fastening inserting mechanism is constantly in operation and the means for forming a fastening receiving opening in the work is operated through said inserting mechanism. Although it is not essential in the preferred embodiment of the invention that a fastening receiving opening be formed in the work to receive the initial fastening, it is, however, preferable and therefore a fastening is preferably not inserted on the first movement of the fastening inserting mechanism in the fastening inserting direction after the actuating means has been set in operation, since one of the movements of the fastening inserting mechanism in the fastening inserting direction after the actuating means is set in operation is preferably used to cause a fastening receiving opening to be formed in the work by the means for this purpose. In order that the control of the actuating mechanism may be certain up to the maximum of practical speeds of operation of such machines, the beginning of the insertion of the first fastening is preferably postponed to the third or fourth or even more remote rotation of the main shaft after the actuating mechanism has been set in operation. The earlier rotations of the main shaft are preferably used in rendering the various mechanisms functionally operative at the proper times, the actuating means moving in timed relation to the main shaft, so that all parts may be in readiness for the insertion of the first fastening when the proper number of rotations of the main shaft has been made.

Preferably a single means is provided for setting in operation the actuating means, said first-named means being arranged to be moved in one direction by the operator and being automatically returned when released, the movement in one direction placing said first-named means in position to control the actuating movement of the actuating means and the movement in the other direction placing said first-named means in position to control that movement of said actuating means which effects the throwing out of operation of the mechanisms controlled by it. By arranging means of the kind just described for setting in operation the actuating means, in suitable position, the actuating means may conveniently be controlled by the foot of the operator, such means for setting in operation automatic actuating means having the advantage over the ordinary provision for actuating machines of this type that it requires merely a touch of the operator's foot to cause the work support to be raised automatically into operative position and the inserting mechanism to be rendered operative to insert fastenings.

Another novel feature of the invention which is of general utility in machines for inserting fastenings and which is probably a requisite of a fastening inserting machine which is to run at high speed, is the provision of means for automatically stopping the insertion of fastenings at a predetermined point upon the work. Such means is especially useful in the machine constituting the preferred embodiment of the invention.

As hereinbefore suggested, one of the principal objects of driving fastenings or slugs into the top lift of a heel is ornamentation of the heel, and the fastenings are therefore usually driven in such a manner that they form a design upon the top lift. If a design be made up of many fastenings, it is much more important, in so far as the appearance is concerned, that it be correspondingly spaced from the breast ends of the two heels of a pair than that it contain the same number of fastenings upon each of the two heels. In the preferred embodiment of the invention, therefore, means is provided for causing the insertion of fastenings to be stopped at a predetermined distance from the edge of a heel at or adjacent to one of the corners of the heel, preferably at a predetermined distance from one of the breast ends of the heel, and said means is preferably arranged to be controlled by the heel in accordance with its contour. Preferably, this means comprises a feeler arranged to be brought into contact with the edge of the heel being operated upon, and so connected with the starting and stopping mechanism that as it drops over a corner of the heel when the row of inserted fastenings approaches said corner it will serve to stop the insertion of fastenings. In order that the end of a row of fastenings may be gaged from the edge adjacent to another corner of the heel than that which first approaches the inserting mechanism, in other words in order that it may be gaged from another corner of the heel than the first rounded corner, or either rounded corner, the movement of the feeler necessary to cause the starting and stopping mechanism to stop the insertion of fastenings is preferably made great enough so that the movement permitted to this feeler as it reaches one of the rounded corners is not sufficient to cause such stopping.

When the machine is being operated to insert fastenings in a design which does not approach the stopping corner of the heel with a continuous row of fastenings, for example, when it is being operated to do what is known as "quarter slugging" in which a row of fastenings is inserted part way around the heel and then usually a single fastening inserted into the heel adjacent to the outer breast corner, that is the breast corner remote from the machine when the insertion of fastenings begins, it is desirable that this single fastening be accurately spaced from the breast corner adjacent to which it is inserted, and another feature of the invention therefore is the provision of means for affording a two-dimensional positioning of the work for the insertion of the last fastening. In the preferred embodiment of this invention, this means is preferably constituted by the feeler hereinabove described, which at this time does not need to perform its function of determining the location of the last fastening of a row of fastenings. In the preferred embodiment of the invention, therefore, the feeler is preferably so constructed and arranged that it may be thrown out of connection with the starting and stopping mechanism and yet be permitted to slip into position to constitute an end gage for the work during the insertion of the last fastening of a quarter slugging design. It is, of course, equally as important, so far as appearance is concerned, that the first fastening of a design be properly spaced from the breast corner adjacent to which the design starts and therefore in the preferred embodiment of the invention means is provided for affording a two-dimensional positioning of the work for the insertion of said first fastening. Inasmuch as the fastenings which form the design are successively inserted, and the work is therefore fed between successive inserting operations, it will be seen that it will be necessary, after the work has been properly located to receive the first fastening of the design, to remove that portion of the positioning means which constitutes the end gage out of the way of the work in order that the work may be fed past the inserting mechanism.

An important feature of the invention therefore consists in the provision of means for affording a two-dimensional positioning of the work to determine the location upon it of the first fastening to be inserted, which is so constructed and arranged that that portion of the means which lies within the path of the work feed shall be automatically withdrawn from said path before the work is fed.

The invention includes also further improvements in the means for feeding the work. In the preferred embodiment of the invention, as hereinbefore suggested, the work is fed between successive inserting operations by the engagement of a laterally movable device with the projecting portion of a partially inserted fastening. The strip of fastening material is preferably passed through an opening in this device so that the device serves not only to feed the work by engagement with the partially inserted fastening, but it also serves to guide the partial insertion of the next fastening. The invention comprehends mounting the feeding and guiding device above mentioned in such manner that it is preferably yieldingly pressed upon the work at all times except when it is raised, preferably positively, by the carrier at the end of the feeding movement to release it from engagement with the projecting end of the partially inserted fastening and except also during the last part of the fastening inserting operation when it is pressed down positively upon the work to insure the complete insertion of the previously partially inserted fastening. Inasmuch as in the preferred construction the fastening is severed flush with the upper surface of the feeding and guiding device, it might happen that the free end of a fastening strip would engage the upper surface of the feeding and guiding device as it is raised from the work, instead of passing through the guide opening in the same. If this should happen, it might cause breakage of parts of the machine at the time the strip is forced downward by the gripping and severing means. To avoid this possibility, a novel mounting of the feeding and guiding device is provided whereby the said device is permitted to yield in a downward direction as well as in the direction of its releasing movement.

Figure 2:
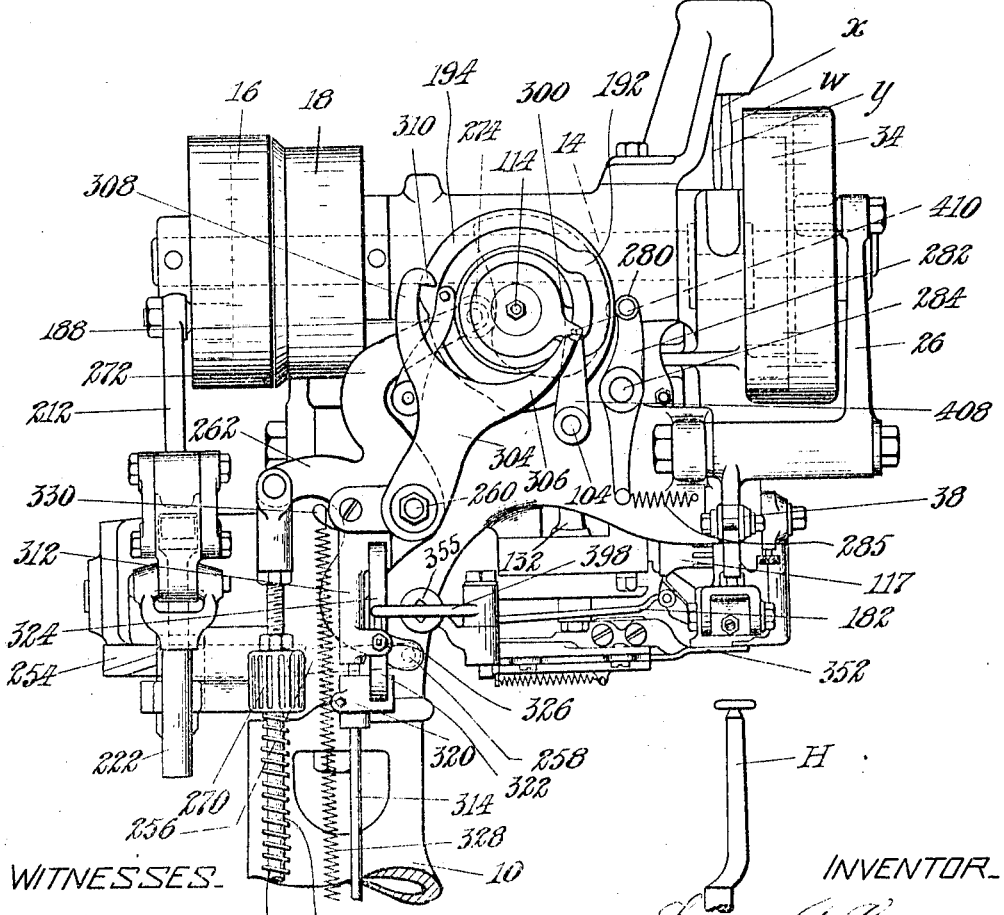
Figure 8:
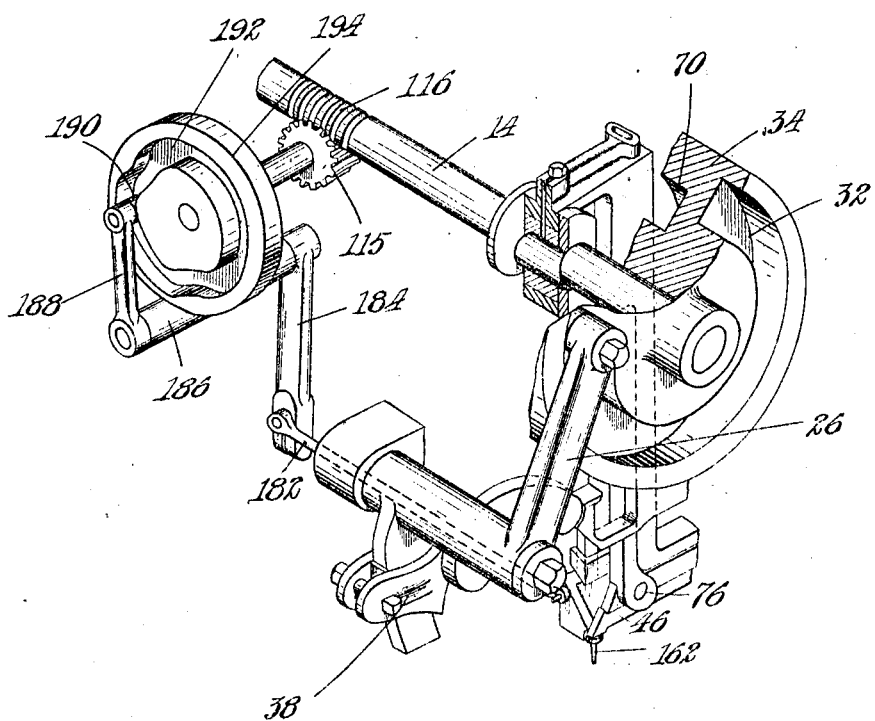
Figure 9:
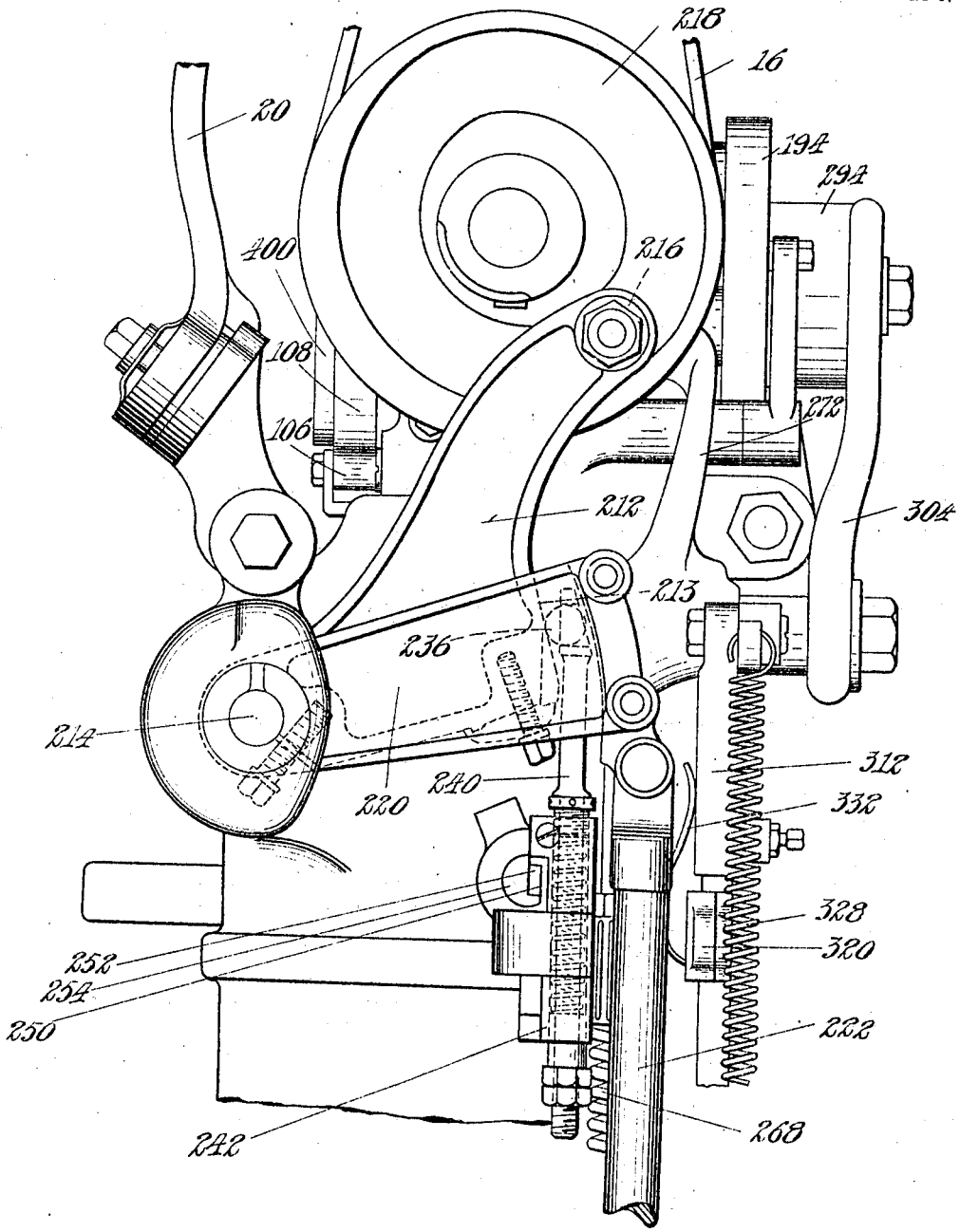
Figure 24:
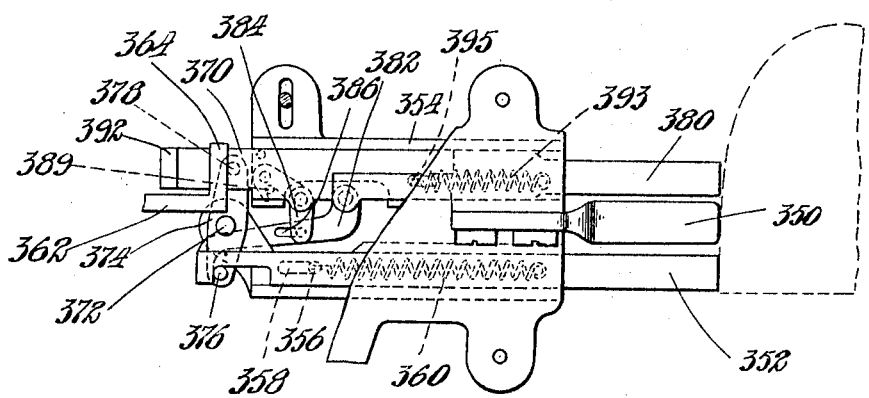
Figure 25:
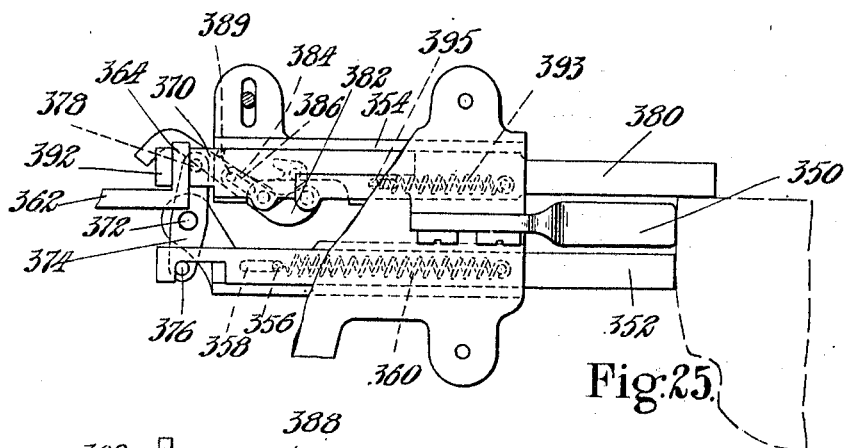
Figure 26:
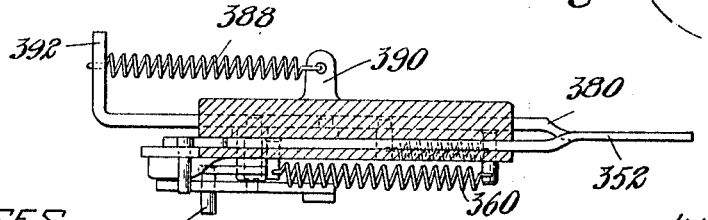

In the drawings,—Figure 1 is a front elevation of the upper portion of the machine embodying the preferred form of the invention; Fig. 2 is a side elevation of the machine illustrated in Fig. 1, but drawn to a smaller scale; Fig. 3 is an elevation of the side of the machine opposite to that illustrated in Fig. 2; Fig. 4 is a perspective view of the awl used with this machine; Fig. 5 is a longitudinal sectional view looking from the right of a portion of the upper part of the machine; Fig. 6 is a perspective view of the means for controlling the change of design; Fig. 7 is a perspective view of the fastening strip retainer; Fig. 8 is a detail perspective of the main shaft and the parts immediately associated therewith; Fig. 9 is a rear view of the machine showing the horn actuating lever and connections; Fig. 10 is a view of the base and standard of the machine showing the actuating treadle and the connections through the base from the horn actuating mechanism to the horn; Fig. 11 is a detail view of a portion of the construction shown in Fig. 10; Fig. 12 is a detail view of the cam disk in which the presenter cam groove is formed and to which the fastening length cams are attached; Fig. 13 is a perspective view of the fastening presenter; Figs. 14, 15 and 16 illustrate designs which may readily be produced with this machine; Fig. 17 shows one of the fastening length cams detached from the cam disk; Fig. 18 shows the cam disk with the fastening length cams attached thereto, one of the cams being entirely omitted to permit of the formation of a fastening of the extreme length provided for by one method of measuring the fastening length, this view showing also a fastening length cam for producing an extra long fastening; Fig. 19 shows a toplift in which every sixth fastening inserted is longer than the other five, this design being produced by the cam wheel illustrated in Fig. 18; Figs. 20 to 26 inclusive are views of the automatic stopping mechanism with the associated gage for determining the location of the initial fastening of a heel, Fig. 20 showing the automatic stop mechanism adjusted so that the heel engaging portion serves as a gage to determine the location of the last fastening to be inserted when the machine is not operating to insert a continuous row of fastenings, Fig. 21 showing the manner in which the position of the initial fastening is determined, the adjustment of the parts being the same as in Fig. 20, and Fig. 22 showing the manner in which the position of the last fastening to be inserted is determined, the adjustment of the parts being still the same as in Fig. 20. Fig. 23 shows the manner in which the position of the initial fastening is determined and the manner in which the heel engaging portion of the automatic stopping mechanism is held out of its operative position when the mechanism is adjusted to effect an automatic stopping of the insertion of fastenings at a predetermined point upon the heel. Fig. 24 shows the gage for determining the position of the initial fastening upon the heel withdrawn out of the path of the work feed as the insertion of fastenings is started and the heel engaging portion of the automatic stopping mechanism also drawn back so that it does not press against the heel. Fig. 25 shows the heel engaging portion of the automatic stopping mechanism moved forward by its spring to effect through its connection with the actuating means by which the insertion of fastenings is started a stopping of the insertion of fastenings as the said heel engaging portion of the said stopping mechanism slips over one of the breast corners of the heel. Fig. 26 is a side elevation, partly in section, of the parts shown in Figs. 20 to 25 inclusive. Fig. 27 is a perspective view of the mechanism for automatically stopping the insertion of fastenings at a predetermined point upon the work; Fig. 28 is a detail view partly in section of the awl carrier and associated parts; Fig. 29 is a detail elevation partly in section of a portion of the actuating mechanism, this view showing especially the construction of the modified Horton clutch employed therein; Fig. 30 is a plan view partly in section of the mechanism shown in Fig. 29. Fig. 31 is a detail section of the clutch employed to prevent premature dropping of the horn; Figs. 32 to 38 inclusive are views illustrating the various steps in the operation of inserting a single fastening; Fig. 39 is a detail section illustrating the manner in which the awl is confined in its holder; and Fig. 40 is a view of a top lift in which the lengths of the inserted fastenings have been controlled by the cam shown in Fig. 5.

Referring to the drawings, a base or standard 10 supports a head 12 which carries a main driving shaft 14. Upon the shaft 14 are mounted fast and loose pulleys 16 and 18, a belt shifter 20 serving to shift the belt from the loose pulley 18 to the fast pulley 16 when it is desired to connect the machine with a source of power. Such connection is preferably constantly maintained when the machine is in use. A sleeve 22 surrounding the shaft 14, and itself so mounted in bearings in the head 12 as to afford a bearing support for the shaft 14, carries at its front end a swinging frame 24, said frame being shown as integral with said sleeve. The swinging or oscillating movement of the frame 24 effects the feeding of the work over the work support in a manner hereinafter to be described. The said swinging movement is imparted to the frame 24 through the lever 26 pivoted at 28 on the machine head. At its upper end the lever 26 carries a cam roll 30 which travels in a cam groove 32 in the cam disk 34 attached to the front end of the main shaft 14. A link 36 pivoted at one end to the swinging frame 24 and at its other end pivotally connected to a clamp 38 upon the lower end of the lever 26 transmits to the swinging frame the movements of said lever. The distance the work is fed between successive fastening inserting operations may be varied by varying the position of the clamp 38 upon the lower end of the lever 26.

Mounted to reciprocate in the swinging frame 24 is mechanism for gripping, inserting and severing successively from a strip of fastening material fastenings of the same or different lengths. This mechanism comprises in the construction shown a reciprocating head 40 upon which are pivotally mounted carriers 42 and 44 for the gripping and severing means, said means being shown as comprising cutters 46 and 48. The cutter carrier head 40 is shown as shaped like an inverted T and the cutter carriers 42 and 44 are pivoted near their outer ends at 50 and 52 to the respective arms of the T. The cutters 46 and 48 are confined in their respective carriers by dovetailed clamping blocks 54, 54 held in place by headed screws 56, 56. Longitudinal adjustment of the cutters in their carriers is effected through screws 58, 58 mounted in said carriers and bearing against the ends of the cutters, said screws being provided with locking nuts, as shown. The cutter carrier head 40 is connected at its upper end to an eccentric 60 upon the main shaft 14 by a sliding block and slot connection 62, 64 whereby a reciprocating movement is imparted to the cutter carrier head by the rotation of the main shaft. A gib 65 adjustably held in the swinging frame 24 is adapted to take up looseness between the cutter carrier head 40 and the swinging frame. A forked slide 66 mounted to reciprocate in the cutter carrier head is provided at its upper end with a cam roll 68 which travels in a cam groove 70 upon the rear side of the cam disk 34. The fork members 72, 74 of the slide 66 are pivotally connected at 76 and 78 to the respective cutter carriers 42, 44. The cam groove 70 in the cam disk 34 is preferably so shaped that at each rotation of the main shaft the slide 66 is caused first to move relatively to the cutter carrier head 40 at the beginning of the downward movement of the head to cause the cutters to move simultaneously toward a line through their pivots and thus to close upon and grip a strip of fastening material lying between them; then to move with the head to hold the cutters positively from movement in either direction relatively to the head while they are being carried downward by the head to force the end of the strip into the work; then to move relatively to the head to cause the cutters to sever the strip after the end has been inserted to the desired point and finally to move relatively to the head to cause the cutters to separate to permit them to pass freely over the strip in their upward movement. In the construction shown, the gripping movement of the cutters is effected by so shaping the cam groove 70 that the slide 66 holds the cutting edges of the cutters substantially stationary while the outer ends continue to move with the cutter carrier head. This insures the simultaneous gripping of a plurality of fastening strips which may lie between the cutters, provided the strips are also held stationary at this time, since there is no relative movement of the strips and cutters lengthwise of the strips during the gripping movement of the cutters. This prevents also scraping of the sides of the strips at the time they are gripped. The cutters are actuated to sever the strip in a similar manner. Between the gripping and severing actions of the cutters the strip is held gripped by them, and to prevent releasing of the strip and premature severing action of the cutters, the cam groove 70 is preferably so shaped that at this time it causes the cutting edges of the cutters to move downward at substantially the same speed as the cutter carrier head. As the cam roll 68 is confined in the cam groove 70, the entire control of the cutters through the slide 66 is obviously positive, this being the preferable construction in a machine intended to run at high speed.

It will be observed from the foregoing description that the cutters are actuated to grip the strip always at the same point in their path of movement. If, therefore, the strip remains stationary after being released by the cutters the successive fastenings severed from it will be all of the same length. Provision is therefore made for varying the distance from the end of the strip of the point at which it is gripped by the cutters by moving the strip more or less relatively to the point in the path of their movement at which the cutters are actuated to grip the strip. In the construction shown, a strip retainer 80 is mounted to slide vertically between the fork members of the slide 66. Provision is also made for movement of the retainer 80 transversely of the slide 66 for a purpose hereinafter set forth. The retainer 80 is provided with a plurality of strip passages formed by adjacent grooves 82 in the grooved members 84, 86, 88, 90 (see Fig. 7), each of the passages being shaped to correspond with the shape of the strip which is to pass through it. The passage formed by two adjacent grooves is made somewhat smaller than the strip for which it is intended so that when the grooved members are pressed toward each other the strip will be frictionally held by them. A curved spring 92, bearing at its ends upon the outer grooved member 90 and pressed against the member 90 with more or less force by an adjusting screw 94, causes all of the grooved members to press upon the adjacent strips and thus yieldingly hold them from movement relative to the retainer.

A slide 96 mounted in the back part of the swinging frame 24 has forwardly projecting fork members 98 upon which the retainer 80 is slidingly mounted for movement transversely of the forked slide 66. The fork members 98 are confined in grooves in the sides of the retainer 80 whereby the retainer is compelled to move with the slide 96. The slide 96 is provided at its back with curved rack teeth 100, concentric with the center of oscillation of the swinging frame 24, whereby they may swing with the frame 24, relatively to the teeth upon the adjacent end of a lever 102 with which they are constantly in engagement. The lever 102 is loosely mounted upon a bushing or sleeve 101 attached to a second lever 132, said bushing being mounted upon a hollow stud 103 in which is mounted a rock shaft 104 extending transversely through the machine frame. At its end remote from the slide 96 the lever 102 carries a cam roll 106 which engages successively when the machine is in operation cam members 108 upon a cam disk 110. The downward movement of the lever 102 is limited by a stop 105 formed upon the machine frame, the amount of movement permitted to the lever being such that the cam roll 106 never comes quite into contact with the periphery of the cam disk 110, even though there be no fastening length controlling cams in position thereon. This limitation of the movement of the cam roll 106 toward the cam disk 110 overcomes the necessity of making the cam members 108, hereinafter to be described, very thin in any part when it is desired to provide with such cams a movement of the retainer 80 into substantially its lowermost position. When the machine is operating to insert fastenings, the cam roll 106 is held in contact with the cam members 108 by a spring 112 bearing at one end upon the head 12 and at its other end upon the under side of the lever 102. The cam disk 110 is mounted upon a shaft 114 driven by a worm gear 115 from a worm 116 upon the main shaft 14. In the construction shown, the speed ratio of the shaft 114 to the main shaft 14 is as one to six, and the cam disk 110 is accordingly provided with six cam members 108, so spaced about its periphery that one of them operates upon the cam roll 106 at each rotation of the main shaft 14. The amount of movement imparted to the retainer 80 through the slide 96 and the lever 102 by a cam member 108 depends obviously upon the shape of the said cam member, especially upon the amount of its extreme projection from the periphery of the cam disk. By shaping the cam members 108 so that the retainer 80, and with it the fastening strip, or strips, is moved lengthwise more or less relatively to the point in the path of their movement at which the cutters are actuated to grip the strip, or strips, and is kept in the relative position into which it has been moved until after the strip, or strips, has been gripped by the cutters, a different length of fastening may be obtained from that which would be produced by the normal relative movement of the cutters to a stationary strip or strips. By making different cam members 108 about the periphery of the cam disk 110 of different shapes, successive fastenings of different lengths may be formed. In the construction shown, six different lengths of fastenings in succession are possible, but the number may obviously be varied by constructing the machine with a different speed ratio between the main shaft 14 and the shaft 114.

Within the capacity of the machine as constructed, the order as to lengths in which the fastenings are to be inserted may obviously be varied as desired. As shown in Figs. 17 and 18 each cam member 108 is provided with a shank 109 which fits into a radial groove 111 on the side of the cam disk 110, adjacent to another cam disk 400 also attached to the shaft 114. A spring tongue 113 holds the cam member 108 frictionally in place. The positions of the cam members 108 on the periphery of the cam disk 110 may thus be readily interchanged or the cam members may be replaced by others of different thicknesses, or, if it is desired to insert successively fastenings of the greatest lengths, provided for by this method of varying the length of the fastenings, the cam members may be altogether removed.

The machine herein illustrated is constructed to provide, by the method of determining fastening lengths just described, a fastening of a length of one-half inch as a maximum, this being the longest fastening usually required for the class of work for which this type of fastenings is used. Occasionally, however, there is a demand for a machine which will insert a fastening of this type ⅝ of an inch long. To avoid the necessity for providing a nail length adjustment of the kind just described which will permit of the formation of a ⅝ inch fastening, means is preferably provided also for varying the length of the fastening in a different manner, this means being preferably so constructed and arranged that it may be used to add its variation to the maximum length of fastening produced by the first-described means and method. It will be noted that the fastening measuring relative movement of the strip retainer and the cutters with the first method of varying fastening lengths takes place during the inoperative movement of the cutters. It will also be noted that the cutters, during their operative movement, pull the fastening strip through a comparatively stationary retainer, the extreme length of material pulled through the stationary retainer being determined obviously by the extreme relative movement of the cutters and retainer after the cutters have beent actuated to grip the strip. By increasing this relative movement, the length of material pulled through the retainer can obviously be increased. Provision is therefore made, when it is desired to produce an extra long fastening, for moving the retainer away from the cutters at the same time that the cutters are pulling the strip through the retainer. The illustrated means for effecting such positive movement of the retainer away from the cutters comprises a modified fastening length cam 1080 which has a raised portion 1082 so located about the periphery of the cam disk 110 that it serves to lift the retainer, thereby pulling it over the fastening strip at the same time the strip is being pulled through the retainer by the downward movement of the cutters after they have gripped the strip. Inasmuch as the cutters are actuated to grip the strip always at the same point in their path of movement and as the retainer is preferably always in a fixed position with respect to this point when the cutters grip the strip, it will be seen that if more of the strip has been pulled through the retainer than would be pulled through by the usual movement of the cutters relatively to a stationary retainer the extra length of material will lie below the cutters at the time they are actuated to grip the strip, and therefore the next fastening formed after the strip has been given its extra pull through the retainer will be longer than it would have been if such pull had not been given. The extra length if sufficient will be fed into the awl hole in the work as the retainer comes back to its lowermost position.

In Fig. 19 is shown a toplift in which the fastenings are inserted in a series made up of groups, each group comprising four short fastenings and one long fastening, formed by the first method above described, and one extra long fastening formed by the second method above described. This order of lengths is produced by the arrangement of cam members shown in Fig. 18, the long fastening being produced simply by the movement of the roll 106 as far as it is permitted to move by the stop 105 toward that part of the cam disk 110 from which the cam has been removed and the extra long fastening being produced both by the movement of the roll 106 as far as it is permitted to move by the stop 105 and by the previous movement, during the partial insertion of the preceding fastening, of the strip retainer 80 over the fastening strip. It is obviously not necessary to remove entirely a cam member to produce a long fastening or a relatively long fastening since a cam member having a comparatively low surface could be used for this purpose. The long fastenings constitute very effective securing means for a toplift which is to be provided with a row or rows of fastenings for ornamental or wear-resisting purposes, or both, and as only a few long fastenings properly distributed are necessary for this purpose a great saving of material is permitted. In the construction shown a single fastening length controlling means is provided for all the different rows of fastenings which the machine is constructed to insert simultaneously. It is obvious that by providing a separate retainer for each fastening strip and separate length controlling means for each retainer it will be possible to insert simultaneously in a plurality of rows fastenings of different lengths.

The cutters 46, 48 for each strip are preferably made wide enough to insert and sever fastenings in more than one row at a time and in the construction shown they are made wide enough to insert and sever fastenings in two rows at a time. Preferably a plurality of sources of fastening supply is provided. In the construction shown, three sources of supply are provided from which are drawn three strips $w$, $x$, $y$, of fastening material. These strips may be alike or they may differ in size, shape or nature as desired. The strips are passed down through the retainer 80 and through passages in a presenter 117, these passages being spaced apart the distance apart it is desired to have the rows of fastenings. The passages are shaped to correspond with the shape of the fastening strips which are passed through them, and as shown in Fig. 13 are formed by adjacent grooves in two blocks 118, 119 confined in a space formed by recessing the adjacent faces of the two members 120, 121 of the presenter and are held against vertical movement relative to the presenter by laterally projecting lugs resting in offset portions of the said recesses.

The presenter 117 is mounted between the fork members 72 and 74 of the slide 66, the adjacent sides of the presenter and the fork members having interlocking tongues and grooves which permit of movement of the presenter transversely of the slide 66 and likewise transversely of the cutter head 40 whereby the fastening strips are moved relatively to the cutters 46 and 48. The strips may thus be moved so that fastenings from the same strip may be inserted in different rows, or fastenings from different strips in the same row, or they may be moved to place one or more beyond the reach of the cutters, and again within reach, whereby different spacings of the fastenings in any row may be effected. By thus varying the relative positions of the fastening strips to the inserting mechanisms whereby fastenings may be selected from different sources of supply for insertion in the same row or from a single source of supply for insertion in a plurality of rows, or both with the attendant possibilities of varying the spacing of the fastenings in the different rows, the possibility for variety in design effects is comparatively great. Moreover fastenings of selected lengths may be taken from selected sources of supply.

Extending upward from the presenter 117, as shown in Fig. 1, is an ear 122 which enters a groove 123 (see Fig. 7) in the retainer 80 and compels movement of the retainer with the presenter transversely of the slide 66.

Means is preferably provided for causing the presenter to present the fastening strips to the inserting mechanism in predetermined order. In the construction shown, the presenter has an L-shaped rearward extension 124 which engages a vertically extending slot 126 in a vertically extended portion at the front end of an actuator bar 128. Mounted in a guideway in the actuator bar 128 is a rack-toothed bar 130 with the teeth of which engage the corresponding teeth upon the lower end of the lever 132, hereinabove referred to. The lever 132 carries at its upper end a cam roll 134 which travels in a pattern cam groove 136 formed on the side of the disk 110 away from the disk 400 hereinafter to be described. The cam groove 136 is so shaped as to impart to the rack-toothed bar 130, through the lever 132, an oscillating movement. Different shaped cams may be used to cause the oscillating movement to extend over two or more rotations of the main shaft as desired within the capacity of the machine, as determined by the speed ratio between the shaft 14 and the shaft 114, or to cause the oscillating movement to be variously modified or broken up so long as the actuator bar 128 is not moved by the rack-toothed bar 130 while the fastening strip is gripped by the cutters. The cam disk 110 in which the cam groove 136 is formed is continuously rotated through its connection with the main shaft 14.

Means is provided for connecting the presenter actuating bar 128 and the bar 130 so that the bar 128 will partake either of the full reciprocating movement of the bar 130 or of the movement in one direction only. As here shown two dogs 138 and 140 are pivoted to the actuator bar 128 and are adapted to engage shoulders 142 and 144 on the under side of the rack-toothed bar 130 for connecting the two bars together. When both of said dogs are in operative position the actuator bar will partake of the full reciprocating movement of the rack-toothed bar, and the presenter 117 will be moved into different positions to present different selections of fastenings to the inserting mechanism in accordance with the layout of the cam groove 136. When the dog 140 is inoperative, the actuator bar and the presenter will be moved rearwardly or to the right as shown in Fig. 5 by the rack-toothed bar and will remain in this position until the dog 140 is again moved into operative position, the rack-toothed bar meanwhile reciprocating back and forth in the guideway in the actuator bar without imparting any movement to said actuator bar and consequently only one selection of fastenings will be inserted successively. When the dog 138 is inoperative, the actuator bar and the presenter will be moved forwardly or to the left in Fig. 5 and a different selection of fastenings will be inserted successively until the dog 138 is again moved into operative engagement with the reciprocating rack-toothed bar. It will be understood that in the embodiment of the invention herein illustrated the friction between the movable parts is relied upon to control the presenter to maintain it in a predetermined position after its disconnection from its positive actuating means. The means for actuating the rack-toothed bar and the connection between the rack-toothed bar and the actuator bar are substantially the same as in the co-pending application hereinbefore cited.

The operative and inoperative positions of the dogs 138 and 140 are controlled by two plungers 148 and 150, sliding in openings in the support 146 for the actuator bar and bearing upon the under side of the dogs. The dogs are held yieldingly in their lowermost position both by gravity and by the action of a spring 141 bearing upon their inner ends above their pivots.

For governing the operative and inoperative positions of the dogs 138 and 140 a controlling or governing device 151 is pivotally connected by a bolt 154 to the machine frame. This device preferably comprises a ring 156 that is adapted to support the plungers 148 and 150 to bear upon the dogs 138 and 140 and move them into the recesses of the rack-toothed bar, said ring having a high portion $h$ and a low portion $l$, as shown in Fig. 6. A handle 158 projecting from the controlling device 152 is provided with a detent 160 which engages notches formed in the stationary part of the head of the machine for preventing accidental movement of said device. When the detent is in engagement with the notch at the left in Fig. 6 the high portion $h$ of the ring 156 will engage the plunger 148 and raise it into the position shown in Fig. 5 and the low portion $l$ of the ring will come beneath the plunger 150 and permit it to assume the position also shown in Fig. 5. When the detent is in engagement with the recess on the right in Fig. 6 the plunger 150 will be raised and the plunger 148 lowered. When the detent 160 engages the central recess both dogs will be locked to the slide bar 130 to reciprocate with it. It will be noted that the presenter cam groove 136 is formed in the cam disk 110 which carries the fastening length controlling cam members 108 and that, therefore, the selection of fastenings from the different sources of supply bears a determined relation to the lengths of the fastenings when the presenter is moved by its cam groove. It will be readily understood, therefore, that with this construction fastenings of predetermined lengths may, if desired, be taken from predetermined sources of supply and that, for example, the long fastening, hereinabove referred to, might be formed from that one of the fastening strips which has the best holding properties.

From the foregoing description it will be observed that the machine thus far described comprises, among other things, fastening inserting mechanism consisting of means for gripping, inserting and severing a fastening from the end of a continuous strip of fastening material, means for presenting one or more strips to the inserting mechanism in varying succession, both as to the number of strips and as to the relative location of the strip or strips to the gripping and severing mechanism, and means for automatically controlling the lengths of the successive fastenings inserted. As hereinbefore suggested, it is unnecessary with an inserting mechanism of the type herein disclosed to provide a fastening receiving opening for the fastening when the machine is working under usual conditions as to work and as to the material of the strip from which the fastenings are being severed. However, under special conditions such, for example, as when the machine is operating upon work having a hard surface, or upon work that is hard throughout, or when the material of the strip from which the fastenings are to be formed is comparatively soft, it is preferable, in order to avoid occasional imperfect insertion of a fastening such as the buckling of the fastening as it is being inserted or its insertion at an oblique angle to the surface of the work instead of at a right angle, to form in advance of the inserting operation a fastening receiving opening to permit the more ready insertion of the fastening and to guide the insertion in proper direction. Means is therefore provided in the present machine for forming in the work in advance of the fastening inserting operation a fastening receiving opening and the illustrated means comprises an awl 162 arranged to be brought into and out of operative position beneath the inserting mechanism, preferably beneath one of the cutters. The awl 162 has an obliquely offset stem 164 which is clamped by means of a screw 166 in an awl carrier 168 pivoted at 170 upon a slide bar 171 in the swinging frame 24, the awl carrier being arranged to swing about its pivot 170 toward the left in Fig. 3 to bring the awl into position so that the cutter 46 may strike a ledge 172 formed in the stem directly over the awl point and thereby drive the awl into the work. The forward and backward movement of the awl is guided between guides 174, 174 carried by the swinging frame 24. The awl stem 164 is provided at its rear end with a shoulder 167 (see Fig. 4) which engages a pin 169 (see Fig. 39) driven into the carrier 168 whereby the awl may readily be brought into proper alinement with the cutters as its stem is inserted in its opening in the carrier.

The slide 171 to which the awl carrier 168 is pivoted is arranged above a rearward projection 176 upon the cutter carrier head 40. When the awl carrier is in its forward position so that the cutter 46 engages the ledge 172 the projection 176 engages the slide 171 upon the upward movement of the cutter carrier head and serves to lift the awl carrier and with it the awl to remove its point from the fastening receiving opening formed by it in the work. When the awl is withdrawn rearwardly from its operative position beneath the cutter 46 an offset portion 178 of the awl carrier engages a correspondingly shaped seat 180 upon the frame when the slide 171 is at the upper limit of its movement, this seat being so inclined that the slide is pushed a short distance farther upward whereby it is removed entirely from the path of the projection 176. The slide and its attached awl carrier will, therefore, remain stationary during the succeeding reciprocations of the cutter carrier head, this head, as hereinbefore mentioned, being arranged to be kept normally in motion. The awl carrier is moved forward into operative position and withdrawn from operative position by means of a rod 182 pivotally connected at one end to the said carrier and at its other end to an arm 184 rigid with a rock-shaft 186 in the machine frame. The rock-shaft 186 at its other end is provided with an arm 188 which carries a cam roll 190 traveling in a cam groove 192 formed in one side of a cam disk 194 constituting a part of the actuating mechanism through which the starting and stopping of the insertion of fastenings is controlled.

The actuating mechanism, just referred to, constitutes one of the most important features of this invention. One of the difficulties which it is sought to overcome by the actuating mechanism here provided is that of controlling a high speed fastening inserting machine so that it will do neither incomplete work nor too much work.

In this machine, as in the machine of Letters Patent No. 1,012,811, dated Dec. 26, 1911, the work support or horn is lowered sufficiently after each fastening inserting operation to permit the work to be fed freely thereover and is then raised to clamp the work in position to receive the fastening or fastenings. In the illustrated construction the work support is preferably restored to its work clamping position by the action thereon of a strong spring, this construction providing means for quickly bringing to bear upon the work support a large amount of stored-up energy. The mechanism for lowering the horn against the tension of its restoring spring to permit the feeding of the work comprises a lever 212 fulcrumed on a pin 214 in the head of the machine and having a roll 216 that travels in a cam groove 218 in the face of the pulley 16. The lever 212 oscillates continuously while the main shaft rotates. Fulcrumed on the pin 214 and straddling the lever 212 is a bifurcated lever 220 connected by a rod 222 with one end of a lever 224 in the base of the machine. The horn H is connected to the other end of the lever 224 by means of a rod 226. The bifurcated lever 220 is provided with a curved surface concentric with the fulcrum pin 214 and between said curved surface and a straight face 213 on the lever 212 a roller 236 is adapted to be interposed for locking said levers together so that when the lever 212 moves upwardly the bifurcated lever 220 will move with it to depress the horn against the action of the spring 268 hereinafter to be described. The curved surface upon the lever 220 and the straight face 213 on the lever 212 together with the roller 236 provide an automatic work thickness compensating adjustment whereby the said two levers are locked together in such manner at each rotation of the main shaft 14 that they produce uniform depression of the horn H for successive work feeding operations. The work thickness compensating operation of the mechanism just described will be readily understood when it is noted that the position of the lever 220 at the time the lever 212 is locked to it is determined by the distance the tip end of the horn is forced away from the work abutment to accommodate itself to the thickness of the interposed work. The construction of these levers and their actuating means is similar to the construction of those shown in Letters Patent No. 1,012,811 except that in the present construction the levers are locked together for movement upwardly together, whereas in the construction shown in the said Letters Patent the said levers were locked together for movement downwardly together. The roller 236 is carried in a yoke on the end of a rod 240 mounted in a carrier 242. The carrier 242 is mounted for vertical movement in guiding grooves in the machine head and is provided upon its inner side with an inclined groove 250 with which engages a correspondingly inclined tongue 252 on a horizontally moving slide 254 whereby vertical movement is imparted to the carrier through a horizontal movement of the slide. The slide 254 is connected at its forward end by a link 256 with one arm 258 of a three-armed lever pivoted at 260 upon the machine head. A second arm 262 of the three-armed lever is connected by a rod 264 with a block 266 pivoted upon the lever 224 near its rear end. The rod 264 is headed at its lower end and is adapted to slide freely in an opening in the block 266. A spring 268 surrounding the rod 264 and confined between the block 266 and a nut 270 upon the threaded upper part of the rod is adapted to transmit the movements of the arm 262 to the lever 224. The third arm 272 of the three-armed lever carries at its outer end a cam roll 274 bearing against a cam 276 on the cam disk 194. A spring 277 connected at one end to the lever 224 and at the other end to a bracket 279 upon the standard 10 tends to keep the roll 274 in contact with the cam 276.

The cam disk 194 is loosely mounted upon the shaft 114 and is provided also with the awl controlling cam groove 192 hereinbefore described and an edge cam with which coöperates a cam roll 280 carried by an arm 282 upon a rock-shaft 284 journaled in the machine head. The arm 282 is extended upon the other side of the rock-shaft and a spring 285 connected to the end of said extension and to the machine head serves to press the cam roll 280 yieldingly against the edge cam upon the cam disk 194. At its inner end the rock-shaft carries a finger 286 which enters a slot 288 in the rear end of a sliding bolt 290. The cam disk 194 is arranged to be connected with the shaft 114 to rotate therewith by means of a clutch of the general type known as the "Horton" clutch. The illustrated clutch differs, however, in many respects from the ordinary Horton clutch and contains many important features of novelty which render it especially adaptable to a construction having the purpose of the illustrated construction. Inasmuch as the shaft 114, to which the cam disk 194 is to be clutched to effect an actuation of the various mechanisms which coöperate in the fastening inserting operation of the machine, rotates once for every six rotations of the main shaft 14, it is important not only that the cam disk be clutched to the shaft 114 at a particular angle of its rotation, but that a plurality of such selected clutching points be provided in order that a clutching may be effected if desired at any rotation of the main shaft 14. Since, as stated above, the main shaft rotates six times for every rotation of the shaft 114, it is preferable that six clutching points be provided and in the illustrated construction six points are provided. Upon the shaft 114 is carried a hexagonal clutch member 292 between which and a clutch casing 294, attached to the cam disk 194, are arranged clutch rollers 296. A portion of the interior of the clutch casing 294 is concentric with the shaft 114. Other portions of this interior are, however, eccentric to the shaft 114 and of these portions there are six located at points 60° apart around the shaft 114. These eccentric portions upon the inner side of the casing 294 are so arranged with respect to the cams upon the cam disk 194 and with respect to the hexagonal member 292 upon the shaft 114 that when one of the rollers 296 is locked between one of the eccentric surfaces and one of the angular portions of the hexagonal member, all of the rollers will be similarly locked and the cams upon the cam disk 194 will bear such a relation to the main shaft 14 that the parts controlled by said cams will be brought into operative relation to the parts normally driven by the main shaft at the proper times.

Clutching of the cam disk 194 to the shaft 114 is effected through the following mechanism: Loosely mounted upon the end of the shaft 114 is a roller cage 298 between the inwardly projecting portions of which the rollers 296 are confined, and this cage is provided with an arm 300 by which it may be turned to effect a movement of the rollers relatively to the clutch casing 294. Surrounding the clutch casing and confined in a groove near the outer edge of it is a spring 302, one end of which bears against the upper side of the arm 300 and tends to turn the roller cage in the direction to effect a clutching of the cam disk 194 to the shaft 114. The cam disk 194 is, however, not clutched to the shaft 114 except when it is desired either to start the insertion of fastenings, or after the insertion of fastenings has been started to stop it. Means is therefore provided for holding the roller cage 298 out of the position in which it effects a clutching of the cam disk 194 to the shaft 114. Preferably the means for holding the roller cage out of the position in which it effects a clutching of the cam disk 194 to the shaft 114 comprises means for maintaining the cage in such relation to the said disk and shaft also when the machine has been rendered operative to insert fastenings and it is desired to insert several fastenings in succession. The illustrated means comprises a lever 304 pivoted at 260 upon the machine head and forked at its outer end to embrace the roller cage 298. The fork member 306 of the lever 304 is arranged to engage the arm 300 of the roller cage 298 when the machine is not operative to insert fastenings and to hold the cage out of the position in which it effects a clutching of the cam disk 194 to the shaft 114. The rotation of the cam disk 194 through an angle of approximately 180° is sufficient to place all the mechanisms controlled by it in operative relation to those mechanisms which are constantly operated from the main shaft and the rotation of the cam disk 194 through a second angle of 180° serves to restore the mechanisms controlled by it to their inoperative relations to the mechanisms operated from the main shaft. If, therefore, it is desired to insert several fastenings in succession it is essential in the construction shown that the rotation of the cam disk 194 be interrupted after it has traversed an angle of substantially 180° and for this purpose the other fork member 308 of the lever 304 is provided with a hook 310 which can be moved by the operator into the path of the arm 300 of the roller cage 298 as said cage turns with the clutch casing 294 after the cam disk 194 has been clutched to the shaft 114.

Means is provided by which the operator can turn the lever 304 to move the fork member 306 out from beneath the arm 300 of the roller casing 298 to permit the spring 302 to turn the casing in the direction to effect a clutching of the cam 194 to the shaft 114 and at the same time move the other fork member 308 into position to bring its hooked end 310 into the path of the arm 300 as the clutched parts begin to rotate with the roller casing. To the other arm of the lever 304 is connected a member 312 having a socket in which is received the upper end of a rod 314 connected at its lower end to the rear end of the treadle 316, said treadle being normally maintained in its uppermost position by a spring 318. A collar 320 clamped upon the rod 314 is connected by a toggle 322, 324 to the member 312. Threaded through an off-set portion of the member 312 is a set screw 326 by which the movement of the toggle in the outward direction may be adjustably limited so that the amount of movement required to break the toggle may be varied. A spring 328 connected at one end to a hook 330 upon the lower arm of the lever 304 and at its other end to the bracket 279 upon the standard 10 tends to move the socket in the member 312 down over the rod 314, thus causing the lever 304 to turn about its pivot 260, this relative movement of the member 312 and the rod 314 being prevented by the toggle 322, 324 when it is in its straightened position. A light spring 332 tends to restore the toggle to its straightened position when it has been broken by mechanism hereinafter to be described.

As hereinbefore suggested, a convenient way in which the machine may be rendered inoperative to insert fastenings is to cause the fastening strip to be moved with the gripping mechanism in such manner that there is no fastening measuring relative movement of the strip and the gripping mechanism, the gripping mechanism being thus prevented from closing upon the strip to insert and sever a fastening. The illustrated means for causing the fastening strip to move with the gripping mechanism comprises means for locking the fastening strip retainer 80 to the slide 66 which, as hereinabove described, reciprocates for the most part with the head 40. The illustrated means comprises a locking pawl 340 pivoted at 342 upon the retainer carrying slide 96 and having a pin 344 which enters a vertical slot 346 in the forward end of the sliding bolt 290. The vertical slot 346 permits the vertical movement of the pin 344 with the retainer carrying slide 96. When the arm 282 upon the rock-shaft 284 is moved toward the left in Fig. 2 under the action of the spring 285 as the lower part of the edge cam formed on the cam disk 194 comes beneath the cam roll 280, the finger 286 upon the other end of the rock-shaft 284 will move toward the right in Fig. 5, thus moving the sliding bolt into its rearmost position and withdrawing the locking pawl 340 out of its position over the ledge 348 upon the back side of the slide 66. This movement of the pawl 340 out of locking relation to the ledge 348, being effected through the agency of the spring 285, will take place only when the head 40 is approximately at the lowest point in its reciprocating movement. In the position of the parts just described the fastening strip retainer 80 and the cutters are permitted to move relatively to each other in a vertical direction, and the cutters are thus permitted to grip, insert and sever a fastening from one or several of the fastening strips in accordance with the transverse position of the retainer. When the arm 282 is in the position in which it is shown in Fig. 2 the finger 286 has been moved toward the left in Fig. 5 and the pawl 340 has been brought into engaging position over the ledge 348 so that when the head 40 and slide 66 move upwardly, at which time the cutters are ordinarily carried over the fastening strip, or strips, to measure off the length of the fastening, or fastenings, which is next to be inserted, the fastening retainer 80 will be carried up also with its carrying slide 96 and the cutters will thus not be permitted to move relatively to the fastening strips in a vertical direction. The insertion of fastenings will thus be interrupted while the mechanism for inserting fastenings is still in motion.

In the present machine, as in ordinary machines for inserting fastenings, a gage is provided for determining the distance from the edge of the work at which the fastenings shall be successively inserted and the illustrated gage is indicated at 350. In addition to the gage for determining the distance from the edge of the work of the fastenings to be inserted another gage is preferably provided for affording in connection with the gage 350 a two-dimensional determination of the position, upon the work of the first fastening, or fastenings, to be inserted. The provision of this second gage is important when the machine is to be used to insert a row of fastenings which starts from one corner of a piece of work and follows the edge of the work to a second corner or to any intermediate point, as for example, when the machine is to be used to insert a row of fastenings in the top-lift of a heel for purposes of ornamentation.

As hereinbefore pointed out, the row of fastenings formed by this machine is made up of fastenings successively inserted, the work being fed past the inserting mechanism between successive inserting operations and it is, therefore, important that the means for determining the distance from the starting end of the work be moved out of the path of the work as soon as the insertion of fastenings begins. The illustrated gaging means, therefore, comprises a member, extending into the path of the work when the machine is inoperative to insert fastenings and against which one side or end of the work may bear while another side or end bears against the edge gage 350, said member being so constructed and arranged that it is automatically withdrawn from the path of the work as the insertion of fastenings is started. For convenience this member will be referred to hereinafter as an end gage. The illustrated end gage comprises a bar 352 slidably mounted in a casing or support 354 pivotally attached to the machine head at 355, a pin 356 carried by the bar 352 and extending through a slot 358 in the casing 354 serving to limit the movement of the bar in either direction. The pivot 355 may be in the form of a set screw or other suitable means by which the casing 354 may be clamped in the position shown in Fig. 2. A spring 360 attached at one end to the pin 356 and at its other end to the under side of the casing tends to hold the bar 352 normally in its foremost position. This position of the bar 352 is illustrated in Figs. 20, 21 and 23 and is the normal position of the bar when the machine is inoperative to insert fastenings. When the machine is rendered operative to insert fastenings the bar is drawn back to its rearmost position and the illustrated mechanism for thus withdrawing the bar from its foremost position comprises a member 362 pivotally connected to the lower end of the awl controlling arm 184, said member having at its forward end two lugs 364, 366 which lie respectively above and below a slide 370 hereinafter to be described. Pivoted at 372 upon the casing 354 is a lever 374 having at one end a pin 376 arranged to travel in a lateral recess in the rear end of the bar 352 and having at its other end a pin 378 extending into the path of the lug 366 as said lug is moved forward by the awl controlling arm 184. When the machine is rendered operative to insert fastenings and the awl is moved into operative position by the arm 184, the lug 366 is moved into engagement with the pin 378 and the lever 374 is rotated about its pivot 372, thus bringing the pin 376 into engagement with the rear end of the lateral recess or slot in the bar 352 and the bar is withdrawn from the path of the work. This position of the described parts is shown in Figs. 24 and 25.

When the machine is operating to insert a continuous row of fastenings along the edge of a piece of work or when the last fastening to be inserted near one corner of the work is one of several successively inserted to form a row, it is desirable that this fastening be accurately spaced from the end of the work as well as from its lateral edge. Difficulty has, however, usually been experienced in thus accurately spacing the last fastening to be inserted from the end of the work when several are being inserted in succession, and therefore an important feature of the present construction is the provision of means for automatically stopping the insertion of fastenings at a predetermined distance from the end of the work as the row of successively inserted fastenings approaches such end. The illustrated means comprises a member yieldingly pressed normally into engagement with the edge of the work in such manner that when it reaches a corner of the work it will be pressed forward over the edge at this corner, said member being connected with means by which the insertion of fastenings is automatically interrupted as it is moved forward over the corner of the work. The illustrated member comprises a slide 380 mounted in the casing 354 and shaped at its rear end to fit the forward end of the slide 370 to which it is arranged to be locked by means of a lever 382 pivoted to its rear end and having a pin and slot connection with a second lever 384 pivoted upon the slide 370, the slot 386 in the lever 382 permitting a relative movement of the slide 380 and the slide 370 when the two slides are not locked together. The lever 384 is hook-shaped at one end and is provided with a handle 387 at this end by which it may be turned to bring the two levers either into the position in which they lock the slides together or into the position in which the slides are free to move relatively to each other. When the levers 382 and 384 are in the last-named position, that is, when they are in the position in which they permit to the slides 370 and 380 relative movement, the hook upon the lever 384 is arranged to engage a pin or stop 389 upon the casing whereby the slide 370 is kept from forward movement under the action of the spring 388. The lever 382 is also hook-shaped at its outer end and when the two levers are in the position last described the hook upon the outer end of the lever 382 engages the pin 376 upon the lever 374, this pin extending through the lever 374 to its under side for this purpose. When the described locking means is in the position shown in Figs. 20, 21, 22 and 24 the slide 380 may move relatively to the slide 370, and when the parts are in the positions shown in Figs. 23 and 25 the slides 380 and 370 are locked together to move together. A spring 388, connected at one end to a lug 390 upon the casing 354 and at its other end to an upstanding lug 392 upon the slide 370 tends to move both the slide 380 and slide 370 forward when the two are locked together. When the slide 380 and the slide 370 are locked together, as shown in Figs. 23 and 25, the slide 380 will remain in the position shown in Fig. 23 until the machine is rendered operative to insert fastenings, it being maintained in this position by the engagement of the lug 364 of the member 362 with the upstanding lug 392 upon the rear end of the slide 370. When the slides are locked together, as just described, the slide 380 will be permitted to be moved forward under the action of spring 388 into the position shown in Fig. 25 as the machine is rendered operative to insert fastenings and the member 362 is moved forward by the arm 184. If, however, a piece of work has been placed in position, as shown in Fig. 23, the slide 380 will be prevented from moving forward into the position shown in Fig. 25 until the work has been fed into the position of the piece of work shown in Fig. 25. As the slide 380 is thus permitted to move forward, the bar 352 will be withdrawn from the path of the work.

When the machine is being employed to insert fastenings to form a design which does not comprise merely a continuous row of fastenings, for example, when it is being employed to do what is known as "quarter slugging" in which a row of fastenings is driven part way around the heel, and then the heel is moved along until the second breast corner comes in to position adjacent to the inserting mechanism, and a single fastening, usually, is inserted near this corner, it is desirable that this fastening be accurately spaced from the said corner in order that the designs upon the two heels of a pair may be substantially symmetrical with respect to each other. When the machine is being used in the manner just described the insertion of fastenings is usually stopped after a row has been driven partly around the heel and is then again started to effect the insertion of the single fastening. It is, therefore, not advantageous to use the automatic stopping mechanism just described for the purpose for which it is primarily intended and advantage is therefore taken of its position in the machine to use the slide 380 which constitutes a part of it as an end gage to determine the position from the breast corner of the heel of the last fastening to be inserted of a special design like that hereinabove described. When the slide 380 is to be utilized as an end gage the lever 382 is turned into the position in which it is shown in Figs. 20, 21, 22 and 24. In this position of the parts the slide 380 is permitted to slide relatively to the slide 370 without moving said slide. When a piece of work is placed in position to receive an initial fastening of a series of fastenings, or to receive a single fastening, the slide 380 will be pushed back against the tension of its spring 393 into the position shown in Fig. 21, this movement being limited by the engagement of a pin 395 on said slide with one end of a slot in the casing 354. After the initial fastening, or a row of fastenings, has been inserted and it is desired to drive a fastening in the other breast corner of the heel, the heel is placed in the position shown in Fig. 22 in which the bar 352 is forced back against the tension of its spring 360 and the breast corner of the heel is pushed against the slide 380 as an end gage. As the machine is rendered operative to insert fastenings the lever 374 will be turned into the position shown in Fig. 24 in which it holds the bar 352 in its rearmost position, but the slide 370 will not be moved forward by the spring 388 as it is locked back by the engagement of the hook on the lever 384 with the pin 389. When the lever 374 is turned as just described it will not only draw back the bar 352 but, since at this time the hook upon the lever 382 is in position to be engaged by the pin 376 it will also draw back the slide 380. When the slides 380 and 370 are locked together, as shown in Figs. 23 and 25, and the machine has been rendered operative to insert fastenings, the upstanding lug 392 on the slide 370 will be in such a position that it is adapted, as it is moved forward by the spring 388 from the position shown in Fig. 24 into the position shown in Fig. 25, to strike one arm 394 of an angle lever pivoted upon the support 354 at 396 and to turn said lever about its pivot so that its other arm 398 strikes the toggle 322, 324 near the joint between the two links and breaks it, thereby permitting the spring 328 to turn the lever 304 about its pivot 260 and withdraw the hook 310 from engagement with the arm 300 of the roller cage 298. This permits the clutching of the cam 194 to the shaft 114 and the rotation of said cam with said shaft to throw the various mechanisms controlled by it out of operative relation to the mechanisms driven from the main shaft 14, and the stopping of the insertion of fastenings. It will be noted that this breaking of the toggle and the interruption of the insertion of fastenings takes place automatically as the slide 380 slips over the breast corner of a heel when the row of successively inserted fastenings approaches said corner.

The pivotal attachment of the casing 354 to the machine head permits the casing and the parts carried by it, shown in Figs. 20 to 27 inclusive, to be turned down out of the way when it is desired to get at the under side of the inserting mechanism.

As hereinbefore suggested, the mechanism for controlling the lengths of successive fastenings inserted in such manner that a series of fastenings may be inserted made up of groups comprising fastenings of different lengths arranged in predetermined order ent lengths arranged in predetermined order as to length is especially useful when the machine is employed to insert fastenings in the toplift of a heel, for example, where the main function of the fastenings is ornamentation, but where it is also desired that some of the fastenings be long enough to help hold the toplift upon the heel. In the toplift shown in Fig. 40 of the drawings, the series is shown as made up of groups of six fastenings, each comprising five short fastenings and one long fastening. When a few long fastenings are thus inserted together with many short fastenings, it is desirable that the long fastenings be so distributed over the toplift that they may perform their holding function most effectively. It is especially desirable that a long fastening be inserted adjacent to one of, or each of, the breast corners of the toplift. To insure the insertion of fastenings of a particular length at the point where it is desirable that such fastenings be inserted, it is preferable that the fastening length controlling mechanism be so constructed and arranged that the initial fastening inserted when the machine is rendered operative to insert fastenings may be a selected member of one of the groups of the series of fastenings hereinabove referred to. To this end, in the illustrated construction, means has been provided for so controlling the actuating mechanism with respect to the fastening length controlling mechanism that when the machine is rendered operative to insert fastenings the first fastening inserted will be the long fastening of the group of six fastenings shown in Fig. 40. Inasmuch as the cam disk 110 upon which the fastening length cams 108 are carried is attached to the shaft 114 to which the cam 194 is clutched for effecting an actuation of the mechanism for inserting fastenings, a convenient way in which the actuating mechanism may be so controlled that the machine will insert a long fastening when it is rendered operative to insert fastenings is to provide means for preventing the clutching of the cam 194 to the shaft 114 until said shaft has turned the cam disk 110 into such a position that when the insertion of fastenings is about to begin that portion of the cam disk from which a fastening length cam has been removed will be in fastening length controlling position with respect to the inserting mechanism. The illustrated means comprises a second disk 400 attached to the shaft 114 and provided with radial grooves on its inside adjacent the cam disk 110 into which may be inserted the shanks of clutch controlling cam members 402, a single one of these cam members being shown in Fig. 3, since usually it is desirable to employ only a single member. The cam member 402 is arranged to engage a cam roll 404 upon an arm 406 rigidly attached to the rock-shaft 104 and to rock said arm toward the left in Fig. 3, thus turning the rock-shaft in a direction to move an arm 408 at its other end out of operative position beneath a pin 410 extending inwardly from the roller cage arm 300. So long as the arm 408 is in operative engagement with the pin 410 the roller cage 298 is prevented from turning under the action of the spring 302 even though the fork member 306 be moved out of clutch releasing position beneath said arm 300. The clutching of the cam 194 to the shaft 114 is thus prevented until the cam member 402 upon the cam disk 400 has been rotated into engagement with the cam roll 404 upon the arm 406. The angular position of the cam member 402 upon the cam disk 400 depends upon the number of rotations of the main shaft 14 which intervene between the clutching of the cam 194 to the shaft 114 and the partial insertion of the first fastening. In the illustrated construction the cams upon the cam disk 194 are so arranged with respect to each other and so shaped that the first three rotations of the main shaft after the cam disk is clutched to the shaft 114 are utilized to place the parts controlled by said cams in operative relation to each other and to the parts driven from the main shaft 14, and the first fastening is partially inserted during the last half of the fourth rotation. This computation of the number of rotations preceding the insertion of the initial fastening after the clutching of the cam disk 194 to the shaft 114 is effected excludes, for convenience in describing the relative positions of the parts, a partial rotation at the start, the rotations being counted from the time the head 40 reaches the lowest point in its reciprocation after said clutching has been effected.

The hexagonal clutch member 292 is so positioned upon the shaft 114 with respect to the rotation of the shaft 14 that a clutching of the rollers 296 between it and the eccentric surfaces on the inside of the clutch casing 294 is effected a little before that part of the rotation of the shaft 14, which brings the head 40 to its lowermost position in its reciprocating movement, preferably when the head is about half way down in this part of its reciprocating movement. During the first three rotations of the main shaft 14, after the clutching of the cam disk 194 to the shaft 114, above referred to, the horn is raised into work clamping position by the horn raising cam 276, the awl is moved into operative position beneath the cutter 46, and the pawl 340 is moved out of locking relation to the ledge 348. The movement of the horn into work clamping position is effected substantially during the first two rotations of the main shaft 14 after the cam disk 194 has been clutched to the shaft 114 and, during the first half of the third rotation, at which time the cutter carrier head 40 is moving upward, the awl 162 is moved into position beneath the cutter 46. As the head 40 starts to descend at the beginning of the last half of the third rotation of the shaft 14, the lower portion of the edge cam on the cam disk 194 comes into position beneath the cam roll 280 upon the arm 282. The arm 282 will not, however, be moved toward the left in Fig. 2 by its spring 285 because at this time the friction between the pawl 340 and the ledge 348 is too great to be overcome by the comparatively light spring 285. The arm 282 will not, therefore, be moved toward the left to effect, through the rock-shaft 284, the finger 286 and the sliding bolt 290, a withdrawal of the pawl 340 from locking relation to the ledge 348, until the cutter carrier head 40 has reached approximately the lowest point in its reciprocating movement during this half rotation of the main shaft 14. During this last half of the third rotation of the main shaft also the awl is forced into the work by the engagement of the cutter 46 with its ledge 172 and at the same time the arm 282 is moved toward the left in Fig. 2 by the action of the spring 285, and the finger 286 moves the slide bolt 290 toward the right in Fig. 5, thereby withdrawing the pawl 340 from over the ledge 348 and permitting the fastening strip retainer 80 to move relatively to the cutter carrier head 40, whereby during the first half of the fourth rotation of the main shaft a fastening measuring relative movement of the cutters and the fastening strip, or strips, held by said retainer is permitted, and during the last half of the fourth rotation of the main shaft a fastening, or a plurality of fastenings, is partially inserted and severed by the cutters. If, after depressing the treadle to effect a turning of the lever 304 toward the right in Fig. 2 and thereby a movement of the fork member 306 out of clutch releasing position, the operator takes his foot off from the treadle before the end of the third rotation of the main shaft, which takes place after the clutched parts begin to rotate together, including the partial rotation excluded in the above computation, or after the cam disk 194 has turned through an angle of substantially 180°, the lever 304 will be turned toward the left in Fig. 2, the hook member 310 will be moved out of the path of the arm 300, the fork member 306 will be moved again into said path and the clutch will not be released until the clutched parts have made a complete rotation together.

In the case just described, the awl will be withdrawn from its operative position beneath the cutter 46 during the first half of the fourth rotation after the parts are clutched (returning to the first system of computation) and during the last half of the fourth rotation the pawl 340 will again be moved into locking position over the ledge 348. During the first half of the fifth rotation the feed plate 412, hereinafter to be described, will strike the fastening partially inserted during the last half of the fourth rotation and effect a complete insertion thereof, and during the sixth rotation of the main shaft, after the parts have been clutched, as hereinabove described, the horn will be lowered and the arm 300 will strike the fork member 306 so that a continued rotation of the shaft 114 will cause the roller cage 298 to turn in a direction to effect an unclutching of the cam disk 194 from the shaft 114. To prevent a premature dropping of the horn at this time, owing to the steepness of its cam and the tendency of the spring 268 which effects through the horn a clamping of the work to turn the cam disk 194 about the shaft 114 in the direction of rotation thereof, a second clutch has been provided which prevents a rotation of the cam disk 194 about the shaft 114 in the direction of rotation of said shaft. This clutch is located in the clutch casing 294 and comprises a disk 414 upon the shaft 114, said disk having in its periphery inclined roller receiving recesses 416 in which are rollers 418 pressed by springs 420 toward the more shallow part of said recesses, whereby they tend to become locked between the concentric inner surface of the casing 294 which surrounds the disk 414 and the bottoms of said recesses. It will be noted that these recesses are so arranged that the locking of the clutch casing 294 to the disk 414 takes place only in the direction of rotation of said disk and that therefore the disk is free to rotate relatively to the cam disk 194 when said disk is not clutched to the shaft 114 through the other clutch, hereinbefore described.

The work is fed in this construction as in the machine of Letters Patent No. 1,012,811, above referred to, by the engagement of a member carried by the laterally swinging frame 24 with a partially inserted fastening. The fastening engaging member, hereinbefore referred to as a feed plate, comprises the said plate 412 having an upwardly extending shank 422 slidably mounted in the back part of the cutter carrier head 40 and offset at its upper end, the offset portion lying above a part of the cutter carrier head and furnishing an abutment against which is pressed one end of a coiled spring 424 surrounding a headed bolt 426 connected to the offset portion of the shank. The bolt 426 passes through an opening in a leaf spring 428 confined at its ends between lugs on the swinging frame 24 and against the under side of this spring the other end of the coiled spring 424 presses. In the fastening inserting operation the fastening strips are passed down through an opening or openings in the feed plate 412, the number and the shape of the openings depending upon the nature of the designs which the machine is equipped to insert. In the construction shown, a slot is provided in the feed plate through any part of which the fastening may be inserted. The feed plate 412 is lifted to permit it to pass over the partially inserted fastening after the work has been fed by the engagement of the cutter carrier head 40 with the offset portion of the shank 422 upon the upward movement of the head. When released by the head the spring 424 presses the feed plate down upon the work. The feed plate is also moved positively down upon the work during the fastening inserting movement of the cutter carrier head 40 by the engagement of a portion of the head with the rearward projection at the lower end of the shank of the feed plate to cause a solid portion of the said plate to engage and drive flush with the surface the fastening previously partially inserted. The leaf spring 428 is provided to prevent breakage of the parts should the end of the fastening strip fail to pass through the opening in the feed plate 412 and be forced against the upper side of the plate by the action of the cutters. In such case the leaf spring 428 will be bent down by the pressure of the head of the bolt 426 against its upper side, the work and work support yielding sufficiently under the feed plate to prevent breakage. This construction is especially useful to prevent breakage when the machine is caused to form fastenings without having work in position to receive them.

As pointed out above, the illustrated machine is constructed and arranged to insert fastenings from a plurality of sources of fastening supply, the illustrated sources of fastening supply comprising three fastening strips $w$, $x$, $y$, drawn from coils contained in three reels 430, 432, 434 constructed and mounted in substantially the same manner as the reels disclosed in United States Letters Patent No. 1,001,815 to L. A. Casgrain, granted August 29, 1911, for improvements in reel supports, to which reference may be had for a more detailed description of these parts. The strip $w$ is shown as being circular in cross-section, the strip $x$ as diamond-shaped, and the strip $y$ as square, or rectangular.

In the construction shown, with a plurality of fastening strips of different shapes, such, for example, as those just described, many different ornamental designs, may be produced with slight adjustments or slight changes in the parts. The general principles of operation of the design mechanism herein disclosed are substantially the same as those of the design mechanism disclosed in Letters Patent No. 1,012,811, hereinbefore referred to, and reference may be had to said application for a more complete exposition of the manner of operation of the said design mechanism.

The manner in which the different parts of the machine operate has been described to some extent in connection with the description of the construction of these parts. The operation of the machine as a whole may be briefly described as follows: The machine is made ready for use by shifting the belt from the loose pulley 18 to the fast pulley 16 whereby the main shaft 14 is set in motion. This shaft, together with all of the mechanisms normally connected with it and all of those normally connected with the shaft 114 is continuously operated while the machine is in use. The parts being in the position shown in Fig. 2, the operator presses the toplift of the heel of a shoe against the foot plate 351 with the edge of the toplift bearing against the edge gage 350 and the sole of the shoe extending toward his left hand. The breast corner of the toplift adjacent to the point at which the initial fastening is to be inserted is pressed against the end gage 352 which at this time is in the position shown in Fig. 23 of the drawings. The slide 380 will at this time be in the position shown in Fig. 23 and will be maintained substantially in this position until the insertion of fastenings has reached the other breast corner of the heel. As hereinbefore pointed out, if the forward movement of the slide 380 under the action of the spring 388 is to be utilized to effect through suitable connections with the means for starting and stopping the insertion of fastenings, an automatic stopping of the insertion of fastenings as said slide moves over the other breast corner of the heel, the slides 370 and 380 will be connected together to move together as shown in Fig. 23. The heel having been positioned against the gages and against the slide 380, as shown in Fig. 23, the operator depresses the treadle 316, thereby raising the rod 314 connected therewith and rotating the lever 304 toward the right about its pivot 260. As the fork member 306 of the lever 304 moves out from beneath the arm 300 of the roller cage 298, spring 302 bearing against said arm causes said cage to rotate in a direction to effect a clutching of the cam disk 194 to the shaft 114 so that the cam disk begins to rotate with said shaft if the mechanism for insuring an initial fastening of a particular length is in proper position. The operation of this mechanism will be referred to later on. As hereinbefore pointed out, the clutching surfaces upon the clutch casing 294 and upon the hexagonal clutch member 292 are so located about the shaft 114 that the cam disk 194 begins to rotate with the shaft 114 when the cutter carrier head 40 is about half way down toward the lowest point in its reciprocating movement. As the cam disk 194 begins to rotate with the shaft 114, the three-armed lever will be rocked by the action of the cam 276 on the cam roll 274, the arm 258 will move forward pulling forward the slide 254 and lowering the carrier 242 and the arm 262 will move downward causing the horn H to move upward. When the cutter carrier head 40 begins to move upward during the first half of the third rotation following the clutching of the cam disk 194 to the shaft 114, the horn will have been raised into position to clamp the work against the foot plate 351 and the three-armed lever will have been rocked far enough to cause the roller 236 to be locked between the levers 212 and 220. During this half of the third rotation of the main shaft after the parts are clutched, the cam roll 190 upon the arm 188 of the rock-shaft 186 will move into that part of the cam groove 192 which causes the rock-shaft to be turned and through the arm 184 and rod 182 to move the awl carrier forward and bring the awl 162 into such position that its ledge 172 lies vertically beneath the cutter 46 in position to be struck by said cutter upon its next descent. During the last half of the third rotation of the main shaft after the parts are clutched, the cutter carrier head 40 will descend, the cutter 46 will strike the ledge 172 of the awl 162 and drive the awl into the work to form a fastening receiving opening. As the cutter carrier head starts to descend during this last half of the third rotation of the main shaft, the cam disk 194 will rotate far enough to bring the low part of the edge cam formed upon it beneath the cam roll 280 upon the arm 282 of the rock-shaft 284, thus permitting the spring 285 to turn said rock-shaft 284 in a counter clockwise direction in Fig. 2, as the head 40 reaches substantially its lowest position, whereby the finger 286 is turned toward the right in Fig. 5. As the finger 286 is turned toward the right by the action of the spring 285 upon the rock-shaft 284, it will move the sliding bolt 290 in the same direction and the pawl 340 will be moved out of its position over the ledge 348 upon the slide 66. Up to this time the pawl 340 has served to lock the fastening strip retainer and its carrier to the slide 66 so that there has been no fastening forming relative movement of the fastening strips and the cutters, and thus no fastenings have been formed and inserted. After the sliding bolt 290 has been moved in the direction just indicated and the pawl 340 has been moved out of locking relation to the ledge 348, the fastening strip retainer 80 and the cutters 46 and 48 will move relatively to each other, the amount of such relative movement being determined by the amount of projection from the periphery of the cam disk 110 of the particular cam member 108 which comes beneath the cam roll 106 on the lever 102 during that half of the rotation of the main shaft in which the length of the fastening or fastenings to be inserted upon the descent of the cutter carrier head 40 is measured.

It will be apparent from an inspection of Fig. 5 that the length of the fastening as determined by the first-described method of varying the lengths of fastenings will be greatest when the relative movement of the retainer 80 and the cutters is greatest and that in Fig. 18 the two methods of varying the lengths of the fastenings have been so combined that the length of the fastening will be greatest when there is the least lifting of the retainer during the upward movement of the cutters and the fastening strip has been pulled through the retainer somewhat on the preceding downward movement of the cutters.

The illustrated machine is constructed as hereinbefore pointed out to start the insertion of fastenings when the fastening length controlling cam disk 110 is in such position that the first fastening inserted will be a long fastening. For this purpose the parts are so arranged that the clutching of the cam disk 194 to the cam shaft 114 already described will not take place after the treadle has been depressed and the fork member 306 of the lever 304 has been moved from beneath the arm 300 of the roller cage 298 if the cam disk 110 is not at such an angle of its rotation that when the pawl 340 is moved out from locking relation to the ledge 348, the part of the cam disk 110 which provides a long fastening will not come beneath the roll 106 during the first half of the succeeding rotation of the main shaft 14. In Fig. 5 the machine is shown with the parts in the position in which they will be just before the pawl 340 is moved out from its position over the ledge 348 to start the insertion of fastenings. As the head 40 is shown approaching its lowermost position in this figure and the part of the cam disk 110 which provides a long fastening is approximately in fastening length controlling relation to the cam roll 106, if the cam roll 280 is upon the lower part of the edge cam upon the cam disk 194 the pawl 340 will be about to be withdrawn by the action of the spring 285 upon the lever 282.

As shown in Fig. 3 the cam member 402 which controls the clutching of the cam disk 194 to the shaft 114 by moving the arm 408 out from beneath the pin 410 upon the roller cage arm 300 is so located about the shaft 114 with respect to the cam disk 110 that after the said clutching is effected substantially three rotations of the main shaft intervene between the beginning of the movement of the clutched parts together and the bringing into operative relation to the roll 106 of the portion of the cam disk 110 for which the clutch tripping cam 402 has been set. In the present construction, therefore, during the first half of the fourth rotation following the clutching of the cam disk 194 to the shaft 114 that part of the cam disk 110 from which the cam member 108 has been removed will come into operative relation to the cam roll 106 and therefore, during this half of the fourth rotation aforementioned, the relative movement of the fastening retainer 80 and the cutters will be the greatest provided for with the first described method of varying the fastening length. As the cutter carrier head starts to descend during the last half of the aforementioned fourth rotation of the main shaft, the cam roll 68 upon the slide 66 comes into that portion of the cam groove 70 which causes a relative movement of the slide 66 and the carrier 40 and thereby effects a closing of the cutters upon the fastening strip or strips which lies between them so that as the cutters descend they insert the end or ends of the strip or strips into the work and then sever it or them to form a fastening or fastenings as a result of a succeeding relative movement of the slide 66 and the carrier 40. If the operator has kept his foot on the treadle after depressing it to start the insertion of fastenings until after the arm 300 of the roller cage 298 has rotated into engagement with the hook 310 of the fork member 308, the awl will have been forced into the work during the last half of the fourth rotation of the main shaft following the clutching of the parts, or simultaneously with the insertion of the initial fastening, or fastenings, and during the succeeding rotation of the main shaft a fastening will be inserted in the awl hole formed upon the previous descent of the cutters and an awl hole will be simultaneously formed, and these operations will take place during each succeeding rotation so long as the operator keeps his foot on the treadle. If, however, after depressing the treadle to start the insertion of fastenings the operator removes his foot before the end of the third rotation of the main shaft following the clutching of the parts, or before the arm 300 of the roller cage 298 has rotated through an angle of 180°, the hook 310 upon the fork member 308 of the lever 304 will be moved out of the path of the arm 300 by the rocking of said lever 304 toward the left in Fig. 2, and the cam 194 will not be unclutched from the shaft 114 after it has rotated far enough to bring the parts controlled by it into operative relation, but it will continue to rotate until it has again restored the said parts to their inoperative relations.

When it is desired to stop the insertion of fastenings after a single fastening has been inserted, the treadle is operated in the just described manner, that is, the operator depresses the treadle to start the insertion of fastenings and then removes his foot from it before the arm 300 has rotated into contact with the hook 310 upon the fork member 308, or before substantially the end of the third rotation of the main shaft after the cam disk 194 has been clutched to the shaft 114. When the operator thus removes his foot from the treadle, the lever 304 swings again into the position in which it is shown in Fig. 2 and during the first half of the fourth rotation of the main shaft following the clutching of the cam disk 194 to the shaft 114 the awl is withdrawn from beneath the cutter 46 so that as the cutters descend to insert a fastening, or fastenings, during the last half of this rotation, an awl hole will not be formed in the work. During the last half of this rotation of the main shaft, as the cutters descend to insert a fastening, or fastenings, the cam disk 194 will have rotated far enough to bring the high part of its edge cam into position beneath the roller 280 upon the arm 282 of the rock-shaft 284, thereby turning said rock-shaft in a clockwise direction in Fig. 2, and moving the finger 286 and with it the pawl 290 toward the left in Fig. 5, thus bringing the locking pawl 340 into locking relation to the ledge 348. This effects a locking of the fastening retainer slide 96 to the slide 66 so that during the first half of the fifth rotation following the clutching of the parts there will be no fastening measuring relative movement of the retainer 80 and the cutters, and thus no fastening will be inserted during the said fifth rotation. During this rotation, however, the fastening which has been partially inserted during the last half of the fourth rotation will have been brought by the feeding of the work, due to the movement of the swinging frame 24 toward the left in Fig. 1, and the engagement with said partially inserted fastening of the feed plate 412, into position beneath the solid part of said feed plate 412 so that as the said feed plate moves downwardly with the head 40, the solid part of said plate will engage the said partially inserted fastening and drive it flush with the surface of the work. In order that the insertion of the fastening may thus be completed it is essential that the horn be maintained in its work supporting position until the end of the fifth rotation of the main shaft following the clutching of the parts, and therefore the dropping of the horn to permit the convenient removal of the work is postponed until the sixth rotation of the main shaft following the said clutching. Inasmuch as the shaft 114, as hereinbefore pointed out, is geared to the shaft 14 to rotate once to six rotations of the latter shaft, the cam disk 194 during the sixth rotation of the main shaft following the clutching of the said disk to the shaft 114 will have completed substantially one rotation and the arm 300 of the roller cage 298 will be brought again into contact with the fork member 306 of the lever 304 and the disk will be unclutched from the shaft, and the parts controlled by it will be left in their inoperative relations to the parts driven from the main shaft. Inasmuch as the lowering of the horn and the movement of the roller 236 out of locking position between the levers 212 and 220 are controlled by different arms of the same three-armed lever, the said movement of the roller 236 out of its locking position will also take place during the sixth rotation of the main shaft following the clutching of the cam disk 194 to the shaft 114.

When it is desired to insert a continuous row of fastenings around the heel, for example, as shown in Fig. 19, and it is desired that the last fastening inserted shall be spaced a predetermined distance, or approximately such a distance, from the breast corner of the heel remote from that adjacent to which the insertion has been started, the slides 370 and 380 will be locked together as shown in Fig. 23 so that when the slide 380 is moved forward under the action of the spring 388, as it slips over the breast corner adjacent to which the insertion of fastenings is to be stopped, the upstanding lug 392 on the slide 370 will strike the arm 394 of the angle lever pivoted at 396 and cause its other arm 398 to strike the toggle 322, 324 and break it and effect a stopping of the insertion of fastenings in the manner hereinbefore described. This stopping of the insertion of fastenings takes place whether the operator removes his foot from the treadle at this time or not, and the toggle will remain broken until the operator does remove his foot from the treadle or permits the treadle to rise, so that he cannot again start the insertion of fastenings until he has made the movements normally essential to the stopping of such insertion. When the insertion of fastenings has been stopped in the manner just described, and the lever 304 has been rocked toward the left in Fig. 2, release of the treadle by the operator will permit it to be raised under the action of its spring 318, thus effecting a relative movement of the rod 314 and the socket member 312, whereby the toggle is again straightened, the final part of the straightening movement of the toggle being aided and sometimes effected by the action of the spring 332.

If it is desired to use the slide 380 as an end gage to determine the distance from the corner of the heel of a single fastening to be inserted to form the last fastening of a particular design, for example when the machine is used to do what is known as "quarter slugging," the lever 384 is turned into the position in which it is shown in Fig. 22, in which position the operative connection between the slides 380 and 370 is broken so that the slide 380 may be moved forward by the spring 393 into the position in which it is shown in Fig. 22 without interfering with the insertion of fastenings, the slide 370 being locked in its rearmost position by the engagement of the hook upon the lever 384 with the pin 389. In this position, as shown in Fig. 22, it can conveniently be utilized as an end gage. When the slide 380 is used, as hereinabove described, to control by its engagement with the edge of the heel or top-lift an automatic stopping of the insertion of fastenings, and such stopping is effected by the movement of the slide forward as it passes over a corner of the heel, it will be apparent that as the rounded corners of the heel approach the inserting mechanism there will be a certain amount of forward movement of the said slide. Inasmuch as it is usually not desirable to stop the insertion of fastenings adjacent to one of the rounded corners of the heel, the movement required of the slide 380 to effect the automatic stopping of the insertion of fastenings is made so great in the preferred embodiment of the invention that the small amount of movement permitted to the slide when the rounded corners of the heel are approaching the inserting mechanism is not sufficient to effect such automatic stopping, especially since such movement is gradual and the construction is preferably arranged so that a sudden movement is required to break the toggle.

As hereinbefore pointed out, there is preferably provided in this machine two means for feeding the work, either of which may operate independently of the other, but which are arranged so that they usually coöperate in feeding the work when the machine inserts several fastenings in succession to form a row. When the machine is rendered operative to insert fastenings and the actuating mechanism is so operated that the machine is again rendered inoperative after a single fastening only has been inserted, it will be noted that the work is fed first by the awl, after the awl hole has been formed, to bring said hole into position to receive a fastening and that at this time the feed plate 412 does not assist much in the feeding movement since there is no partially inserted fastening for it to engage. After the awl has fed the work into position to bring the awl hole in line with the fastening to be partially inserted, it is withdrawn out of operative position beneath the cutter 46, during that rotation of the main shaft which effects the partial insertion of the said fastening, and therefore the feeding of the work into the position in which the insertion of said fastening is completed must be effected by the feed plate 412 without the coöperation of the awl. It will thus be seen that when a single fastening only is inserted by the machine, both of the feeding mechanisms provided in the machine will be used in succession and that the feeding of the work by each of them will be effected without the coöperation of the other.

The cutter 46 strikes the ledge 172 upon the awl to drive it into the work while it is still gripping the fastening strip and the awl is completely driven into the work before the cutter is moved upwardly to sever said strip in coöperation with the cutter 44. There will, therefore, be a relative movement of the awl carrier slide 171 and the cutter carrier head 40 at this time so that the projection 176 upon the head 40 will move away from the lower end of the slide 171. When the head starts up again, therefore, during the work feeding movement of the swinging frame 24, it will move far enough to open the cutters again before the projection 176 engages the slide 171 to lift the awl. This upward movement of the head before the awl is lifted is preferably made sufficient to open the cutters far enough so that they will pass freely over the fastening strip. Inasmuch as the reciprocating movement of the cutter carrier head 40 is effected by connection of said head with an eccentric upon the main shaft 14, which is constantly rotating, the head 40 will be lifted continuously during the work feeding movement of the swinging frame 24 and the awl will therefore start out of the work before said work feeding movement is completed. This movement of the awl out of the work is not sufficient however to prevent the proper feeding of the work to receive the initial fastening.

It will be noted from the foregoing description that three rotations of the main shaft are required to place all the parts in position for the insertion of fastenings and that three rotations are required to restore the parts to their inoperative positions, the actuating mechanism being so constructed that the last partially inserted fastening is completely inserted before the horn is dropped. It will therefore be seen that to insert a single fastening completely by depressing the treadle and then releasing it before the arm 300 of the roller cage 298 has rotated into contact with the hook 310 upon the fork member 308 will require six rotations of the main shaft.

It has been found in practice that three rotations of the main shaft are sufficient, within practical speed limits, to afford the operator time enough to remove his foot after depressing the treadle for the insertion of a single fastening. By a mere mechanical modification of the parts to suit them to a different speed ratio between the shafts 114 and 14, the number of rotations required to put the parts in operative position may obviously be varied.

It is, of course, obvious that this invention is not limited to the provision in a single machine of all the novel features of construction and operation herein disclosed, many of which have been pointed out above. For example, a machine can be constructed to operate at high speed by selecting only those novel features of the invention which have this end in view. Although the provision of automatic design mechanism is preferable in a machine which is to operate at high speed, it is not essential to the rapid insertion of fastening in designs of a nature not too complex. Furthermore, the design mechanism, the starting and stopping mechanism, the automatic stopping mechanism and other novel features are each useful independently of the others, or with different combinations of the others, and in machines for inserting fastenings which are constructed to obtain ends other than those of speed or other ends besides those of speed. Rearranged combinations and mechanical modifications and changes in parts not amounting to invention are considered as usual to come within the scope of the appended claims, and the terms of the claims should be construed in the broadest sense consistent with the state of the art at the time this invention was made.

It will be noted that the term "roller" has been used in some of the subjoined claims but this term should not be understood to be restricted to a cylindrical rolling body as under it is intended to be included any rolling body useful for the purposes specified.

Having described my invention, what I claim as new and desire to secure by Letters Patent of the United States is:

1. In a machine for inserting fastenings, the combination with a reciprocating carrier and a combined gripping and severing means mounted upon said carrier, of means for insuring gripping and severing movements of said gripping and severing means of predetermined amounts and at predetermined times in the reciprocation of said carrier.

2. In a machine for inserting fastenings, the combination with a reciprocating carrier, and a combined gripping and severing means mounted upon said carrier, of means to control positively both the gripping and the severing operations of said gripping and severing means.

3. In a machine for inserting fastenings, the combination with a pair of cutters constructed and arranged to grip a strip of fastening material, insert the end thereof into a piece of work and sever a portion of said strip to form a fastening, of means for controlling positively and continuously the operations of said cutters.

4. In a machine for inserting fastenings, a reciprocating carrier having mounted thereon a single device for gripping and severing a fastening strip, in combination with means for positively and continuously controlling the said device throughout a reciprocation so as to cause predetermined amounts of gripping and severing and opening movement at predetermined times in such reciprocation, while positively preventing premature severing of said strip.

5. In a machine for inserting fastenings, the combination with a reciprocating carrier and gripping and severing means mounted upon said carrier, of means to cause said gripping and severing means to grip positively a strip of fastening material to insert its end and to hold said gripping and severing means positively in a predetermined relation to said strip throughout the inserting movement.

6. In a fastening inserting machine, the combination with reciprocating gripping and severing means adapted to grip, partially insert and sever a continuous fastening strip, of a single means for positively actuating said gripping and severing means at one point in its reciprocating movement to grip the strip and for positively actuating the said gripping and severing means at another point in its movement to sever the strip.

7. In a machine for inserting fastenings, the combination with a reciprocating carrier, gripping and severing members mounted upon said carrier to grip, insert and sever a strip of fastening material, of means to impart to said members a positively determined amount of gripping movement, said means being constructed to hold the gripping ends of said members stationary relatively to the strip in the direction of its length until the completion of the gripping movement.

8. In a machine for inserting fastenings, the combination with a constantly reciprocating carrier, of gripping and severing members mounted upon said carrier to grip, insert and sever a strip of fastening material, and means for moving said members transversely of the strip into gripping relation to the strip and for holding said members stationary relatively to said strip in the direction of its length during the gripping movement, said means being constructed to hold the members in predetermined gripping relation to the strip until they are actuated to sever the strip.

9. In a machine for inserting fastenings, the combination with a reciprocating carrier, and coöperating fastening strip gripping and severing members pivoted upon said carrier to swing in their strip-gripping movement from points below the line through their pivots toward said line, of means for holding the opposed cutting edges of the members positively in a line perpendicular to the strip throughout their swinging movement, and means for actuating said holding means to cause said perpendicular line to include the same point upon the strip throughout the swinging movement of the members.

10. In a machine for inserting fastenings, the combination with a reciprocating carrier, gripping means mounted upon said carrier to grip and insert a strip of fastening material, of means for positively moving the gripping members of the gripping means toward each other to predetermined points equidistant from the center of the strip, said means being constructed to hold said members against movement in either direction from the positions to which they have been moved throughout the inserting operation.

11. The combination with a reciprocating carrier and means for reciprocating said carrier, of gripping and severing means mounted upon said carrier to move relatively thereto into operative position, a reciprocating member mounted for reciprocating movement corresponding in directions to that of the carrier, means connecting said gripping and severing means and said member, and means for positively reciprocating said member in such timed relation to the carrier that the gripping and severing means is actuated, through relative movement of the carrier and member, at predetermined points in its travel with the carrier, to perform its various functions.

12. In a machine for inserting fastenings, the combination with a main shaft, of a frame mounted to swing in an arc concentric with said shaft, a carrier mounted to reciprocate in said frame, gripping and severing means mounted upon said carrier, actuating means for said gripping and severing means mounted to reciprocate in said carrier and separate means operated by the main shaft for positively swinging the frame, for positively reciprocating the carrier, and for positively reciprocating the actuating means, respectively, whereby relative movement of these parts may be obtained.

13. In a machine for inserting fastenings, the combination with a swinging frame of the following instrumentalities mounted in and movable relatively to said frame, to wit: a carrier mounted to reciprocate in a direction transverse to the swinging movement of the frame, gripping and severing means mounted upon said carrier, actuating means for said gripping and severing means mounted to reciprocate in the same directions as said carrier, a fastening presenter mounted to move transversely of said carrier and separate means for effecting positively the movements of said carrier, said actuating means and said fastening presenter.

14. In a machine for inserting fastenings, the combination with a supporting frame, of a carrier mounted for reciprocating movement upon said frame, gripping and severing means mounted upon said carrier to move relatively thereto into operative position, a reciprocating member mounted for reciprocating movement corresponding in directions to that of the carrier, means connecting said gripping and severing means and said member, a rotating shaft, means to impart to one of said reciprocating parts the vertical movement of a point revolving about the axial center of said shaft, and means mounted to rotate with said shaft constructed to impart to the other of said reciprocating parts a positive reciprocating movement portions of which do not conform to the vertical movement of a point revolving about the axial center of said shaft whereby a relative movement of said reciprocating parts is effected.

15. In a machine for inserting fastenings, fastening inserting mechanism comprising, in combination, a reciprocating carrier, cutters pivoted upon said carrier, a reciprocating slide mounted upon said carrier and pivotally connected with said cutters, means for positively reciprocating said carrier and means for positively reciprocating said slide, said two reciprocating means being constructed and arranged to move said carrier and slide together during parts of their reciprocating movement and to effect a relative movement of said carrier and slide during other parts of their reciprocating movements, whereby the cutters are positively actuated to grip, insert and sever fastenings from a strip of fastening material located between them.

16. A machine for inserting fastenings having, in combination, fastening inserting means, an independently movable awl located when operative in the path of movement of said inserting means and constructed and arranged to be engaged and forced into the work by said inserting means during its fastening inserting movement, and means for maintaining said awl in inoperative relation to said inserting means.

17. In a machine of the class described, fastening inserting mechanism, and an awl having a work penetrating portion maintained when said awl is operative in the path of movement of said inserting mechanism in such position that the awl receives its operative movement from the fastening inserting movement of said inserting mechanism, said awl being movable out of the path of movement of said inserting mechanism to render it inoperative.

18. A machine for inserting fastenings having, in combination, fastening inserting means and an awl arranged in the path of said inserting means to be forced into the work by said means during its fastening inserting movement, and means for moving said awl out of the path of said inserting means to render it inoperative while said inserting means continues to operate.

19. A machine of the class described having, in combination, normally operative fastening inserting mechanism, and an awl movable into and out of operative position, said awl having a work penetrating portion which is maintained in operative position during successive fastening inserting operations in the path of movement of said inserting mechanism, whereby it receives its operative movement from said mechanism, and which is maintained out of said path when the awl is in inoperative position.

20. A machine of the class described having, in combination, normally operative fastening inserting mechanism, and an awl movable into and out of operative position, said awl having a work penetrating portion which is maintained in operative position during successive fastening inserting operations in the path of movement of said inserting mechanism, whereby it receives its operative movement from said mechanism, and which is maintained out of said path when the awl is in inoperative position, the body of and support for said awl being located at all times outside said path.

21. A machine for inserting fastenings having, in combination, fastening inserting means, and an awl which receives its operative movement directly from the fastening inserting means as said inserting means moves to insert a fastening, said awl being arranged to be moved into and out of operative relation to said fastening inserting means while said means is in operation.

22. A machine for inserting fastenings, comprising reciprocating cutters arranged to grip, drive and sever a fastening from the end of a continuous fastening strip, and an awl arranged to be moved into the path of said cutters and to be driven by said cutters into the work at the point where the next fastening is to be inserted.

23. A machine of the class described, having, in combination, a single device for feeding, inserting and severing a fastening from a fastening strip, and means for forming openings to receive the fastenings operating at the succeeding fastening location.

24. A machine of the class described, having, in combination, a single device for inserting and severing a fastening from a continuous fastening strip, and means operated by said device for forming an opening to receive said fastening.

25. A machine of the class described, having, in combination, fastening inserting mechanism constructed to insert the end of a continuous fastening strip into the work and then to sever a portion of said strip to form a fastening, and means operated by said mechanism during a movement in the fastening inserting direction for forming a fastening receiving opening in the work in advance of the operation of inserting said fastening.

26. A machine of the class described, having, in combination, reciprocating cutters arranged to grip, insert and sever a fastening from the end of a continuous fastening strip, and means operating beneath said cutters for forming an opening in the work to receive said fastening.

27. A machine for inserting fastenings, having, in combination, means for inserting fastenings constructed and arranged to partially insert a fastening during one fastening inserting movement, and to complete the insertion of said fastening during the succeeding fastening inserting movement, and an awl having a work penetrating portion arranged to be completely inserted into the work while the fastening is being partially inserted.

28. In a machine of the class described, fastening inserting mechanism, means operated by said mechanism for forming an opening in the work to receive the fastening, arranged to operate normally to form said opening while said mechanism is inserting a fastening in a previously formed opening, and means for moving said aforementioned means into inoperative relation to the inserting mechanism before the fastening inserting operation of said mechanism when the machine is operated to insert a single fastening.

29. A machine of the class described, having, in combination, reciprocating fastening inserting mechanism arranged to grip, partially insert and sever a fastening from the end of a continuous fastening strip, means operated by said mechanism for forming an opening in the work to receive said fastening, and means operated by said mechanism for completing the insertion of said partially inserted fastening.

30. A machine for inserting fastenings, having, in combination, reciprocating fastening inserting mechanism arranged to grip, drive and partially insert a fastening during one reciprocation and a plate arranged in the path of said mechanism and driven thereby during a succeeding reciprocation upon the head of the previously partially inserted fastening to effect its complete insertion, and an awl arranged in the path of said mechanism and driven thereby into the work during the same succeeding reciprocation to provide an opening to receive the third fastening to be inserted.

31. A machine of the class described, having, in combination, mechanism for inserting fastenings, an awl adapted to be driven into the work by said inserting mechanism during the fastening inserting movement of said mechanism, work feeding means, and automatic means for moving said awl transversely of the line of work feed into and out of operative relation to said inserting mechanism.

32. A machine of the class described, having, in combination, fastening inserting mechanism, means for forming a fastening receiving opening in the work comprising a vertically reciprocating awl arranged to be engaged by said inserting mechanism and forced into the work while a fastening is being inserted by said mechanism, and means for throwing said awl out of operation after the fastening receiving opening for the last fastening to be inserted has been formed, constructed to withdraw said awl out of the plane of its operative movements.

33. A machine of the class described, having, in combination, reciprocating gripping and severing mechanism, means to cause said mechanism to grip positively a strip of fastening material to insert its end and to hold said mechanism positively in a predetermined relation to said strip throughout the inserting movement, and an awl arranged to be engaged by and driven into the work by said mechanism during its inserting movement.

34. A machine of the class described, having, in combination, fastening inserting mechanism comprising cutters constructed and arranged to grip a fastening strip at a distance from its end equal to the desired length of the fastening to be inserted and then to insert and sever the portion of said strip projecting beyond the cutters to form a fastening, and means operating at the next fastening location for forming in the work an opening to receive and guide the said portion of the strip projecting beyond the end of said cutters.

35. A machine for inserting fastenings, comprising constantly operating fastening inserting means constructed and arranged to partially insert a fastening during one operation and to complete the insertion of said fastening during the succeeding operation, an awl and means for moving said awl into the path of said fastening inserting means during one of its operations and to withdraw it from the path of said means during a succeeding operation.

36. A machine of the class described, having, in combination, an awl, means for partially inserting a fastening, means for completing the insertion of a partially inserted fastening, means for operating the said means simultaneously, and means for throwing them out of operation in such order that the last awl hole made by the awl receives a partially inserted fastening from the means for partially inserting a fastening and that the last partially inserted fastening is driven completely into the work by the means for completing the insertion of a partially inserted fastening.

37. A machine for inserting fastenings, having a plurality of sources of fastening supply, means for inserting in predetermined order in the same row fastenings selected from said sources of supply; and an awl engaged and driven by said fastening inserting means and movable into and out of the path of said means.

38. A machine of the class described, having, in combination, mechanism for inserting fastenings, automatic means for causing said mechanism to insert in succession fastenings of different lengths, and means operated by said fastening inserting mechanism in its fastening inserting movement for forming in the work fastening receiving openings to receive said fastenings of different lengths.

39. A machine of the class described, having, in combination, fastening inserting mechanism comprising reciprocating cutters constructed and arranged to grip, insert and sever a fastening from the end of a continuous fastening strip, an awl arranged to be moved into and out of the path of said cutters and to be driven into the work by said cutters when in operative position to form a fastening receiving opening in the work, and means associated with the cutter operating mechanism for withdrawing said awl from the work constructed to provide a predetermined amount of lost motion between the awl and the cutters during which the cutters are opened to permit them to pass over the strip.

40. A machine for inserting fastenings, having, in combination, a reciprocating cutter carrier head, an awl carrying slide and an awl, means for moving said awl into and out of the path of reciprocation of said head whereby the awl when in operative position is driven into the work by engagement with the mechanism carried by said head, and means also carried by said head and engaging the awl carrying slide for withdrawing the awl from the work.

41. A machine of the class described, having, in combination, a vertically reciprocating head, fastening inserting mechanism carried by said head, an awl and an awl carrying slide, means for causing said awl carrying slide to partake of the movement of said head in one direction, means for moving said awl into the path of reciprocation of said head whereby it is caused to partake of the movement of said head in the other direction, and means for withdrawing said awl, said means being constructed to withdraw said awl out of the path of reciprocation of said head and to hold it and its slide stationary while said head continues to move.

42. A machine of the class described, having, in combination, vertically reciprocating fastening inserting mechanism, an awl-carrying slide arranged for vertical reciprocation in a path parallel to that of said inserting mechanism, an awl carried by said slide and movable transversely of its path of reciprocation into and out of operative relation to said inserting mechanism, said awl being constructed to be driven into the work by said inserting mechanism when in operative relation thereto, means for causing said slide to be lifted by said inserting mechanism and means for withdrawing said awl out of operative relation to said inserting mechanism constructed to throw said slide lifting means also out of operative relation to said inserting mechanism.

43. A machine of the class described, having, in combination, fastening inserting mechanism, an awl arranged to be operated by said fastening inserting mechanism during its movement in the fastening inserting direction, whereby normally an awl hole is formed simultaneously with the insertion of a fastening, and means for controlling the starting and stopping of the insertion of fastenings in such manner that a fastening is not inserted by the inserting mechanism until that movement of said mechanism in the fastening inserting direction, after the one in which the awl is operated by said mechanism to form the first awl hole.

44. In a machine of the class described, as a single integral element, an awl comprising a work penetrating portion, an offset stem upon one side of and inclined to said work penetrating portion and an impact-receiving ledge in line with said work penetrating portion and providing an impact receiving surface at right angles to the line of movement of the awl.

45. In a machine of the class described, as a single integral element, an awl, comprising a work penetrating portion, a stem obliquely offset from said work penetrating portion and provided with a ledge in line with the work penetrating portion and an alining shoulder.

46. A machine of the class described, having, in combination, mechanism for inserting fastenings, means for feeding the work between the successive fastening inserting operations comprising an awl and means for moving said awl transversely of the line of feed into and out of operative relation to the inserting mechanism.

47. A machine of the class described, having, in combination, mechanism for inserting fastenings, means for forming a fastening receiving opening in the work and then effecting a feeding of the work comprising an awl, means for moving said awl vertically and then laterally to effect the before-mentioned functions and means for moving said awl transversely to the plane of its first described movements into and out of operative relation to said inserting mechanism.

48. A machine of the class described, having, in combination, mechanism for inserting fastenings, an awl arranged to be driven into the work by said inserting mechanism and to be moved laterally to effect the feeding of the work, and means for moving said awl transversely of the line of work feed into and out of operative relation to said inserting mechanism.

49. A machine for inserting fastenings, having, in combination, fastening inserting means, means for imparting to said inserting means a movement toward and away from the work whereby it performs a fastening inserting operation and a movement transversely of said first movement whereby it performs a work feeding operation, and an awl arranged to partake of the movements of said fastening inserting means.

50. A machine for inserting fastenings, having, in combination, fastening inserting means, means for imparting to said inserting means a movement toward and away from the work whereby it performs a fastening inserting operation and a movement transversely of said first movement whereby it performs a work feeding operation, and an awl arranged to be moved into and out of the field of operation of said inserting means and to partake of the movements of said means.

51. A machine of the class described, having, in combination, means for inserting fastenings constructed to partially insert a fastening during one operation and complete the insertion during a succeeding operation, and means for feeding the work comprising an awl which engages the work, and a member which engages the partially inserted fastenings.

52. A machine of the class described, having, in combination, means for inserting fastenings arranged to partially insert a fastening during one operation and to complete the insertion of said fastening during a succeeding operation, means for feeding the work comprising a member arranged to engage a partially inserted fastening and an awl arranged to feed the work to receive the initial fastening.

53. A machine of the class described, having, in combination, means for inserting fastenings constructed and arranged to partially insert a fastening during one operation and to complete the insertion of said fastening during a succeeding operation, and means for feeding the work comprising an awl arranged to feed the work into position to receive the initial fastening and to be thrown out of operation after the awl hole for the last fastening to be partially inserted has been formed, and other means for feeding the work into the position in which the last partially inserted fastening is completely inserted.

54. A machine of the class described, having, in combination, means for inserting fastenings successively in work moved beneath it, an awl arranged to feed the work into position to receive the first fastening, and other means which then becomes operative to feed the work thereafter.

55. A machine of the class described, having, in combination, means for partially inserting a fastening during one operation, and means for completing the insertion of said fastening during a succeeding operation, an awl arranged to operate in feeding the work between the successive operations of the inserting mechanism until the last fastening has been partially inserted, and other means for feeding the work into position for the last operation of the machine.

56. A machine of the class described, comprising means for inserting fastenings constructed and arranged to partially insert a fastening during one operation and to complete the insertion of said fastening during a succeeding operation, means for forming a fastening receiving opening in the work, and means for feeding the work by engagement with a partially inserted fastening, said means being so arranged and so operated that when a single fastening is inserted the work will be fed into position for the partial insertion of said fastening by said means for forming the fastening receiving opening, said means will then be thrown out of operation and the work will then be fed into the position in which the insertion of the fastening is completed by said means for feeding the work by engagement with a partially inserted fastening.

57. A machine of the class described, having, in combination, means for inserting fastenings, means for feeding the work and an awl driven into the work by the fastening inserting means and arranged to partake of the work feeding movement and to be partially withdrawn from the work during said movement.

58. A machine for inserting fastenings constructed to perform successively three different operations at a fastening location upon the work, comprising means for forming an opening to receive a fastening, means for partially inserting a fastening in said opening leaving its end projecting above the stock, and means for completing the insertion of said fastening.

59. A machine of the class described, constructed to perform three operations in succession to effect a complete insertion of a single fastening, namely, the pricking of a hole to receive a fastening, the partial insertion of the fastening in said hole leaving its end projecting above the stock and then a completion of the insertion of said fastening, said machine comprising separate means for effecting each of these operations arranged in line with intervening spaces equal to the desired spaces between the fastenings in the fastening row.

60. A machine for inserting fastenings constructed to perform successively three different operations at a fastening location upon the work, comprising means for forming an opening to receive a fastening, means for partially inserting a fastening in said opening leaving its end projecting above the stock, and means for completing the insertion of said fastening, said means being arranged to operate simultaneously whereby the insertion of a fastening is completed at every operation of the machine after the first fastening has been inserted.

61. A machine for inserting fastenings constructed to perform successively three different operations at a fastening location upon the work, comprising means for forming a fastening-receiving opening, means for partially inserting a fastening in said opening, and means for completing the insertion of said fastening, two of said means being constantly in motion and the third being arranged to be brought into and out of operative relation to the other two.

62. A machine for inserting fastenings constructed to perform successively three different operations at a fastening location upon the work, comprising means for forming a fastening-receiving opening, means for partially inserting a fastening in said opening and means for completing the insertion of said fastening, two of said means being arranged to be operated by the third.

63. A machine for inserting fastenings constructed to perform successively three different operations at a fastening location upon the work, comprising a source of fastening supply, means for forming a fastening receiving opening, constantly operated mechanism for partially inserting a fastening in said opening, and means for completing the insertion of said fastening, said means for forming the fastening receiving opening being arranged to be operated from the inserting mechanism, and means for interrupting the insertion of fastenings, constructed to cut off the supply of fastenings to the inserting mechanism, and to throw the means for forming the fastening receiving opening out of operative relation to said mechanism.

64. A machine for inserting fastenings constructed to perform successively three different operations at a fastening location upon the work, comprising means for forming a fastening receiving opening in said work, means for partially inserting a fastening in said opening, and means for completing the insertion of said fastening, said means for forming the fastening receiving opening being arranged to be driven by said inserting means and to be moved into and out of operative position therebeneath.

65. A machine for inserting fastenings constructed to operate simultaneously at three different fastening locations upon the work and comprising means for forming a fastening receiving opening at one location, means for partially inserting a fastening at another location and means for completing the insertion of a previously partially inserted fastening at the other location.

66. A machine for inserting fastenings constructed to perform successively three different operations at a fastening location upon the work, comprising means for forming a fastening receiving opening, means for partially inserting a fastening in said opening, and means for completing the insertion of said fastening, one of said means being arranged to be operated directly by another.

67. A machine for inserting fastenings, constructed to operate upon work at three different fastening locations at the same time and comprising separate means for forming a fastening receiving opening in the work at one location, partially inserting a fastening at another location, completing the insertion of a previously partially inserted fastening at the other location respectively, and a shaft for imparting movement to said means, said means and shaft being so related that the insertion of a fastening is completed at each rotation of said shaft.

68. A machine for inserting fastenings, having, in combination, means for forming a fastening receiving opening in the work at one location of the work, means for partially inserting a fastening in said opening at a succeeding location of the work, and means for completing the insertion of said partially inserted fastening at a third location of the work.

69. In a machine for inserting fastenings, the combination with means for seizing, partially inserting and severing a portion at the end of a continuous fastening strip to form a fastening, of means to hold said strip against return movement with the first-named means to permit relative movement of said first-named means and said strip, and automatic means for moving said holding means and strip to vary the normal relative movement to the strip of said first-named means.

70. In a machine for inserting fastenings, the combination with reciprocating gripping and severing means, of means for causing said gripping and severing means to grip a strip of fastening material always at the same point in its path of movement, means for insuring a relative movement of the strip and the gripping and severing means longitudinally of the strip, and means for moving said insuring means variable distances while the strip is not gripped by the gripping and severing means whereby the relative movement of the strip and gripping and severing means is varied.

71. In a machine for inserting fastenings, the combination with reciprocating means for gripping a strip of fastening material at a fastening length distance from its end, and for inserting said end and severing the fastening at the gripping point, of automatic means for moving said strip longitudinally of the path of reciprocating movement of said gripping and severing means to vary the distance from the end of the point at which the strip is gripped.

72. In a fastening inserting machine, the combination with means for seizing, partially driving and severing a portion at the end of a continuous fastening strip to form a fastening, of means to hold said strip against return movement with said first-named means, to permit relative movement of said first-named means, and said strip, and means for locking said holding means and said first-named means together to prevent relative movement of said strip and said first-named means when no fastening is to be formed.

73. A machine of the class described, having, in combination, a reciprocating carrier, gripping and severing members mounted upon said carrier to grip, insert and sever a strip of fastening material, strip retaining means arranged to retain the fastening strip in such manner that fastening measuring relative movements of the strip and gripping and severing members take place when the machine is operated to insert fastenings, and means for effecting positively a locking together of said retainer and said carrier to prevent a relative movement of the strip and the gripping and the severing members and thereby to render said machine inoperative to insert fastenings.

74. In a machine for inserting fastenings, the combination with a plurality of sources of fastening supply, of mechanism for successively inserting in the same row fastenings taken from different sources of supply and automatic means for controlling both the selection and the length of the fastening to be inserted at any operation of the inserting mechanism.

75. In a machine for inserting fastenings, the combination with inserting mechanism constructed to insert successively fastenings formed selectively from a plurality of fastening strips, of means for automatically controlling both the selection of the strip from which the fastening to be inserted at any operation of the inserting mechanism is to be formed and the length of said fastening, whereby fastenings of predetermined lengths shall be formed from selected strips.

76. In a machine for inserting fastenings, the combination with fastening inserting mechanism constructed and arranged to insert fastenings formed from any one of a plurality of fastening strips, of fastening selecting mechanism and fastening length controlling mechanism arranged to operate in timed relation to each other, whereby fastenings of predetermined lengths are formed from selected strips.

77. In a machine for inserting fastenings, the combination with a plurality of sources of fastening supply, and means for forming and inserting fastenings, of means for varying the length of the fastenings formed, means for controlling said varying means to cause a series of fastenings of various lengths to be inserted with the members of the series in predetermined order, and means for causing fastenings of different lengths to be taken from different sources of supply.

78. In a machine for inserting fastenings, the combination with a plurality of sources of fastening supply, of means for inserting fastenings, work feeding means, means for causing the fastenings to be inserted successively in a series made up of groups and for causing each member of a group to have a predetermined length according to its position in the group, and means for causing fastenings from different sources of supply to be presented to the inserting means in such manner that fastenings of different lengths are taken from different sources of supply.

79. A machine for inserting fastenings, having, in combination, constantly operating fastening inserting mechanism constructed to insert and sever fastenings from a continuous fastening strip, and means for rendering said mechanism operative to insert fastenings or inoperative for this purpose comprising means for moving the fastening strip longitudinally of the path of movement of said mechanism into or out of the field of operation of said mechanism, said means acting constantly to prevent retrograde movement of said strip with respect thereto.

80. A machine for inserting fastenings, having, in combination, constantly operating fastening inserting mechanism comprising a pair of reciprocating cutters constructed and arranged to grip a fastening strip, insert its end into the work and sever therefrom a fastening, and means for rendering said inserting mechanism operative to insert fastenings or inoperative for this purpose comprising means for moving the fastening strip longitudinally of the path of movement of said mechanism into or out of the field of operation of said cutters, said means acting constantly to prevent retrograde movement of said strip with respect thereto.

81. A machine for inserting fastenings, having, in combination, constantly operating fastening inserting mechanism constructed to insert and sever fastenings from a continuous fastening strip, a fastening strip retainer and means for rendering the inserting mechanism operative to insert fastenings or inoperative for this purpose comprising means to move said retainer longitudinally of the path of movement of said mechanism to cause it to bring the fastening strip into or out of the field of operation of the inserting mechanism, said means acting constantly to prevent retrograde movement of said strip with respect thereto.

82. A machine for inserting fastenings, having, in combination, constantly operating fastening inserting mechanism constructed to insert and sever fastenings from a continuous fastening strip, an awl for forming in the work in advance of the fastening inserting operation a fastening receiving opening, and means for rendering said mechanism operative to insert fastenings or inoperative for this purpose comprising means for moving the fastening strip into or out of the field of operation of the inserting mechanism and at the same time rendering said awl operative or inoperative.

83. A machine for inserting fastenings, having, in combination, constantly operating fastening inserting mechanism constructed to insert and sever fastenings from a continuous fastening strip, an awl arranged to be moved into and out of the path of said inserting mechanism whereby said awl is operated by said inserting mechanism to form in the work a fastening receiving opening or is rendered inoperative for this purpose, and means for rendering the inserting mechanism operative to insert fastenings or inoperative for this purpose, comprising means for moving a fastening strip into or out of the field of operation of the inserting mechanism and at the same time moving the awl into or out of the path of the inserting mechanism.

84. A machine of the class described, having, in combination, reciprocating fastening inserting mechanism, a fastening strip retainer arranged to hold a fastening strip in operative relation to said inserting mechanism when said mechanism is operating to insert fastenings, and means for locking said retainer to said mechanism to reciprocate therewith whereby said mechanism is rendered inoperative to insert fastenings.

85. A machine of the class described, having, in combination, fastening inserting mechanism comprising a vertically reciprocating cutter carrier, cutters mounted upon said carrier, a fastening strip retainer arranged to hold the fastening strip in such relation to said cutters that a fastening measuring relative movement of said cutters and strip takes place when said inserting mechanism is operating to insert fastenings, a slide upon which said retainer is mounted, and means for locking said retainer slide and said cutter carrier together to interrupt the insertion of fastenings.

86. A machine of the class described, having, in combination, fastening inserting mechanism comprising a vertically reciprocating cutter carrier, cutters mounted upon said carrier, a fastening strip retainer arranged to hold the fastening strip in such relation to said cutters that a fastening measuring relative movement of said cutters and strip takes place when said inserting mechanism is operating to insert fastenings, a slide upon which said retainer is mounted, means for locking said retainer slide to said cutter carrier comprising a pawl carried by one of said parts and arranged to engage a ledge upon the other, and means for moving said pawl into and out of engaging relation to said ledge.

87. A machine of the class described, having, in combination, fastening inserting mechanism comprising a vertically reciprocating cutter carrier, cutters mounted upon said carrier, a fastening strip retainer arranged to hold the fastening strip in such relation to said cutters that a fastening measuring relative movement of said cutters and strip takes place when said inserting mechanism is operating to insert fastenings, a slide upon which said retainer is mounted, means for locking said retainer slide to said cutter carrier comprising a pawl carried by one of said parts and arranged to engage a ledge upon the other, and means for moving said pawl into and out of engaging relation to said ledge comprising a sliding bolt provided at one end with a vertical slot and a pin upon said pawl arranged to travel in said slot.

88. A machine of the class described, having, in combination, mechanism for inserting fastenings and means coöperating with said inserting mechanism during one inserting operation for varying the length of the fastening inserted during the next inserting operation, said means being independent of the work which is being operated upon.

89. A machine of the class described, having, in combination, a single device arranged to grip, insert and sever a fastening from the end of a continuous fastening strip, retaining means through which said strip is pulled during the fastening inserting operation, and means for moving said retaining means away from said device while the strip is gripped by said device.

90. A machine of the class described, having, in combination, reciprocating cutters arranged to grip, insert and sever a fastening from the end of a continuous fastening strip, a retainer through which said strip is pulled during the fastening inserting movement of said cutters, and means for moving said retainer in a direction opposed to that in which the cutters move after they have gripped the strip.

91. A machine of the class described, having, in combination, reciprocating cutters arranged to grip, insert and sever a fastening from the end of a continuous fastening strip, a fastening retainer through which said strip is pulled during the fastening inserting movement of the cutters and to which the cutters are relatively moved during their fastening measuring movement, means for varying the amount of relative movement of the cutters and the strip retainer during the fastening measuring movement of the cutters, and means for effecting a fastening length varying relative movement of the retainer and cutters during the fastening inserting movement of the latter.

92. A machine of the class described, having, in combination, reciprocating cutters arranged to grip, insert and sever a fastening from a fastening strip lying between them, a retainer for said strip through which it is fed by the cutters during the fastening inserting operation, means for varying the fastening length measuring relative movement of the strip and the cutters, and means for varying the strip feeding relative movement of the cutters and the retainer.

93. A machine of the class described, having, in combination, reciprocating cutters arranged to grip, insert and sever a fastening from the end of a continuous fastening strip, means for varying the length of the fastening inserted within limits determined by the extent of reciprocating movement of said cutters and other fastening length varying means for adding to the maximum fastening length obtained by said first-named means.

94. A machine of the class described, having, in combination, mechanism for inserting fastenings, means operating during the inoperative movement of said inserting mechanism for varying the length of the fastening to be inserted upon the next operative movement of said mechanism, and means operating during the previous operative movement of the inserting mechanism for increasing the length determined by said first-named length varying means.

95. A machine of the class described, having, in combination, means for inserting fastenings constructed and arranged to grip, insert and sever a fastening from the end of a continuous fastening strip, means for forming a fastening receiving opening in the work to receive the fastening inserted by said inserting means, and means for causing the end of the fastening strip to enter the fastening receiving opening in the work in advance of the gripping action of said inserting means.

96. A machine of the class described, having, in combination, reciprocating cutters constructed and arranged to grip, insert and sever a fastening from the end of a continuous fastening strip, a plate provided with an opening through which the fastening is inserted by said cutters, said fastening being severed flush with the upper surface of said plate, and means for feeding the fastening strip through the opening in said plate in advance of the gripping action of said cutters.

97. In a machine for inserting fastenings, the combination with means for forming and inserting fastenings, of means for causing fastenings of various lengths to be inserted in succession in a series made up of like groups each composed of fastenings arranged in predetermined order as to lengths.

98. In a machine for inserting fastenings, the combination with a source of fastening supply, of means for inserting fastenings, work feeding means, and means for causing the fastenings to be inserted successively in a series made up of groups, and for causing each member of a group to have a predetermined length according to its position in the group.

99. In a machine for inserting fastenings, the combination with means for inserting fastenings successively and a source of fastening supply, of means for causing the inserting mechanism to insert in succession fastenings of different lengths in a series made up of groups, each group comprising one or more fastenings of one length and a plurality of fastenings of another length.

100. In a machine for inserting fastenings, the combination with means for inserting fastenings successively and a source of fastening supply, of means for causing the inserting mechanism to insert in succession fastenings of different lengths in a series made up of groups each group comprising one or more fastenings of one length and a plurality of fastenings of other lengths.

101. In a machine for inserting fastenings, the combination with a source of fastening supply, of means for inserting fastenings, work feeding means and automatic means for causing the fastenings to be inserted successively in a series made up of like groups each comprising short and long fastenings and each having in succession a plurality of fastenings of one of the lengths.

102. In a machine for inserting fastenings, the combination with means for forming and inserting fastenings, of means for varying the length of the fastenings formed and means for controlling said varying means to cause a series of fastenings of various lengths to be inserted with the members of the series in predetermined order.

103. In a machine for inserting fastenings, the combination with fastening inserting means and a source of fastening supply, of means for controlling the length of the fastening to be inserted, and means for causing said controlling means to provide fastenings of varying lengths in predetermined order as to lengths.

104. A machine for inserting fastenings, having, in combination, fastening inserting means, automatic means for causing said inserting means to insert in succession fastenings of varying lengths, and means for controlling said last-named means to cause a fastening of a definite length to be inserted whenever the fastening inserting operation begins.

105. A machine for inserting fastenings, comprising fastening inserting means, automatic means for causing said inserting means to insert in the same row fastenings of various lengths, and automatic means for causing the first fastening inserted whenever the fastening inserting means is rendered operative to insert fastenings to be of a definite length.

106. A machine for inserting fastenings, having, in combination, fastening inserting means, automatic means for causing said inserting means to insert fastenings in a predetermined order as to length, and means for controlling said last named means to cause a fastening of a definite length to be inserted whenever the fastening inserting operation begins.

107. A machine for inserting fastenings comprising fastening inserting means, automatic means for causing said inserting means to insert in the same row both short and long fastenings in unequal numbers, and automatic means for causing the first fastening inserted to be of a definite length.

108. A machine for inserting fastenings, comprising fastening inserting means, automatic means for causing said inserting means to insert in the same row both short and long fastenings in unequal numbers and automatic means for causing the first fastening inserted to be a long fastening.

109. A machine for inserting fastenings, having, in combination, fastening inserting means, means for controlling said inserting means to cause fastenings of different lengths to be inserted in predetermined order as to length, means for rendering said inserting means operative to insert fastenings, and means for preventing the insertion of the initial fastening until the fastening length controlling means is in position to cause a fastening of a predetermined length to be inserted.

110. A machine for inserting fastenings, having, in combination, fastening inserting means, means for causing said inserting means to insert fastenings in succession in a series made up of successive like groups each of which comprises fastenings arranged in predetermined order as to length, and means for controlling said last named means to cause the first fastening inserted by said inserting means to be a selected member of one of said groups.

111. A machine of the class described, having, in combination, fastening inserting means and means for controlling the operation of said inserting means whereby fastenings of various lengths may be automatically inserted in predetermined order as to length, said means being adjustable whereby both the order in which the fastenings of different lengths are inserted may be varied and whereby the length of the first fastening to be inserted when the machine is rendered operative to insert fastenings may be varied.

112. A machine of the class described, having, in combination, means for inserting fastenings, means for controlling the operation of said inserting means in such manner that fastenings of various lengths may be automatically inserted in a predetermined succession as to length, and means for preventing the actuation of said inserting means to insert fastenings until the controlling means bears such relation to it that the initial fastening to be inserted will be of a particular length.

113. In a machine for inserting fastenings, the combination with reciprocating gripping and severing means adapted to grip a stationary strip of fastening material to insert its end, of means for moving the gripping edges of the gripping and severing means into gripping contact with said strip constructed to prevent relative longitudinal movement of said gripping edges and said strip and to prevent more than a predetermined amount of gripping movement.

114. In a machine for inserting fastenings, the combination with reciprocating gripping and severing means adapted to grip a strip of fastening material during the reciprocating movement of said means, of means for preventing relative movement of said strip and the gripping edges of the gripping and severing means lengthwise of said strip during the gripping movement of said gripping and severing means.

115. In a machine for inserting fastenings, the combination with a constantly reciprocating carrier, of gripping and severing means carried by said carrier and movable into gripping contact with a stationary strip of fastening material, and means for preventing relative movement of said strip and the gripping edges of the gripping and severing means lengthwise of the strip during the gripping movement.

116. In a machine for inserting fastenings, the combination with a reciprocating carrier, of a pair of cutters pivoted upon said carrier and adapted to swing during their reciprocating movement with said carrier from a position below a line through their pivotal centers toward said line to grip a stationary strip of fastening material, and means for preventing movement of the gripping edges of said cutters lengthwise of said strip during their swinging movement.

117. In a machine for inserting fastenings, the combination with constantly operating inserting mechanism, a source of fastening supply and a work support movable between a work receiving position and an operative work supporting position, of automatic means for causing said parts to come into coöperative relationship in proper functional order, and means under control of the operator for forming an operative connection between said automatic means and a constantly moving part of the machine, said automatic means being constructed to maintain said parts in coöperative relationship at the will of the operator.

118. In a machine for inserting fastenings, the combination with constantly operating inserting mechanism, a source of fastening supply and a work support movable between a work receiving position and an operative work supporting position, of automatic means for causing said parts to come into coöperative relationship in proper functional order, means under control of the operator for forming an operative connection between said automatic means and a constantly moving part of the machine, and means for automatically interrupting the said connection after the automatic means has caused all of the said parts to come into coöperative relationship.

119. In a machine for inserting fastenings, the combination with constantly operating inserting mechanism, a source of fastening supply and a work support movable between a work receiving position and an operative work supporting position, said parts coöperating with each other for the fastening inserting operation, of automatic means for disturbing the coöperative relationship of the said parts to each other in an order which will not interfere with the completion of their proper functions, and means under control of the operator for forming an operative connection between said automatic means and a constantly moving part of the machine, said automatic means serving to maintain said parts in coöperative relationship to each other until it is operatively connected to said constantly moving part.

120. In a machine for inserting fastenings, the combination with constantly operating inserting mechanism, a source of fastening supply and a work support movable between a work receiving position and an operative work supporting position, said parts coöperating with each other for the fastening inserting operation, of automatic means for disturbing the coöperative relationship of the said parts to each other in an order which will not interfere with the completion of their proper functions, means under control of the operator for forming an operative connection between said automatic means and a constantly moving part of the machine, and means for automatically interrupting the said connection after the automatic means has caused the coöperative relationship to each other of all of the said parts to be disturbed.

121. In a machine for inserting fastenings, the combination with constantly operating inserting mechanism, a source of fastening supply and a work support movable between a work receiving position and an operative work supporting position, of automatic means for causing said parts to come into coöperative relationship in proper functional order and then to cause the coöperative relationship to each other of the said parts to be disturbed in an order which will not interfere with the completion of their proper functions, and means under the control of the operator for forming an operative connection between said automatic means and a constantly moving part of the machine, said automatic means being constructed to maintain said parts in coöperative relationship at the will of the operator.

122. In a machine for inserting fastenings, the combination with constantly operating inserting mechanism, a source of fastening supply and a work support movable between a work receiving position and an operative work supporting position, of automatic means for causing said parts to come into coöperative relationship in proper functional order and then to cause the coöperative relationship to each other of the said parts to be disturbed in an order which will not interfere with the completion of their proper functions, means under the control of the operator for forming an operative connection between said automatic means and a constantly moving part of the machine, and means for automatically interrupting the said connection after the automatic means has caused the coöperative relationship to each other of all of the said parts to be disturbed.

123. A machine of the class described, having, in combination, constantly operating fastening inserting mechanism, an awl, a source of fastening supply and a work support movable between a work receiving position and an operative work supporting position, and actuating means for bringing said parts into operative relationship in proper functional order, said means being so connected to said constantly operating inserting mechanism that a number of ineffective operations of said mechanism precede the insertion of the initial fastening after said actuating means has been started.

124. A machine of the class described, having, in combination, constantly operating fastening inserting mechanism, an awl, a source of fastening supply and a work support movable between a work receiving position and an operative work supporting position, said parts being so constructed and arranged that the operation of the machine to insert fastenings may be interrupted by interrupting both the actuation of the awl and the supply of fastenings to the inserting mechanism, an actuator for effecting such interruption connected to rotate once to several operations of the inserting mechanism, and during the first half of its rotation to render the machine operative to insert fastenings and during its second half rotation to render it inoperative, and means under the control of the operator for stopping the rotation of said actuator at the end of substantially its first half rotation.

125. A machine of the class described, having, in combination, constantly operating fastening inserting mechanism and a work support movable between a work receiving position and an operative work supporting position, work feeding means, and means for depressing the work support during the work feeding operation and an actuator under the control of the operator comprising a cam, means for connecting said cam to a constantly rotating part and a three-armed lever controlled by said cam in such manner that through one of said arms the work support is moved into its operative work supporting position, and through another arm the means for depressing the work support is rendered operative.

126. A machine of the class described, having, in combination, fastening inserting means for inserting fastenings successively in stock, means for rendering said inserting means operative to insert fastenings and thereafter inoperative comprising an actuator rotatable through an angle of substantially 180° to effect an actuation of said inserting mechanism and rotatable through a succeeding angle of substantially the same size to render said inserting mechanism inoperative and means under control of the operator for stopping said actuator either at the end of its actuating movement or at the end of the movement in which it renders the inserting mechanism inoperative.

127. A machine of the class described, having, in combination, a normally rotating main shaft, fastening inserting mechanism connected to said shaft, a shaft geared to said main shaft to rotate once for several rotations of the latter, actuating mechanism arranged to be clutched to said second shaft to render said inserting mechanism operative to insert fastenings, and clutching means constructed and arranged to effect a clutching of said actuating mechanism to said second shaft at a particular angle of rotation of said main shaft.

128. In a machine of the class described, the combination with mechanism for inserting fastenings and a constantly rotating shaft, of means for rendering said mechanism operative to insert fastenings, comprising a cam disk, a clutch member associated with said cam disk, a second clutch member connected to said shaft, a roller cage between said clutch members and spring-pressed normally into operative relation to said members, and means under the control of the operator for effecting an unclutching of said members when said inserting mechanism has been rendered operative to insert fastenings and for again effecting an unclutching of said members when said inserting mechanism has been rendered inoperative to insert fastenings.

129. A machine of the class described, having, in combination, two constantly rotating shafts intergeared to rotate at different speeds, fastening inserting mechanism normally operated from one shaft, other mechanism arranged to be brought into operative relation to said fastening inserting mechanism, to render said mechanism operative to insert fastenings, actuating means arranged to be connected to the other shaft for bringing said second mechanism into operative relation to the fastening inserting mechanism, and means for effecting a connection of said actuating means to said second shaft at a particular angle of rotation of said first shaft.

130. A machine of the class described, having, in combination, two constantly rotating shafts intergeared to rotate at different speeds, fastening inserting mechanism normally operated from one shaft, other mechanism arranged to be brought into operative relation to said fastening inserting mechanism to render said mechanism operative to insert fastenings, actuating means arranged to be connected to the other shaft for bringing said second mechanism into operative relation to the fastening inserting mechanism, and a friction clutch constructed to effect a connection of said actuating means to said second shaft at a particular angle of rotation of said first shaft.

131. A machine of the class described, having, in combination, two constantly rotating shafts intergeared to rotate at different speeds, fastening inserting mechanism normally operated from one shaft, other mechanism arranged to be brought into operative relation to said fastening inserting mechanism to render said mechanism operative to insert fastenings, actuating means arranged to be connected to the other shaft for bringing said second mechanism into operative relation to the fastening inserting mechanism, and a friction clutch constructed to effect a connection of said actuating means to said second shaft at a particular angle of rotation of said first shaft, said clutch comprising concentric clutch members provided with clutching portions spaced equal numbers of degrees about a common center and rollers arranged to be brought into locking relation to the clutching portions of said clutch members.

132. A machine of the class described, having, in combination, mechanism for inserting fastenings constructed to partially insert a fastening during one operation and to complete the insertion of said fastening during a succeeding operation, means for forming a fastening receiving opening in the work, and means for rendering said mechanism operative to insert fastenings and again inoperative constructed to insure the partial insertion of a fastening in the last fastening receiving opening and to insure the completion of the insertion of the said partially inserted fastening.

133. In a machine for inserting fastenings, the combination with constantly moving fastening inserting mechanism and a source of fastening supply, of a work support and means for automatically raising said work support to clamp the work in position for the fastening inserting operation, means for rendering the inserting mechanism operative to insert fastenings, and actuating mechanism for the last-mentioned two means so constructed and arranged that a plurality of ineffective operations of the fastening inserting mechanism intervenes between the starting of said actuating mechanism and the insertion of the initial fastening during which operations the work support raising mechanism is actuated to place the work in proper position to receive said fastening.

134. In a fastening inserting machine, the combination with continually moving fastening inserting mechanism and a source of fastening supply, a work support and means for moving said work support to place the work in position for receiving a fastening, means for rendering said inserting mechanism operative to insert fastenings, a rotatable actuator for said last-mentioned two means, means to connect said actuator to a rotating part of the machine in such manner that different actuating portions of the actuator are brought into operating position during different operations of the fastening inserting mechanism, and means for disconnecting the actuator from the rotating part after said actuator has completed its series of actuating operations and is in position to maintain the various actuated mechanisms in their proper functional relations.

135. A machine of the class described, having, in combination, a constantly rotating shaft, fastening inserting mechanism and a work support movable between work receiving position and an operative work supporting position, means for rendering said inserting mechanism operative to insert fastenings comprising means for automatically raising said work support into its operative work supporting position, a clutch for connecting said last-mentioned means to the constantly rotating shaft and a second clutch to prevent premature lowering of said work support when said first-mentioned clutch is released.

136. In a machine of the class described, mechanism for performing successive operations at different locations upon work which is moved between the successive operations into different relations thereto, and means controlled in its operation by the change in contour of the work at a determined point for automatically rendering said mechanism inoperative after it has performed the desired number of operations upon the work.

137. In a machine of the class described, mechanism for performing successive operations at different locations upon work which is moved between the successive operations into different relations thereto, and means for automatically rendering said mechanism inoperative as the end of the work comes within a predetermined distance from the point of operation of said mechanism.

138. A machine of the class described, having, in combination, fastening inserting mechanism, and means for automatically stopping the insertion of fastenings at a predetermined point upon the work, controlled in its operation by the change in contour of the work at another determined point.

139. In a machine for inserting fastenings, the combination with fastening inserting mechanism and a source of fastening supply, of automatic means for causing the insertion of fastenings to be discontinued at a predetermined distance from the end of the work, constructed to gage said distance directly upon the work.

140. In a machine for inserting fastenings, the combination with a source of fastening supply and means for inserting fastenings successively, of means for feeding the work between successive fastening inserting operations, means engaging the edge of the work to cause a row of fastenings to be formed parallel with said edge, and means for automatically stopping the insertion of fastenings after the work has been fed to bring a predetermined point upon its fastening receiving surface beneath the inserting mechanism.

141. A machine of the class described, having, in combination, fastening inserting mechanism, and means controlled by a characteristic of the work at one point for automatically stopping the insertion of fastenings at another point upon the work bearing a predetermined relation to said first point.

142. In a machine for inserting fastenings, the combination with fastening inserting mechanism and a source of fastening supply, of automatic means governed by the contour of the work for causing the insertion of fastenings to be discontinued at a predetermined distance from the end of the work.

143. In a machine for inserting fastenings, the combination with fastening inserting mechanism and a source of fastening supply, of automatic means governed by the change in contour at the end of the work for causing the insertion of fastenings to be discontinued at a predetermined distance from said end.

144. In a machine for inserting fastenings, the combination with fastening inserting mechanism and a source of fastening supply, of automatic means governed by the change in contour at the end of the work for causing the insertion of fastenings to be discontinued at a predetermined distance from the end of the work, said means being so constructed and arranged that its premature action for its intended purpose is prevented.

145. In a machine for inserting fastenings, the combination with fastening inserting mechanism and a source of fastening supply, of automatic means governed by the change in contour at the end of the work for causing the insertion of fastenings to be discontinued at a predetermined distance from the end of the work, said means being so constructed and arranged that its operation to effect a discontinuance of the insertion of fastenings is prevented before the row of fastenings reaches the desired position with respect to the end of the work.

146. In a machine for inserting fastenings, the combination of fastening inserting mechanism and a source of fastening supply, automatic means for causing the insertion of fastenings to be discontinued at a predetermined distance from the end of the work, said means comprising a member arranged to engage the edge of the work and to be controlled in its movement by the contour of said edge.

147. In a machine of the class described, mechanism for performing successive operations at different locations upon work which is moved between the successive operations into different relations thereto, and means for automatically rendering said mechanism inoperative at one point upon the work controlled in its operation by the change in contour of the work at another point.

148. In a machine of the class described, mechanism for performing successive operations at different locations upon work which is moved between the successive operations into different relations thereto, and means for automatically rendering said mechanism inoperative as the work is brought into a predetermined relation thereto by its successive movements, said means being controlled in its operation by the change in contour of the work at a determined point spaced from the last point of operation of said mechanism not more than a predetermined distance.

149. In a machine of the class described, mechanism for inserting fastenings, manually controlled means for rendering said mechanism operative and means acting normally to render said mechanism inoperative moved into inactive position by the presentation of the work to the machine in advance of the actuation of said manually controlled means.

150. In a machine of the class described, mechanism for performing successive operations at different locations upon work which is moved between the successive operations into different relations thereto, means under the control of the operator for rendering said mechanism operative, automatic means for rendering said mechanism inoperative when the work has been brought into a predetermined relation thereto, said last-mentioned means comprising a member movable from operative to inoperative position by engagement with the work as it is presented to the machine in advance of the actuation of the first-mentioned means.

151. In a machine for inserting fastenings, the combination with means for inserting fastenings, of automatic means for discontinuing the insertion of fastenings at a predetermined distance from the end of the work comprising a member movable past the end of the work as said end approaches the inserting mechanism, provision being made for a limited amount of ineffective movement of said member in the direction in which it moves to effect the discontinuance of the insertion of fastenings.

152. In a machine for inserting fastenings, the combination with fastening inserting mechanism, of automatic means controlled by the contour of the work for causing the insertion of fastenings to be discontinued at a predetermined point upon said work, said means comprising a member yieldingly pressed against the work and arranged to be moved past a corner of the work to effect through said means the said discontinuance of the insertion of fastenings, provision being made for a limited ineffective movement of said member at points upon the work where the change of contour is not so abrupt.

153. A machine for inserting fastenings, having, in combination, fastening inserting means for inserting fastenings successively in work, means for feeding the work, and means for automatically stopping the insertion of fastenings when a predetermined point upon the surface of the work comes beneath the inserting means, said means comprising a member yieldingly pressed against the work and a toggle arranged to be broken as said member passes over the end of the work.

154. A machine of the class described, having, in combination, constantly operating inserting mechanism, means for rendering said inserting mechanism operative or inoperative comprising an actuator rotatable one-half turn to render said mechanism operative and rotatable a second half turn to render said mechanism again inoperative, said actuator being arranged to be connected to a constantly moving part, means for stopping said actuator at the end of either its actuating or its stopping movement, and means controlled by the work for automatically effecting a connection of said actuator and said constantly moving part when the inserting mechanism is operating upon a predetermined point of said work.

155. A machine for inserting fastenings, comprising fastening inserting means, means for rendering said inserting means operative and inoperative comprising an actuator, a constantly rotating shaft, a clutch for connecting said actuator and shaft, means under control of the operator comprising a normally straightened toggle for throwing said clutch, and means for automatically breaking said toggle when the insertion of fastenings has reached a predetermined point on the work.

156. A machine of the class described, having, in combination, mechanism for inserting fastenings, means under the control of the operator for rendering said mechanism operative to insert fastenings and for rendering it inoperative after a number of fastenings has been inserted, automatic mechanism for stopping the insertion of fastenings at a predetermined point upon the work, so related to the means under the control of the operator that the mechanism for inserting fastenings cannot again be rendered operative to insert fastenings after it has been rendered inoperative by the said automatic mechanism until the means under the control of the operator has been restored to its inoperative position.

157. A machine for inserting fastenings, having, in combination, fastening inserting means, means comprising a member which engages the edge of the work for stopping the insertion of fastenings at a predetermined point upon the work, and means for transforming said member into an end gage.

158. A machine for inserting fastenings, having, in combination, fastening inserting means arranged to insert fastenings successively in a shoe heel moved beneath it, gaging means constructed and arranged to provide a two-dimensional location of the heel with respect to said inserting means and means for rendering said gaging means inoperative for the purpose stated after the inserting means begins to operate.

159. A machine for inserting fastenings, having, in combination, fastening inserting means and work feeding means, means for positioning the work transversely of the path of feed, and means for positioning the work longitudinally of the path of feed arranged to be moved into inoperative position before the feeding means becomes operative and to be maintained in inoperative position while the machine continues to operate upon the work.

160. A machine of the class described, having, in combination, mechanism for successively inserting fastenings into work fed past said mechanism, means for effecting a two-dimensional location of the work with respect to the inserting mechanism comprising a gage for engaging the edge of the work and a second gage projecting, when operative, into the path of movement of the work and arranged to engage the end of the work, and means for moving said end gage out of the path of movement of the work before the work is fed.

161. In a machine of the class described, the combination with mechanism for successively inserting fastenings into work moved past said mechanism, of means for engaging the side and an end of the work to effect a two-dimensional location of the work for the initial fastening comprising gage members having gaging edges extending in directions transverse to each other and arranged to engage two sides of the work when said work is in fastening receiving position, and means for withdrawing one of said members out of gaging position when the fastening inserting operation begins, whereby the work may be moved freely along the other gage to receive succeeding fastenings.

162. A machine of the class described, having, in combination, fastening inserting means, work feeding means, a gage projecting into the path of the work feed for positioning the work longitudinally of said path, and means for withdrawing said gage from said path when the fastening inserting operation begins constructed to maintain it withdrawn while the inserting means continues to operate.

163. A machine for inserting fastenings, having, in combination, fastening inserting means and work feeding means, a gage to determine the location of the work transversely of the line of feed, another gage projecting into the path of the work feed for positioning the work longitudinally of said path, and means for withdrawing said second gage from the path of the work when the fastening inserting operation begins constructed to maintain it withdrawn while the inserting means continues to operate.

164. A machine of the class described, having, in combination, means for inserting fastenings, means for feeding the work between successive fastening inserting operations, and means for effecting a two-dimensional location of the work to receive the last fastening to be inserted arranged to be moved into an inoperative position for the other fastening inserting operations.

165. A machine of the class described, having, in combination, means for inserting fastenings, means for engaging a side and an end of the work to effect a two-dimensional location of the work to receive the last fastening to be inserted comprising a member arranged to be withdrawn out of gaging relation to the work as the fastening inserting operation begins, and means for effecting such withdrawal of said member.

166. A machine of the class described, having, in combination, means for inserting fastenings, means for feeding the work between successive fastening inserting operations, means for effecting a two-dimensional location of the work to receive the initial fastening comprising a member arranged to be withdrawn automatically from the path of the work feed, and means for effecting a two-dimensional location of the work to receive the last fastening to be inserted.

167. A machine of the class described, having, in combination, fastening inserting means, work feeding means, means for effecting a two-dimensional location of the work to receive the initial fastening comprising a member arranged to be withdrawn out of gaging relation to the work when the fastening inserting operation begins, means for effecting a two-dimensional location of the work to receive the last fastening to be inserted likewise comprising a member arranged to be withdrawn out of gaging relation to the work when the fastening inserting operation begins, said members projecting normally across the path of the work feed, and means for simultaneously withdrawing said members out of the path of the work feed as the fastening inserting operation begins.

168. A machine for inserting fastenings, having, in combination, fastening inserting means and work feeding means, an edge gage to insure the positioning of the row of inserted fastenings parallel to the edge of the work, a second gage for determining the location of the beginning of the row of fastenings upon the work, and a third gage for determining the location of the end of the row of fastenings upon the work.

169. A machine for inserting fastenings, having, in combination, means for inserting successively fastenings in the heel of a shoe, work feeding means, means for positioning the heel to insure the insertion of a row of fastenings parallel to its edge, means for insuring the location of the first fastening in said row at a predetermined distance from one corner of said heel, and means for insuring the location of the last fastening in said row at a predetermined distance from the other corner of said heel.

170. A machine of the class described, having, in combination, means for inserting fastenings, means for feeding the work between successive fastening inserting operations, means for effecting a two-dimensional location of the work to receive the initial fastening, and means for supporting said last-named means arranged to carry said means bodily out of operative relation to the inserting means.

171. A machine of the class described, having, in combination, means for inserting fastenings and work feeding means, a gage to determine the location of the work transversely to the line of feed, another gage projecting into the path of work feed for positioning the work longitudinally of said path, means for withdrawing said second gage from the path of the work when the fastening inserting operation begins, and a support for said two gages arranged to carry them bodily into inoperative relation to the inserting means.

172. A machine for inserting fastenings, having, in combination, fastening inserting means and work feeding means, an edge gage to insure the positioning of fastenings parallel to the edge of the work, a second gage for determining the location of the beginning of the row of fastenings upon the work, and a third gage for determining the location of the end of the row of fastenings upon the work, means for operating the last-mentioned two gages to bring them into and out of operative position, and a support by which said three gages are carried arranged to carry them bodily into inoperative relation to the inserting means.

173. In a machine for inserting fastenings the combination with fastening inserting mechanism and a source of fastening supply, of automatic means governed by the contour of the work for causing the insertion of fastenings to be discontinued at a predetermined distance from the end of the work, and a support for said means arranged to carry it bodily into inoperative relation to the inserting mechanism.

174. In a machine for inserting fastenings, the combination with a swinging frame, of a feed plate movable with and slidably mounted in said frame, means for yieldingly pressing said feed plate upon the work, and means for yieldingly holding said feed plate against excessive downward movement with the work.

175. A machine of the class described, having, in combination, fastening inserting mechanism constructed to partially insert a fastening during one operation and to complete the insertion of said fastening during a succeeding operation and comprising a plate by which the partially inserted fastening is completely inserted, means acting normally to press said plate yieldingly toward the work, and means operating near the end of the fastening inserting movement to press said plate positively upon the work.

176. A machine of the class described, having, in combination, fastening inserting mechanism constructed to partially insert a fastening during one operation and to complete the insertion of said fastening during a succeeding operation and comprising a plate by which the partially inserted fastening is completely inserted, means acting normally to press said plate yieldingly toward the work, and means for lifting said plate positively away from the work.

177. A machine of the class described, having, in combination, fastening inserting mechanism constructed to partially insert a fastening during one operation and to complete the insertion of said fastening during a succeeding operation and comprising a plate by which the partially inserted fastening is completely inserted, means acting normally to press said plate yieldingly toward the work, means for lifting said plate positively away from the work, and means for pressing said plate positively upon the work.

178. A machine of the class described, having, in combination, reciprocating cutters constructed and arranged to grip, insert and sever a fastening from the end of a continuous fastening strip, a plate provided with a guide opening through which the portion of the strip projecting beyond the cutters is passed during the fastening inserting movement of said cutters, means for forming in the work a fastening receiving opening, and means for causing said fastening receiving opening to be brought into line with the guide opening in said plate.

179. In a machine of the class described the combination with fastening inserting mechanism constructed to grip, insert and sever a fastening or fastenings from a fastening strip or a plurality of fastening strips, of means for frictionally retaining said strip or strips in operative relation to the inserting mechanism comprising a block provided with a recess in which are removably confined a plurality of clamp members, adjacent members having opposed grooves formed in their opposed faces, said grooves being shaped to fit the fastening strip, means for yieldingly pressing said members into clamping relation to the strip or strips confined between them, and means for effecting strip selecting relative movements of said block and said inserting mechanism.

180. In a machine of the class described the combination with fastening inserting mechanism constructed to grip, insert and sever a fastening or fastenings from a fastening strip or a plurality of fastening strips, of means for frictionally retaining said strip or strips in operative relation to the inserting mechanism comprising a block provided with a recess in which are removably confined a plurality of clamp members, adjacent members having opposed grooves formed in their opposed faces, said grooves being shaped to fit the fastening strip, adjustable means for yieldingly pressing said members into clamping relation to the strip or strips confined between them, and means for effecting fastening length varying relative movements of said block and said inserting mechanism.

181. In a machine of the class described, the combination with fastening inserting mechanism constructed to grip, insert and sever a fastening or fastenings from a fastening strip or a plurality of fastening strips, of means for frictionally retaining said strip or strips in operative relation to the inserting mechanism comprising a block movable vertically and horizontally, strip clamps carried by said block and means for guiding said block in its vertical and horizontal movements.

182. In a machine of the class described, the combination with fastening inserting mechanism constructed to grip, insert and sever a fastening or fastenings from a fastening strip or a plurality of fastening strips, of means for frictionally retaining said strip or strips in operative relation to the inserting mechanism comprising a block movable vertically and horizontally, strip clamps carried by said block, means for moving said block vertically, and means for moving said block horizontally, said means for moving said block vertically comprising means for guiding the block during its horizontal movements, and said means for moving said block horizontally comprising means for guiding the block during its vertical movements.

183. In a machine of the class described, the combination with mechanism constructed to insert and sever a fastening from the end of a continuous fastening strip, of means for presenting said strip to said inserting mechanism in different relations thereto comprising a member provided with a guide opening to receive said strip, horizontal guides upon the sides of said member, and horizontal guides upon said inserting mechanism extending from front to back thereof with which the guides upon said member engage.

184. In a machine for inserting fastenings, the combination with a rotating shaft, of a swinging frame arranged to swing in an arc concentric with said shaft to effect a work feeding operation, an eccentric on said shaft within said frame, a reciprocating carrier mounted to reciprocate in said frame, wire inserting and severing cutters carried by said carrier, a cam upon said shaft, connections between said carrier and said eccentric constructed to cause said eccentric to impart to said carrier a reciprocating movement, connections between said cam and said frame arranged to swing said frame, and connections between said cam and said cutters constructed to cause said cutters to grip, insert and sever a fastening from a continuous wire during the reciprocating movement of said carrier.

185. In a machine of the class described, the combination with a swinging frame and mechanism associated therewith for feeding the work, of a slide mounted to reciprocate in directions parallel to the radius of the path of swinging movement of said frame, fastening inserting mechanism with which said slide coöperates and a lever for imparting reciprocating movement to said slide, said slide and lever having coöperating rack teeth concentric with the path of swinging movement of said frame.

186. In a machine of the class described, mechanism for inserting fastenings, a driving shaft for operating said mechanism, a work support, mechanism for automatically depressing the work support after each fastening inserting operation to permit the work to be fed into position to receive the next fastening, and a cam arranged to be operated from said driving shaft to raise said work support into operative work supporting position before the insertion of fastenings begins and by such operation to be entirely disconnected from the driving shaft while said shaft continues to operate said inserting mechanism.

187. In a machine of the class described, mechanism for successively inserting fastenings, power driven means for operating said mechanism, a work support, mechanism for automatically depressing the work support after each fastening inserting operation to permit the work to be fed into position to receive the next fastening, and a cam arranged to be operated from said power driven means for automatically raising the work support into operative position before the first fastening is inserted and to maintain the work support in operative position while the insertion of fastenings continues, said cam being brought by its work support raising movement out of connection with the power driven means.

188. In a machine of the class described, mechanism for successively inserting fastenings, power driven means for operating said mechanism, a work support, mechanism for automatically depressing the work support after each fastening inserting operation to permit the work to be fed into position to receive the next fastening, and a cam arranged to be operated from said power driven means for automatically raising the work support into operative position before the first fastening is inserted, the connections between said cam and said power driven means being so constructed and arranged that the work support raising movement of said cam serves to free said cam entirely from the active control of said power driven means.

189. In a machine of the class described, mechanism for successively inserting fastenings, power driven means for operating said mechanism, a work support, mechanism for automatically depressing the work support after each fastening inserting operation to permit the work to be fed into position to receive the next fastening, a cam arranged to be operated from said power driven means for automatically raising the work support into operative position before the first fastening is inserted and yielding connections between said cam and said work support, the connections between said cam and said power driven means being so constructed and arranged that the work support raising movement of said cam serves to bring said cam into a position of rest in which it maintains the work support in operative position while the inserting mechanism continues to operate.

190. In a machine of the class described, mechanism for successively inserting fastenings, a work support, power driven means for operating said mechanism, mechanism for automatically depressing the work support after each fastening inserting operation to permit the work to be fed into position to receive the next fastening, and a cam operated from said power driven means to move said work support from work receiving position into a position in which it supports the work in operative relation to the inserting mechanism, said cam being constructed and arranged to come to rest when it has completed the movement of the work support into operative position whereby it may maintain the work support in operative position until the insertion of fastenings has been completed, said cam being undisturbed by the operation of said means for depressing the work support to permit the work to be fed, and means under the control of the operator for governing the operation of said cam to permit the work support to be lowered.

191. In a machine of the class described, mechanism for successively inserting fastenings, power driven means from which said mechanism is operated, a work support movable between a work receiving position and a position in which it supports the work in operative relation to said inserting mechanism, a cam operated from said power driven means for automatically effecting such movement, mechanism for automatically depressing the work support after each fastening inserting operation to permit the work to be fed into position to receive the next fastening, and means for causing said cam to come to rest in position to maintain said work support in operative position when several fastenings are to be inserted in succession and to remain at rest until the insertion of fastenings is completed.

192. In a machine of the class described, mechanism for successively inserting fastenings, power driven means for operating said mechanism, a work support movable between a work receiving position and a position in which it supports the work in operative relation to said inserting mechanism, a cam operated from said power driven means for automatically effecting such movement, mechanism for automatically depressing the work support after each fastening inserting operation to permit the work to be fed into position to receive the next fastening, means for causing said cam to come to rest in position to maintain the work support in operative position when several fastenings are to be inserted in succession and to remain at rest until the insertion of fastenings is completed, and means under the control of the operator for causing said cam to move again to permit the work support to return into work receiving position.

193. In a machine of the class described, mechanism for operating upon work, power driven means for operating said mechanism, a work support, mechanism for automatically depressing the work support after each fastening inserting operation to permit the work to be fed into position to receive the next fastening, a cam for moving said work support from work receiving position into a position in which it supports the work in operative relation to said mechanism, said cam normally having no connection with said power driven means, means for operatively connecting said cam and said power driven means, and means for interrupting said connection when said cam has completed a movement of the work support into operative position.

194. In a machine of the class described, mechanism for successively inserting fastenings, power driven means for operating said mechanism, a work support, mechanism for automatically depressing the work support after each fastening inserting operation to permit the work to be fed into position to receive the next fastening, a cam for moving said work support from work receiving position into a position in which it supports the work in operative relation to said inserting mechanism, said cam being constructed to maintain the work support in substantially the position to which it has been moved while the inserting mechanism continues operative to insert fastenings, connections between said cam and said power driven means, means for entirely disconnecting said cam from said power driven means when said cam has completed the movement of the work support into operative position.

195. In a machine of the class described, mechanism for successively inserting fastenings, power driven means for operating said mechanism, a work support, mechanism for automatically depressing the work support after each fastening inserting operation to permit the work to be fed into position to receive the next fastening, a cam constructed and arranged to move said work support from work receiving position into a position in which it supports the work in operative relation to said inserting mechanism, connections between said cam and said power driven means, and means under the control of the operator for entirely freeing said cam from the active control of said power driven means after the cam has completed the movement of the work support into operative position.

196. In a machine of the class described, mechanism for successively inserting fastenings, power driven means for operating said mechanism, a work support movable between a work receiving position and a position in which it supports the work in operative relation to said inserting mechanism, a cam operated from said power driven means for automatically effecting such movement, mechanism for automatically depressing the work support after each fastening inserting operation to permit the work to be fed into position to receive the next fastening, and means under the control of the operator for holding said cam against any movement with the power driven means, after it has completed the movement of the work support into operative position, during a number of operations of the inserting mechanism.

197. In a machine of the class described, mechanism for inserting fastenings, a driving shaft from which said mechanism is operated, a work support, mechanism for automatically depressing the work support after each fastening inserting operation to permit the work to be fed into position to receive the next fastening, a cam normally disconnected from said driving shaft but arranged to be connected to said driving shaft to raise said work support to clamp the work between said support and the inserting mechanism and by such operation to be brought into a position of rest, and a spring in the connections between said cam and the work support arranged to be compressed as the work support is raised into work clamping position.

198. In a machine of the class described, mechanism for inserting fastenings provided with a work abutment against which the work to be operated upon is pressed, a driving shaft from which said mechanism is operated, a work support, a cam arranged to be operated from said driving shaft to raise the work support to clamp the work between the work support and the work abutment and by such operation to be brought into a position in which it ceases to move in timed relation to the driving shaft while said shaft continues to operate said inserting mechanism, a spring in the connections between said cam and said work support, and means for intermittently depressing the work support to permit the work to be fed thereover arranged to compress said spring between the work support and cam.

199. In a machine of the class described, mechanism for successively inserting fastenings, power driven means for operating said mechanism, a work support, a cam arranged to be operated from said power driven means for automatically raising the work support into operative position before the first fastening is inserted, the connections between said cam and said power driven means being so constructed and arranged that the work support raising movement of said cam serves to free said cam from the active control of the power driven means and to leave said cam in the position in which it maintains the work support in its operative position, yielding connections between said cam and said work support and means operated from said power driven means for intermittently depressing said work support against said yielding connections.

200. In a machine of the class described, mechanism for inserting fastenings, power driven means from which said mechanism is operated, a work support movable between a work receiving position and a position in which it supports the work in operative relation to said inserting mechanism, means, comprising a cam operated from said power driven means and yielding connections between said cam and said work support, for automatically effecting the aforementioned movement of the work support, means for intermittently depressing said work support when in operative position to permit the work to be fed thereover, and means for holding said cam against movement during the work feeding depression of the work support.

201. In a machine of the class described, mechanism for inserting fastenings, power driven means from which said mechanism is operated, a work support movable between a work receiving position and a position in which it supports the work in operative relation to the inserting mechanism, a cam operated from said power driven means for automatically effecting such movement, means for intermittently depressing the work support when in operative position to permit the work to be fed thereover and means for preventing movement of said cam during the work feeding depression of the work support.

202. In a machine of the class described, mechanism for inserting fastenings, power driven means from which said mechanism is operated, a work support movable between a work receiving position and a position in which it supports the work in operative relation to said inserting mechanism, mechanism for automatically depressing the work support after each fastening inserting operation to permit the work to be fed into position to receive the next fastening, a normally stationary cam having two positions of rest in one of which it maintains the work support in operative work supporting position and in the other of which it permits the work support to assume a work receiving position, and connections between said cam and said power driven means whereby the movement of the work support into operative work supporting position is effected automatically, said cam being entirely disconnected from said power driven means when in its positions of rest.

In testimony whereof I have signed my name to this specification in the presence of two subscribing witnesses.

LOUIS A. CASGRAIN.

Witnesses:
H. DORSEY SPENCER,
ARTHUR L. RUSSELL.